US012651191B1

(12) United States Patent　　　　　(10) Patent No.:　US 12,651,191 B1
Krishnan et al.　　　　　　　　　　　　(45) Date of Patent:　　　Jun. 9, 2026

(54) QUANTUM ENHANCED ENTANGLEMENT PREDICTION WITH ADAPTIVE FRAGMENTATION

(71) Applicant: QpiAI India Private Limited, Bangalore (IN)

(72) Inventors: Aswanth Krishnan, Bengaluru (IN); Manjunath Ramachandrappa Venkatesh, Bengaluru (IN); Lakshya Priyadarshi, Lucknow (IN); Nagendra Nagaraja, Bangalore (IN)

(73) Assignee: QpiAI India Private Limited, Bangalore (IN)

( * ) Notice: Subject to any disclaimer, the term of this patent is extended or adjusted under 35 U.S.C. 154(b) by 0 days.

(21) Appl. No.: 19/451,728

(22) Filed: Jan. 16, 2026

(51) Int. Cl.
　　*G06N 10/60*　　　(2022.01)
(52) U.S. Cl.
　　CPC ................................... *G06N 10/60* (2022.01)
(58) Field of Classification Search
　　CPC ...................................................... G06N 10/60
　　See application file for complete search history.

(56)　　　　　　　References Cited

PUBLICATIONS

Collins et al., "A Fragmentation-Based Graph Embedding Framework for QM/ML", Aug. 3, 2021, The Journal of Physical Chemistry A, vol. 125, Issue 31, pp. 6872-6880. (Year: 2021).*
Samanta et al., "FragmentNet: Adaptive Graph Fragmentation for Graph-to-Sequence Molecular Representation Learning", Feb. 3, 2025, arXiv:2502.01184v1, pp. 1-22. (Year: 2025).*

* cited by examiner

*Primary Examiner* — Brent Johnston Hoover
(74) *Attorney, Agent, or Firm* — Foley & Lardner LLP

(57)　　　　　　　ABSTRACT

Disclosed herein are computer systems and methods for predicting orbital entanglement and performing adaptive fragmentation in hybrid classical and quantum computing environments. The system receives molecular geometry data and basis set descriptors, generates atomic and molecular orbital embeddings using an orbital encoder, and predicts orbital entanglement measures via an entanglement prediction head. Quantum processing unit (QPU)-derived entanglement metrics are used to refine prediction accuracy. An orbital entanglement graph is constructed and partitioned into active, bath, and environment subsets according to learned fragmentation thresholds. Fragmentation output data is produced and transmitted to a QPU for execution of correlated electronic structure calculations on active space fragments, enabling efficient, accurate quantum chemistry simulations.

20 Claims, 15 Drawing Sheets

300

302 — Receive molecular geometry data and basis set descriptors

304 — Generate, via executing an orbital encoder, atomic orbital (AO) and molecular orbital (MO) embeddings from the molecular geometry data and basis set descriptors 306 — Provide the AO and MO embeddings to a neural compression head downstream from the orbital encoder 308 — Predict, via the neural compression head executed, compression parameters for two-electron integrals, wherein the compression parameters are compatible with a plurality of low-rank factorization back-ends including tensor hypercontraction (THC), resolution-of-identity (RI), Cholesky decomposition (CD), canonical polyadic (CP) decomposition, and tensor train (TT) decomposition 310 — Apply, by a compression module executed, the predicted compression parameters to the two-electron integrals associated with a molecular hamiltonian to produce a compressed representation of the hamiltonian 312 — Transmit the compressed representation of the hamiltonian to at least one quantum processing unit (QPU) for execution of correlated electronic structure calculations

100

200

202 — Molecular Geometry + Basis

204 — Shared Orbital Encoder

206 — HF/DFT Surrogate Head

208 — ERI Compression Module

210 — Entanglement Predictor

216 — Mean-field Outputs: h, J, K, C, ε, D

214 — Compressed ERIs THC/RI/CD/CP/TT

212 — Orbital Entanglement Graph

218 — Active-space Discovery

220 — Fragment Embedding Hamiltonians

222 — RL-driven Router

228 — QPU Path

226 — Classical Solver Path

224 — Surrogate Path

230 — Feedback Loop

300

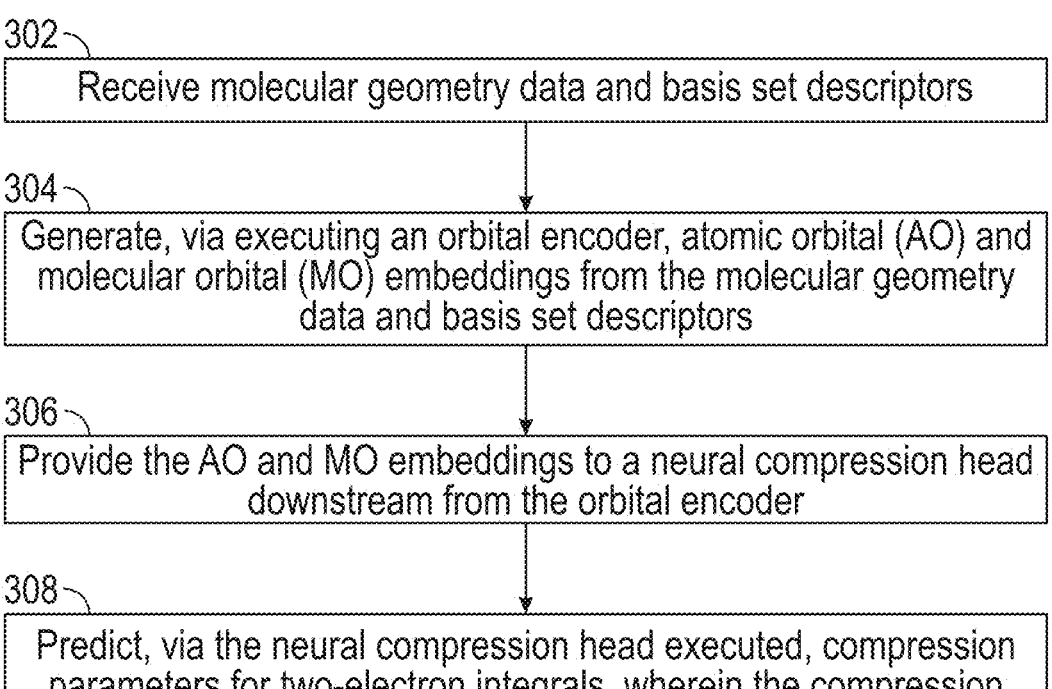

302
Receive molecular geometry data and basis set descriptors

304
Generate, via executing an orbital encoder, atomic orbital (AO) and molecular orbital (MO) embeddings from the molecular geometry data and basis set descriptors 306
Provide the AO and MO embeddings to a neural compression head downstream from the orbital encoder 308
Predict, via the neural compression head executed, compression parameters for two-electron integrals, wherein the compression parameters are compatible with a plurality of low-rank factorization back-ends including tensor hypercontraction (THC), resolution-of-identity (RI), Cholesky decomposition (CD), canonical polyadic (CP) decomposition, and tensor train (TT) decomposition 310
Apply, by a compression module executed, the predicted compression parameters to the two-electron integrals associated with a molecular hamiltonian to produce a compressed representation of the hamiltonian 312
Transmit the compressed representation of the hamiltonian to at least one quantum processing unit (QPU) for execution of correlated electronic structure calculations

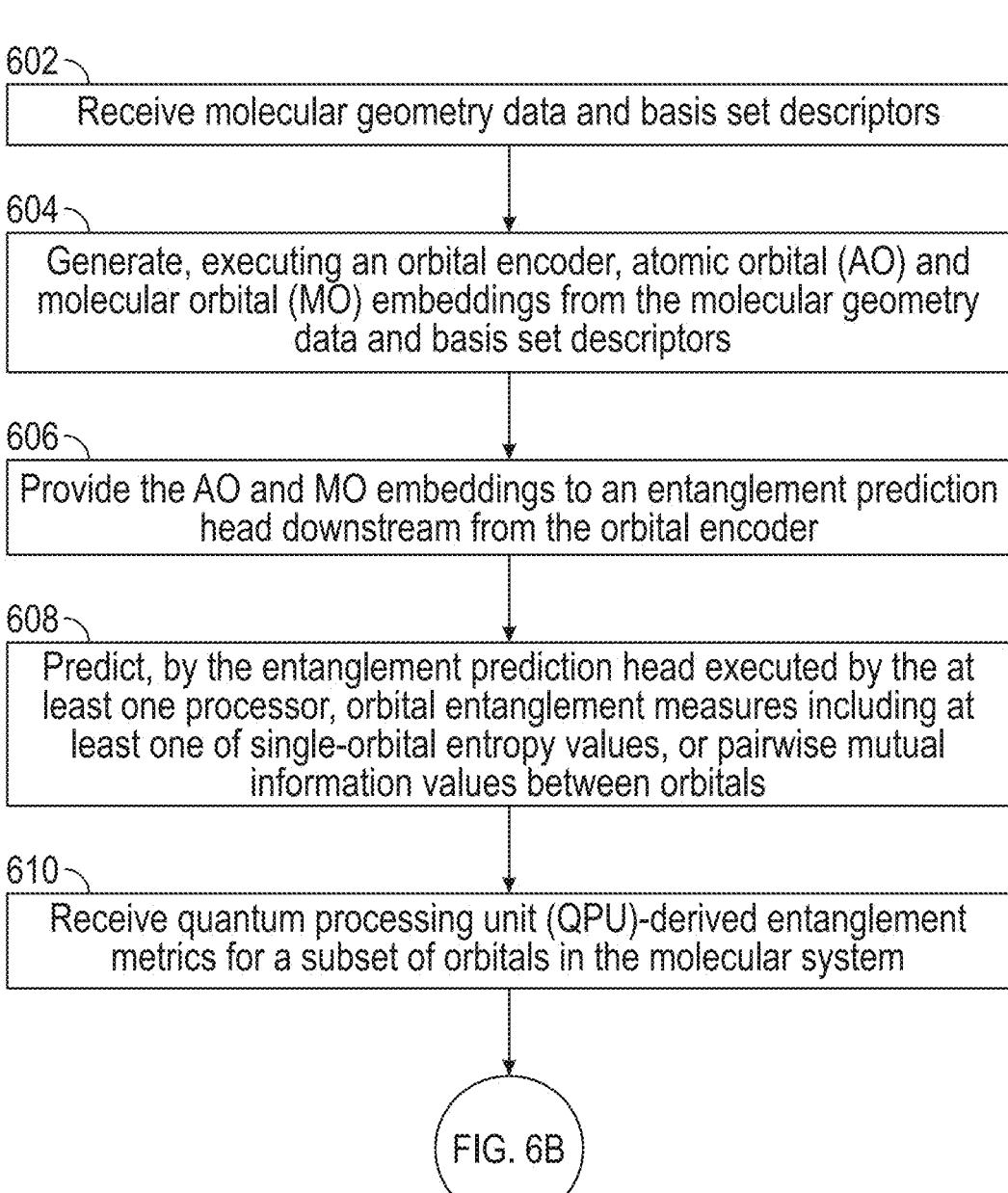

602

Receive molecular geometry data and basis set descriptors

604

Generate, executing an orbital encoder, atomic orbital (AO) and molecular orbital (MO) embeddings from the molecular geometry data and basis set descriptors

606

Provide the AO and MO embeddings to an entanglement prediction head downstream from the orbital encoder

608

Predict, by the entanglement prediction head executed by the at least one processor, orbital entanglement measures including at least one of single-orbital entropy values, or pairwise mutual information values between orbitals

610

Receive quantum processing unit (QPU)-derived entanglement metrics for a subset of orbitals in the molecular system

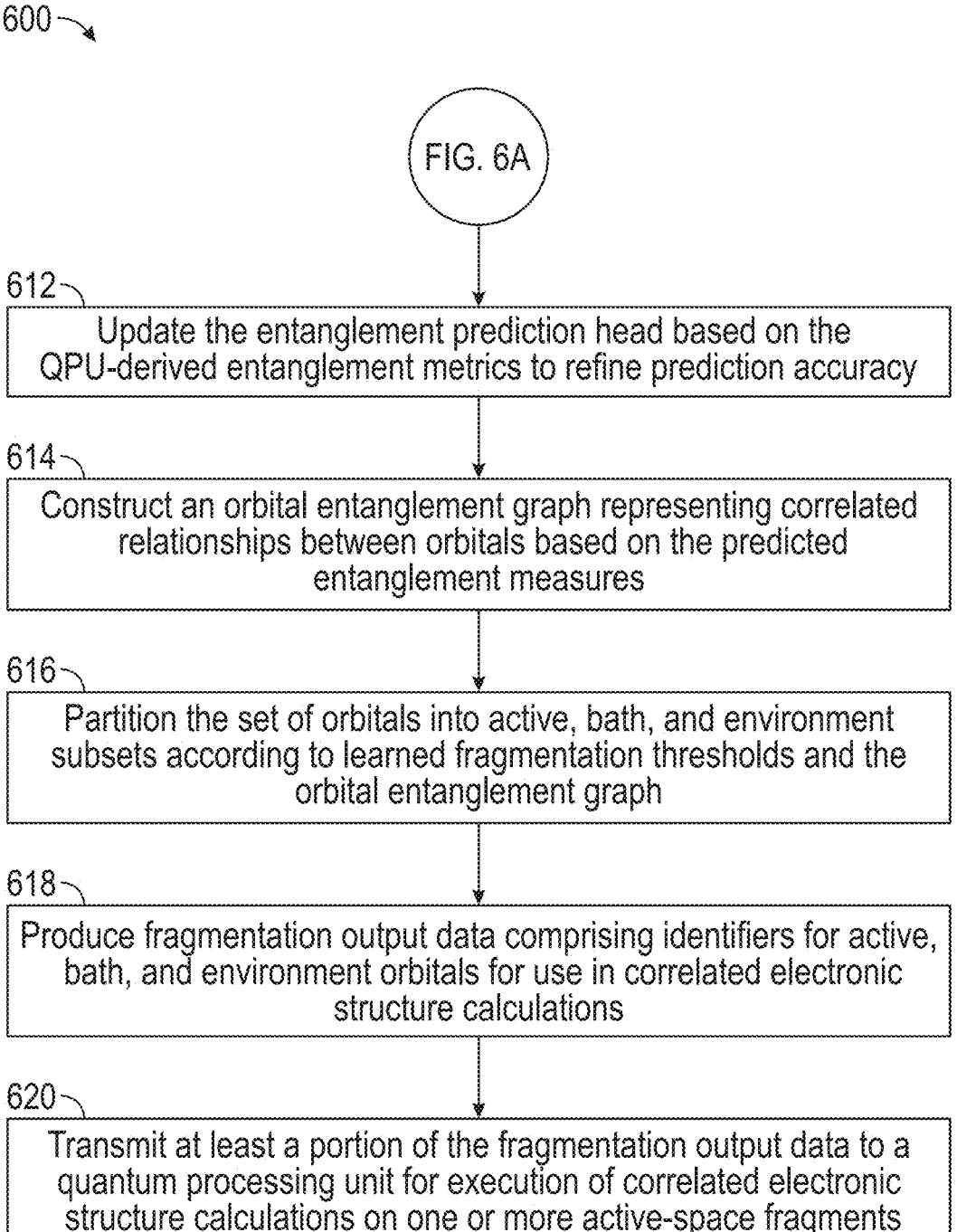

612 — Update the entanglement prediction head based on the QPU-derived entanglement metrics to refine prediction accuracy 614 — Construct an orbital entanglement graph representing correlated relationships between orbitals based on the predicted entanglement measures 616 — Partition the set of orbitals into active, bath, and environment subsets according to learned fragmentation thresholds and the orbital entanglement graph 618 — Produce fragmentation output data comprising identifiers for active, bath, and environment orbitals for use in correlated electronic structure calculations 620 — Transmit at least a portion of the fragmentation output data to a quantum processing unit for execution of correlated electronic structure calculations on one or more active-space fragments

Figures 8A, 8B:
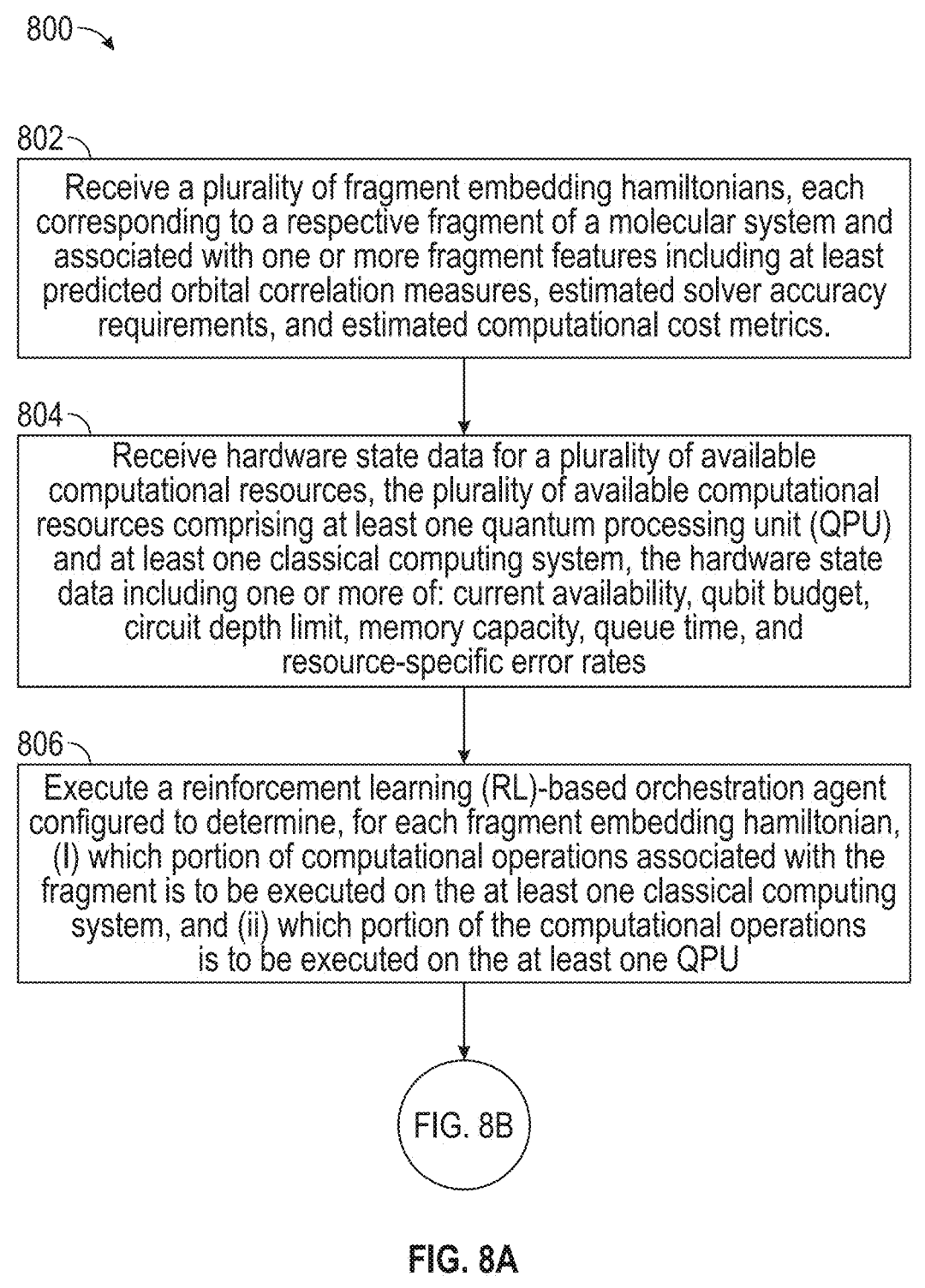

Receive a plurality of fragment embedding hamiltonians, each corresponding to a respective fragment of a molecular system and associated with one or more fragment features including at least predicted orbital correlation measures, estimated solver accuracy requirements, and estimated computational cost metrics.

804 —

Receive hardware state data for a plurality of available computational resources, the plurality of available computational resources comprising at least one quantum processing unit (QPU) and at least one classical computing system, the hardware state data including one or more of: current availability, qubit budget, circuit depth limit, memory capacity, queue time, and resource-specific error rates

806 —

Execute a reinforcement learning (RL)-based orchestration agent configured to determine, for each fragment embedding hamiltonian, (I) which portion of computational operations associated with the fragment is to be executed on the at least one classical computing system, and (ii) which portion of the computational operations is to be executed on the at least one QPU

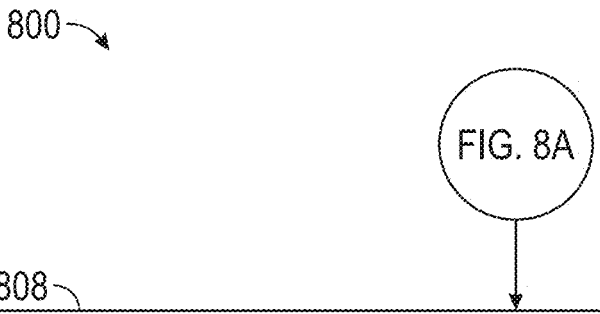

Select, by the RL-based orchestration agent, for each determined portion of computational operations, a solver type from among a plurality of solver types including at least a classical correlated solver, a quantum solver executable on the at least one QPU, and a machine learning surrogate model, wherein the selection is based on a learned routing policy trained to optimize a multi-objective reward function comprising at least accuracy of computed energies, computational resource usage cost, and execution time

810

Route each portion of computational operations to its respective selected solver type for execution on the designated classical computing system or QPU

812

Receive execution results from the solvers including at least one of: correlated energies, reduced density matrices, entanglement spectra, or error estimates

814

Update the learned routing policy of the RL-based orchestration agent based on the execution results to refine future determinations of which portions of computational operations are performed by the classical computing system and which portions are performed by the QPU

QUANTUM ENHANCED ENTANGLEMENT PREDICTION WITH ADAPTIVE FRAGMENTATION

TECHNICAL FIELD

The present disclosure relates to quantum chemistry, quantum computing, and machine learning. More specifically, it is directed toward systems and methods for performing hybrid quantum-classical electronic structure simulations using a shared-backbone neural architecture, quantum-enhanced entanglement prediction, and reinforcement learning-driven solver orchestration.

BACKGROUND

Electronic structure simulations in quantum chemistry aim to determine key properties of molecular systems, such as ground-state and excited-state energies, correlation functions, and derived observables, by solving the electronic Schrödinger equation. Direct solutions scale exponentially with the number of electrons and basis functions, making them computationally infeasible for medium- and large-scale molecules. Current systems typically rely on mean-field methods such as Hartree-Fock (HF) and Density Functional Theory (DFT) to produce molecular orbitals and associated integrals, which serve as inputs for correlated solvers and embedding schemes. While effective in small systems, these approaches face persistent bottlenecks: the computation and storage of two-electron integrals scales poorly, even when using tensor factorization techniques such as Tensor Hypercontraction (THC), Resolution of Identity (RI), or Cholesky decomposition (CD); active-space selection is often manual and sensitive to molecular geometry; and embedding strategies rarely adapt to the constraints and noise characteristics of quantum processing units (QPUs). Furthermore, solver orchestration across classical, quantum, and surrogate compute paths is typically static, allocated before execution with little capacity for adaptation, and feedback from different compute backends is rarely used for continuous improvement across the system.

These limitations restrict scalability, reduce computational efficiency, and hinder the accuracy of hybrid quantum-classical electronic structure simulations.

SUMMARY

For the aforementioned reasons, there is a need for systems and methods that provide unified and trainable molecular orbital representations serving multiple downstream prediction tasks, adaptive entanglement estimation that integrates both classical simulation data and quantum measurements to automate fragmentation decisions, and dynamic, reinforcement-learning-powered orchestration of heterogeneous solvers that continually improves through multi-timescale feedback. The methods and systems discussed herein address these needs by introducing a shared-backbone neural architecture for quantum chemistry tasks, a quantum-enhanced entanglement prediction mechanism with adaptive fragmentation, and an RL-driven solver orchestration policy, all integrated into a self-optimizing framework for hybrid quantum-classical simulation.

Hybrid quantum-classical approaches combine quantum processors with classical computing resources to execute portions of a simulation on the hardware best suited to that task. These systems must address several persistent challenges: efficiently representing and manipulating large Hamiltonians and costly two-electron repulsion integrals; accurately identifying and isolating the most strongly correlated molecular orbital subspaces; and dynamically allocating simulation fragments between quantum devices, classical correlated solvers, and machine-learning surrogates. Existing/conventional methods often rely on static compression techniques, fixed heuristics for active-space selection, and predetermined solver assignments. Such methods fail to adapt to the specific chemical characteristics of a given molecule or to real-time variations in hardware conditions. There is therefore a need for an integrated system that learns molecular orbital features, compresses electronic structure data, predicts orbital correlation patterns, and optimally routes computational tasks across heterogeneous resources while improving accuracy through continuous feedback.

The methods and systems discussed herein provide systems and methods that integrate artificial intelligence and hybrid quantum-classical computing to accelerate complex molecular simulations. In some embodiments, a shared neural architecture first learns detailed features of a molecule's atomic and molecular orbitals from its structure. These features may then be processed by multiple specialized modules: a first module predicts parameters for compressing the most computationally expensive elements of the electronic Hamiltonian; a second module predicts the strength of correlation between different orbitals so the molecule can be partitioned into smaller, targeted fragments; and a reinforcement-learning-driven orchestration engine decides, for each fragment, whether it should execute on a quantum processor for maximum accuracy, a classical correlated solver for efficiency, or a fast surrogate model. By combining learned compression, adaptive fragmentation, and intelligent routing across available hardware (and by continually refining these decisions based on multi-timescale feedback from past results) these techniques enable accurate simulation of far larger and more complex chemical systems than traditional methods.

Accurate quantum chemistry simulations require managing extremely large and complex electronic structure calculations, such as building and processing Hamiltonians with vast sets of two-electron integrals. For larger molecules, these computations scale steeply in memory and runtime, making them impractical even on high-performance classical computers. Quantum processors offer promise for addressing correlated electronic structure problems, but present hardware is constrained by limited qubit counts, coherence times, gate fidelities, and susceptibility to noise. Additionally, the partitioning of a large simulation into smaller fragments and the assignment of each fragment to an appropriate computational resource are non-trivial tasks that require awareness of orbital correlation patterns and the ability to adapt to changing hardware conditions. In conventional paradigms, fixed, non-learnable compression schemes such as resolution-of-identity, Cholesky decomposition, and tensor hypercontraction are employed regardless of molecular system or basis set, active-space discovery is based on static rules or manual inspection, and fragmentation decisions rarely incorporate live feedback from quantum devices. Task allocation between quantum and classical resources is generally predetermined and remains fixed during execution, without consideration of real-time performance, noise, or hardware availability. As a result, such systems fail to scale efficiently to large, complex chemical systems and cannot optimally leverage modern heterogeneous compute environments.

The systems and methods disclosed herein address three core bottlenecks in large-scale molecular calculations. First, they learn to intelligently compress two-electron integrals and other large Hamiltonian components, reducing memory and computation requirements without significant accuracy loss. Second, they identify and validate-using feedback from quantum hardware where applicable, which orbitals are most strongly correlated, then adaptively fragment the molecule to focus high-accuracy resources on the most critical subspaces. Third, they employ reinforcement learning to route each fragment in real time to the optimal computational resource, whether a quantum processor, classical solver, or surrogate model, refining these decisions continuously to balance accuracy, cost, and runtime.

In one embodiment, the techniques discussed herein can be described as a three-pronged approach:

(1) Shared-Backbone Neural Architecture with Hamiltonian and Two-Electron Integral Compression Head: In some embodiments, a graph-based orbital encoder processes molecular geometry and basis descriptors to produce unified atomic orbital and molecular orbital embeddings. In some embodiments, a first downstream head utilizes these embeddings to predict parameters for compressing two-electron integrals using multiple low-rank factorization back-ends, including tensor hypercontraction, resolution-of-identity, Cholesky decomposition, canonical polyadic decomposition, and tensor train formats. By learning compression parameters directly from molecular features, the system can compute integrals on demand with reduced dimensionality, minimizing storage and computational overhead while preserving accuracy required for subsequent correlated calculations.

(2) Shared-Backbone Neural Architecture with Entanglement Prediction and Adaptive Fragmentation Head: In some embodiments, the shared orbital encoder also feeds a second downstream head that predicts orbital entanglement measures, such as orbital entropies and mutual information, to assess correlation strengths. These predictions are refined via a quantum-enhanced feedback loop, wherein selected orbital subsets are evaluated on quantum processors to obtain direct correlation measurements. Based on the refined predictions, the system adaptively partitions orbitals into active, bath, and environment sets using learned thresholds tailored to molecule size, basis set configuration, and observed correlation strengths.

(3) Reinforcement Learning-Driven Hybrid Solver Orchestration: In some embodiments, a reinforcement-learning policy receives fragment-specific embedding Hamiltonians from the compression and entanglement heads, and determines, for each fragment, an optimal execution path. Highly correlated fragments are assigned to quantum processors when qubit constraints and noise profiles permit; moderately correlated fragments are routed to classical correlated solvers; and low-correlation fragments are processed by surrogate machine-learning models. The policy optimizes a reward function balancing energy accuracy, quantum resource cost, and latency, and is updated continually using feedback from quantum and classical computations to improve future routing decisions.

The methods and systems discussed herein provide various technical advantages over conventional hybrid quantum-classical simulation systems. By employing a shared-backbone neural architecture, learned atomic and molecular orbital embeddings are reused across multiple prediction tasks, improving consistency between modules, reducing redundant computation, and enabling end-to-end training where gradient updates from different heads converge into a unified representation. This enhances accuracy, reduces training time, and improves generalization across diverse chemical systems. In addition, the learned compression head for two-electron integrals and other large Hamiltonian components substantially lowers memory and computation requirements by predicting low-rank factorization parameters directly from molecular features. Supporting multiple back-end factorization formats allows the reduction of storage scaling from quartic to near-quadratic order while maintaining the numerical fidelity required for downstream correlated calculations, making larger molecules and basis sets tractable where static methods would fail.

The methods and systems discussed herein further improve simulation efficiency through adaptive fragmentation informed by quantum-enhanced entanglement prediction. By incorporating direct feedback from quantum processors into orbital correlation estimates, the system achieves higher accuracy in detecting strongly correlated subspaces and dynamically tailors fragmentation thresholds to the specific molecular and basis set configuration. This enables high-accuracy computational resources to focus on the parts of a simulation where they yield the greatest benefit. A reinforcement learning-driven orchestration component routes each fragment in real time to the optimal compute resource (e.g., quantum processor, classical correlated solver, or surrogate model) based on accuracy requirements, resource constraints, and latency considerations, refining these assignments continually through multi-timescale feedback from all compute paths. Collectively, these capabilities allow large-scale, complex quantum chemistry simulations to be executed with improved accuracy, lower resource consumption, and better utilization of heterogeneous hardware than conventional static systems.

In some aspects, the techniques described herein relate to a computer-implemented method for compressing electronic structure Hamiltonians for quantum chemistry simulations in a hybrid classical and quantum computing system, including: receiving, by at least one classical computing system, molecular geometry data and basis set descriptors; generating, by the at least one classical computing system executing an orbital encoder, atomic orbital (AO) and molecular orbital (MO) embeddings from the molecular geometry data and basis set descriptors; providing, by the at least one classical computing system, the AO and MO embeddings to a neural compression head downstream from the orbital encoder; predicting, by the neural compression head executed by the at least one classical computing system, compression parameters for two-electron integrals, wherein the compression parameters are compatible with a plurality of low-rank factorization back-ends at least one of a tensor hypercontraction (THC), resolution-of-identity (RI), Cholesky decomposition (CD), canonical polyadic (CP) decomposition, or tensor train (TT) decomposition; applying, by the at least one classical computing system, the predicted compression parameters to the two-electron integrals associated with a molecular Hamiltonian to produce a compressed representation of the Hamiltonian; transmitting, by the at least one classical computing system, the compressed representation of the Hamiltonian to at least one quantum processing unit (QPU) for execution of correlated electronic structure calculations.

In some aspects, the techniques described herein relate to a method, further including: executing, by the at least one QPU, quantum algorithms on the compressed representation to determine simulation outputs.

In some aspects, the techniques described herein relate to a method, wherein the orbital encoder executed by the at least one classical computing system includes a graph neural network configured to process atomic connectivity and basis set metadata to generate the AO and MO embeddings.

In some aspects, the techniques described herein relate to a method, wherein the neural compression head executed by the at least one classical computing system is trained using datasets of two-electron integrals computed from a plurality of reference molecules and basis sets.

In some aspects, the techniques described herein relate to a method, wherein predicting the compression parameters by the neural compression head includes outputting numerical factorization parameters optimized for a selected one of the plurality of low-rank factorization back-ends based on the generated embeddings.

In some aspects, the techniques described herein relate to a method, wherein a compression module executed on the at least one classical computing system applies the predicted compression parameters to generate compressed two-electron integrals on-demand for only a subset of orbitals or fragments identified for correlated calculations.

In some aspects, the techniques described herein relate to a method, wherein the at least one classical computing system performs validation of the compressed two-electron integrals by comparing reconstructed integrals against original integrals and adjusting compression parameters to maintain a predetermined accuracy threshold.

In some aspects, the techniques described herein relate to a method, wherein the at least one classical computing system stores the predicted compression parameters in association with molecular identifiers for reuse in subsequent simulations involving similar molecular geometries or basis sets.

In some aspects, the techniques described herein relate to a method, wherein the at least one classical computing system augments the AO and MO embeddings with mean-field electronic structure features obtained from a Hartree-Fock or Density Functional Theory calculation prior to predicting the compression parameters.

In some aspects, the techniques described herein relate to a computer system for compressing electronic structure Hamiltonians for quantum chemistry simulations in a hybrid classical and quantum computing system, the computer system including a non-transitory computer-readable medium including one or more instructions, that when executed, cause at least one classical computing system to: receive molecular geometry data and basis set descriptors; generate, executing an orbital encoder, atomic orbital (AO) and molecular orbital (MO) embeddings from the molecular geometry data and basis set descriptors; provide the AO and MO embeddings to a neural compression head downstream from the orbital encoder; predict, via the neural compression head, compression parameters for two-electron integrals, wherein the compression parameters are compatible with a plurality of low-rank factorization back-ends at least one of a tensor hypercontraction (THC), resolution-of-identity (RI), Cholesky decomposition (CD), canonical polyadic (CP) decomposition, or tensor train (TT) decomposition; apply the predicted compression parameters to the two-electron integrals associated with a molecular Hamiltonian to produce a compressed representation of the Hamiltonian; transmit the compressed representation of the Hamiltonian to at least one quantum processing unit (QPU) for execution of correlated electronic structure calculations.

In some aspects, the techniques described herein relate to a computer system, wherein the one or more instructions further cause an execution, by the at least one QPU, of quantum algorithms on the compressed representation to determine simulation outputs.

In some aspects, the techniques described herein relate to a computer system, wherein the orbital encoder executed by the at least one classical computing system includes a graph neural network configured to process atomic connectivity and basis set metadata to generate the AO and MO embeddings.

In some aspects, the techniques described herein relate to a computer system, wherein the neural compression head executed by the at least one classical computing system is trained using datasets of two-electron integrals computed from a plurality of reference molecules and basis sets.

In some aspects, the techniques described herein relate to a computer system, wherein predicting the compression parameters by the neural compression head includes outputting numerical factorization parameters optimized for a selected one of the plurality of low-rank factorization back-ends based on the generated embeddings.

In some aspects, the techniques described herein relate to a computer system, wherein a compression module executed on the at least one classical computing system applies the predicted compression parameters to generate compressed two-electron integrals on-demand for only a subset of orbitals or fragments identified for correlated calculations.

In some aspects, the techniques described herein relate to a computer system, wherein the at least one classical computing system performs validation of the compressed two-electron integrals by comparing reconstructed integrals against original integrals and adjusting compression parameters to maintain a predetermined accuracy threshold.

In some aspects, the techniques described herein relate to a computer system, wherein the at least one classical computing system stores the predicted compression parameters in association with molecular identifiers for reuse in subsequent simulations involving similar molecular geometries or basis sets.

In some aspects, the techniques described herein relate to a computer system, wherein the classical computing system augments the AO and MO embeddings with mean-field electronic structure features obtained from a Hartree-Fock or Density Functional Theory calculation prior to predicting the compression parameters.

In some aspects, the techniques described herein relate to a computer system including a classical computer and at least one quantum processing unit (QPU), wherein the classical computer is configured to: receive molecular geometry data and basis set descriptors; generate, executing an orbital encoder, atomic orbital (AO) and molecular orbital (MO) embeddings from the molecular geometry data and basis set descriptors; provide the AO and MO embeddings to a neural compression head downstream from the orbital encoder; predict, via the neural compression head, compression parameters for two-electron integrals, wherein the compression parameters are compatible with a plurality of low-rank factorization back-ends at least one of a tensor hypercontraction (THC), resolution-of-identity (RI), Cholesky decomposition (CD), canonical polyadic (CP) decomposition, or tensor train (TT) decomposition; apply the predicted compression parameters to the two-electron integrals associated with a molecular Hamiltonian to produce a compressed representation of the Hamiltonian; transmit the compressed representation of the Hamiltonian to the QPU for execution of correlated electronic structure calculations.

In some aspects, the techniques described herein relate to a computer system, wherein the at least one QPU is configured to execute quantum algorithms on the compressed representation to determine simulation outputs.

In some aspects, the techniques described herein relate to a computer-implemented method for predicting orbital entanglement and performing adaptive fragmentation in a hybrid classical and quantum computing system, the method including: receiving, by at least one processor of a classical computing system, molecular geometry data and basis set descriptors associated with a molecular system; generating, by the at least one processor executing an orbital encoder, atomic orbital (AO) and molecular orbital (MO) embeddings from the molecular geometry data and basis set descriptors; providing, by the at least one processor, the AO and MO embeddings to an entanglement prediction head downstream from the orbital encoder; predicting, by the entanglement prediction head executed by the at least one processor, orbital entanglement measures including at least one of single-orbital entropy values, or pairwise mutual information values between orbitals; receiving, by the at least one processor, quantum processing unit (QPU)-derived entanglement metrics for a subset of orbitals in the molecular system; updating, by the at least one processor, the entanglement prediction head based on the QPU-derived entanglement metrics to refine prediction accuracy; constructing, by the at least one processor, an orbital entanglement graph representing correlated relationships between orbitals based on the predicted entanglement measures; partitioning, by the at least one processor, the set of orbitals into active, bath, and environment subsets according to learned fragmentation thresholds and the orbital entanglement graph; producing, by the at least one processor, fragmentation output data including identifiers for active, bath, and environment orbitals for use in correlated electronic structure calculations; and transmitting, by the at least one processor, at least a portion of the fragmentation output data to a quantum processing unit for execution of correlated electronic structure calculations on one or more active-space fragments.

In some aspects, the techniques described herein relate to a method, wherein the orbital encoder includes a graph neural network configured to process atomic connectivity, basis function metadata, or spatial coordinates to generate the AO and MO embeddings.

In some aspects, the techniques described herein relate to a method, wherein predicting the orbital entanglement measures further includes generating a weighted adjacency matrix in which weights correspond to the predicted pairwise mutual information values between orbitals.

In some aspects, the techniques described herein relate to a method, wherein receiving the QPU-derived entanglement metrics includes executing, on the quantum processing unit, a measurement protocol that estimates reduced density matrices for the subset of orbitals and computes single-orbital entropy values.

In some aspects, the techniques described herein relate to a method, wherein updating the entanglement prediction head based on the QPU-derived entanglement metrics includes retraining at least one layer of the prediction head using the QPU-derived entanglement metrics as supervised learning targets.

In some aspects, the techniques described herein relate to a method, wherein constructing the orbital entanglement graph includes clustering the graph into communities of orbitals using a graph-partitioning algorithm selected from at least one a spectral clustering, modularity maximization, or community detection by label propagation.

In some aspects, the techniques described herein relate to a method, wherein partitioning the set of orbitals into active, bath, and environment subsets includes adaptively determining fragmentation thresholds using reinforcement learning based on simulation accuracy feedback observed from the quantum processing unit.

In some aspects, the techniques described herein relate to a method, wherein transmitting at least a portion of the fragmentation output data to the quantum processing unit further includes encoding the active-space orbital identifiers into a fermion-to-qubit mapping at least one of a Jordan-Wigner, Bravyi-Kitaev, and qubit tapering transformations.

In some aspects, the techniques described herein relate to a computer system for predicting orbital entanglement and performing adaptive fragmentation in a hybrid classical and quantum computing system, the computer system including a non-transitory computer-readable medium storing one or more instructions that, when executed, cause at least one processor of a classical computing system to: receive molecular geometry data and basis set descriptors associated with a molecular system; generate, by executing an orbital encoder, atomic orbital (AO) and molecular orbital (MO) embeddings from the molecular geometry data and basis set descriptors; provide the AO and MO embeddings to an entanglement prediction head downstream from the orbital encoder; predict, via the entanglement prediction head, orbital entanglement measures including at least one of single orbital entropy values or pairwise mutual information values between orbitals; receive quantum processing unit (QPU)-derived entanglement metrics for a subset of orbitals in the molecular system; update the entanglement prediction head based on the QPU-derived entanglement metrics to refine prediction accuracy; construct an orbital entanglement graph representing correlated relationships between orbitals based on the predicted entanglement measures; partition the set of orbitals into active, bath, and environment subsets according to learned fragmentation thresholds and the orbital entanglement graph; produce fragmentation output data including identifiers for active, bath, and environment orbitals for use in correlated electronic structure calculations; and transmit at least a portion of the fragmentation output data to a quantum processing unit for execution of correlated electronic structure calculations on one or more active-space fragments.

In some aspects, the techniques described herein relate to a computer system, wherein the orbital encoder includes a graph neural network configured to process atomic connectivity, basis function metadata, or spatial coordinates to generate the AO and MO embeddings.

In some aspects, the techniques described herein relate to a computer system, wherein predicting the orbital entanglement measures further includes generating a weighted adjacency matrix in which weights correspond to the predicted pairwise mutual information values between orbitals.

In some aspects, the techniques described herein relate to a computer system, wherein receiving the QPU-derived entanglement metrics includes executing, on the quantum processing unit, a measurement protocol that estimates reduced density matrices for the subset of orbitals and computes single orbital entropy values.

In some aspects, the techniques described herein relate to a computer system, wherein updating the entanglement prediction head based on the QPU-derived entanglement metrics includes retraining at least one layer of the prediction head using the QPU-derived entanglement metrics as supervised learning targets.

In some aspects, the techniques described herein relate to a computer system, wherein constructing the orbital entanglement graph includes clustering the graph into communities of orbitals using a graph partitioning algorithm selected from at least one of spectral clustering, modularity maximization, or community detection by label propagation.

In some aspects, the techniques described herein relate to a computer system, wherein partitioning the set of orbitals into active, bath, and environment subsets includes adaptively determining fragmentation thresholds using reinforcement learning based on simulation accuracy feedback observed from the quantum processing unit.

In some aspects, the techniques described herein relate to a computer system, wherein transmitting at least a portion of the fragmentation output data to the quantum processing unit further includes encoding the active-space orbital identifiers into a fermion-to-qubit mapping selected from at least one of Jordan-Wigner, Bravyi-Kitaev, or qubit tapering transformations.

In some aspects, the techniques described herein relate to a computer system including a classical computing system and at least one quantum processing unit (QPU), wherein the classical computing system is configured to: receive molecular geometry data and basis set descriptors associated with a molecular system; generate, by executing an orbital encoder, atomic orbital (AO) and molecular orbital (MO) embeddings from the molecular geometry data and basis set descriptors; provide the AO and MO embeddings to an entanglement prediction head downstream from the orbital encoder; predict, via the entanglement prediction head, orbital entanglement measures including at least one of single orbital entropy values or pairwise mutual information values between orbitals; receive QPU-derived entanglement metrics for a subset of orbitals in the molecular system; update the entanglement prediction head based on the QPU-derived entanglement metrics to refine prediction accuracy; construct an orbital entanglement graph representing correlated relationships between orbitals based on the predicted entanglement measures; partition the set of orbitals into active, bath, and environment subsets according to learned fragmentation thresholds and the orbital entanglement graph; produce fragmentation output data including identifiers for active, bath, and environment orbitals for use in correlated electronic structure calculations; and transmit at least a portion of the fragmentation output data to the QPU for execution of correlated electronic structure calculations on one or more active-space fragments.

In some aspects, the techniques described herein relate to a computer system, wherein the orbital encoder includes a graph neural network configured to process atomic connectivity, basis function metadata, or spatial coordinates to generate the AO and MO embeddings.

In some aspects, the techniques described herein relate to a computer system, wherein the classical computing system is further configured to generate a weighted adjacency matrix in which weights correspond to predicted pairwise mutual information values between orbitals.

In some aspects, the techniques described herein relate to a computer system, wherein the QPU is configured to execute a measurement protocol that estimates reduced density matrices for the subset of orbitals and provides single orbital entropy values for use in updating the entanglement prediction head. ABSTRACT (Shared-Backbone Neural Architecture for Quantum Chemistry) Disclosed herein are computer systems and methods for predicting orbital entanglement and performing adaptive fragmentation in hybrid classical and quantum computing environments. The system receives molecular geometry data and basis set descriptors, generates atomic and molecular orbital embeddings using an orbital encoder, and predicts orbital entanglement measures via an entanglement prediction head. Quantum processing unit (QPU)-derived entanglement metrics are used to refine prediction accuracy. An orbital entanglement graph is constructed and partitioned into active, bath, and environment subsets according to learned fragmentation thresholds. Fragmentation output data is produced and transmitted to a QPU for execution of correlated electronic structure calculations on active space fragments, enabling efficient, accurate quantum chemistry simulations.

In some aspects, the techniques described herein relate to a computer-implemented method for orchestrating execution of computational operations in a hybrid classical and quantum computing system, including: receiving, by at least one processor of a classical computing system, a plurality of fragment embedding Hamiltonians, each corresponding to a respective fragment of a molecular system and associated with one or more fragment features including at least one of a predicted orbital correlation measures, estimated solver accuracy requirements, or estimated computational cost metrics; receiving, by the at least one processor, hardware state data for a plurality of available computational resources, the plurality of available computational resources including at least one quantum processing unit (QPU) and at least one classical computing system, the hardware state data including at least one of a current availability, qubit budget, circuit depth limit, memory capacity, queue time, or resource-specific error rates; executing, by the at least one processor, a reinforcement learning (RL)-based orchestration agent configured to determine, for each fragment embedding Hamiltonian, (i) which portion of computational operations associated with the fragment is to be executed on the at least one classical computing system, and (ii) which portion of the computational operations is to be executed on the at least one QPU; selecting, by the RL-based orchestration agent executed by the at least one processor, for each determined portion of computational operations, a solver type from among a plurality of solver types including at least a classical correlated solver, a quantum solver executable on the at least one QPU, and a machine learning surrogate model, wherein the selection is based on a learned routing policy trained to optimize a multi-objective reward function including at least accuracy of computed energies, computational resource usage cost, and execution time; routing, by the at least one processor, each portion of computational operations to its respective selected solver type for execution on the classical computing system or QPU; receiving, by the at least one processor, execution results from the solvers including at least one of: correlated energies, reduced density matrices, entanglement spectra, or error estimates; and updating, by the at least one processor, the learned routing policy of the RL-based orchestration agent based on the execution results to refine future determinations of which portions of computational operations are performed by the classical computing system and which portions are performed by the QPU.

In some aspects, the techniques described herein relate to a method, wherein the hardware state data further includes at least one of real-time quantum device noise profiles, error-mitigation parameters, or calibration timestamps, and wherein the reinforcement learning based orchestration agent conditions solver assignment decisions on the received noise profiles.

In some aspects, the techniques described herein relate to a method, wherein the learned routing policy is trained using a multi-timescale update scheme including at least one of fast updates based on surrogate model error signals, medium-frequency updates based on classical correlated solver outputs, or slower, high-value updates based on quantum processing unit execution results.

In some aspects, the techniques described herein relate to a method, wherein the multi-objective reward function further includes a hardware utilization balancing term configured to reduce overload on a selected computational resource while maintaining overall throughput.

In some aspects, the techniques described herein relate to a method, wherein selecting the solver type further includes adapting solver-specific configuration parameters including at least one of: convergence tolerance, active-space size, backend compiler optimization level, or error-mitigation strategy, based on fragment features and hardware state data.

In some aspects, the techniques described herein relate to a method, wherein routing the portion of computational operations to the quantum processing unit includes mapping the fragment embedding Hamiltonian into a qubit-operator form using a fermion-to-qubit transformation selected from the group consisting of Jordan-Wigner, Bravyi-Kitaev, and qubit tapering, and optimizing the mapping for the topology of the target quantum hardware.

In some aspects, the techniques described herein relate to a method, wherein updating the learned routing policy based on the execution results includes computing one or more error gradients between predicted and observed solver performance and applying a reinforcement-learning algorithm selected from the group consisting of policy-gradient methods, actor-critic methods, and Q-learning methods to adjust routing decisions for subsequent iterations.

In some aspects, the techniques described herein relate to a non-transitory computer-readable storage medium storing instructions that, when executed by one or more processors of a classical computing system, cause the one or more processors to perform operations including: receiving a plurality of fragment embedding Hamiltonians, each corresponding to a respective fragment of a molecular system and associated with one or more fragment features including at least one of predicted orbital correlation measures, estimated solver accuracy requirements, or estimated computational cost metrics; receiving hardware state data for a plurality of available computational resources, the plurality of available computational resources including at least one quantum processing unit (QPU) and at least one classical computing system, the hardware state data including at least one of current availability, qubit budget, circuit depth limit, memory capacity, queue time, or resource-specific error rates; executing a reinforcement learning (RL) based orchestration agent configured to determine, for each fragment embedding Hamiltonian, (i) which portion of computational operations associated with the fragment is to be executed on the at least one classical computing system, and (ii) which portion of the computational operations is to be executed on the at least one QPU; selecting, by the RL-based orchestration agent, for each determined portion of computational operations, a solver type from among a plurality of solver types including at least a classical correlated solver, a quantum solver executable on the at least one QPU, and a machine-learning surrogate model, wherein the selecting is based on a learned routing policy trained to optimize a multi-objective reward function including at least accuracy of computed energies, computational resource usage cost, and execution time; routing each portion of computational operations to its respective selected solver type for execution on the classical computing system or the QPU; receiving execution results from the solvers including at least one of: correlated energies, reduced density matrices, entanglement spectra, or error estimates; and updating the learned routing policy of the RL-based orchestration agent based on the execution results to refine future determinations of which portions of computational operations are performed by the classical computing system and which portions are performed by the QPU.

In some aspects, the techniques described herein relate to a non-transitory computer-readable storage medium, wherein the hardware state data further includes at least one of real-time quantum device noise profiles, error-mitigation parameters, or calibration timestamps, and wherein the instructions further cause the RL-based orchestration agent to condition solver assignment decisions on the received noise profiles.

In some aspects, the techniques described herein relate to a non-transitory computer-readable storage medium, wherein the learned routing policy is trained using a multi-timescale update scheme including at least one of: fast updates based on surrogate-model error signals, medium-frequency updates based on classical correlated solver outputs, or slower, high-value updates based on quantum processing unit execution results.

In some aspects, the techniques described herein relate to a non-transitory computer-readable storage medium, wherein the multi-objective reward function further includes a hardware-utilization balancing term configured to reduce overload on a selected computational resource while maintaining overall throughput.

In some aspects, the techniques described herein relate to a non-transitory computer-readable storage medium, wherein the selecting of the solver type further includes adapting solver-specific configuration parameters including at least one of: convergence tolerance, active-space size, backend compiler optimization level, or error-mitigation strategy, based on the fragment features and the hardware state data.

In some aspects, the techniques described herein relate to a non-transitory computer-readable storage medium, wherein routing the portion of computational operations to the quantum processing unit includes mapping the fragment embedding Hamiltonian into a qubit-operator form using a fermion-to-qubit transformation selected from the group consisting of Jordan-Wigner, Bravyi-Kitaev, and qubit tapering, and optimizing the mapping for a topology of target quantum hardware.

In some aspects, the techniques described herein relate to a non-transitory computer-readable storage medium, wherein updating the learned routing policy based on the execution results includes computing one or more error gradients between predicted and observed solver performance and applying a reinforcement learning algorithm selected from the group consisting of policy-gradient methods, actor-critic methods, and Q-learning methods to adjust routing decisions for subsequent iterations.

In some aspects, the techniques described herein relate to a system for orchestrating execution of computational operations in a hybrid classical and quantum computing environment, the system including: at least one classical computing system including one or more processors and memory; and at least one quantum processing unit (QPU), wherein the at least one classical computing system is configured to: receive a plurality of fragment embedding Hamiltonians, each corresponding to a respective fragment of a molecular system and associated with one or more fragment features including at least one of predicted orbital correlation measures, estimated solver accuracy requirements, or estimated computational cost metrics; receive hardware state data for a plurality of available computational resources, the plurality of available computational resources including the at least one quantum processing unit and the at least one classical computing system, the hardware state data including at least one of current availability, qubit budget, circuit depth limit, memory capacity, queue time, or resource-specific error rates; execute a reinforcement learning (RL) based orchestration agent configured to determine, for each fragment embedding Hamiltonian, (i) which portion of computational operations associated with the fragment is to be executed on the at least one classical computing system, and (ii) which portion of the computational operations is to be executed on the at least one quantum processing unit; select, by the RL-based orchestration agent, for each determined portion of computational operations, a solver type from among a plurality of solver types including at least a classical correlated solver, a quantum solver executable on the at least one quantum processing unit, and a machine-learning surrogate model, wherein the selecting is based on a learned routing policy trained to optimize a multi-objective reward function including at least accuracy of computed energies, computational resource usage cost, and execution time; route each portion of computational operations to its respective selected solver type for execution on the classical computing system or the quantum processing unit; receive execution results from the solvers including at least one of: correlated energies, reduced density matrices, entanglement spectra, or error estimates; and update the learned routing policy of the RL-based orchestration agent based on the execution results to refine future determinations of which portions of computational operations are performed by the classical computing system and which portions are performed by the quantum processing unit.

In some aspects, the techniques described herein relate to a system, wherein the hardware state data further includes at least one of real-time quantum device noise profiles, error-mitigation parameters, or calibration timestamps, and wherein the classical computing system is further configured to condition solver assignment decisions on the received noise profiles.

In some aspects, the techniques described herein relate to a system, wherein the learned routing policy is trained using a multi-timescale update scheme including at least one of: fast updates based on surrogate-model error signals, medium-frequency updates based on classical correlated solver outputs, or slower, high-value updates based on quantum processing unit execution results.

In some aspects, the techniques described herein relate to a system, wherein the multi-objective reward function further includes a hardware-utilization balancing term configured to reduce overload on a selected computational resource while maintaining overall throughput.

In some aspects, the techniques described herein relate to a system, wherein selecting the solver type further includes adapting solver-specific configuration parameters including at least one of: convergence tolerance, active-space size, backend compiler optimization level, or error-mitigation strategy, based on the fragment features and the hardware state data.

In some aspects, the techniques described herein relate to a system, wherein routing the portion of computational operations to the quantum processing unit includes mapping the fragment embedding Hamiltonian into a qubit-operator form using a fermion-to-qubit transformation selected from the group consisting of Jordan-Wigner, Bravyi-Kitaev, and qubit tapering, and optimizing the mapping for a topology of target quantum hardware.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 3 is a flowchart depicting the steps for receiving molecular data, generating embeddings, predicting and applying compression parameters, and transmitting compressed Hamiltonians to quantum hardware.

FIGS. 6A-B are operational diagrams for predicting orbital entanglement, constructing entanglement graphs, and adaptively fragmenting molecular systems based on learned thresholds and quantum feedback.

FIGS. 8A-B are flowcharts of reinforcement learning-driven orchestration, showing fragment feature input, hardware state evaluation, solver assignment, and feedback-based policy updates.

DETAILED DESCRIPTION

Below are detailed descriptions of various concepts related to, and approaches, methods, apparatuses, and systems for implementing the various techniques described herein. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
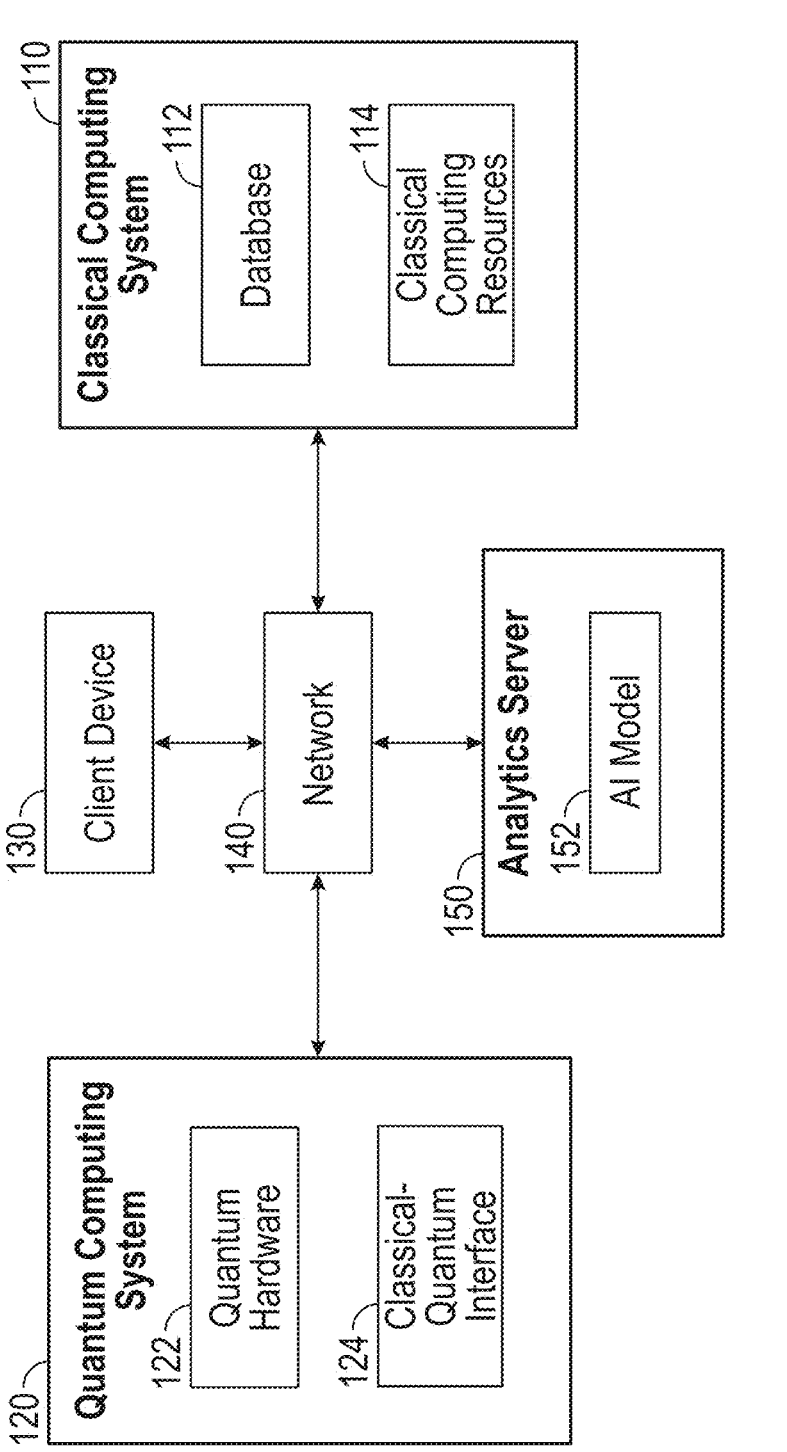
FIG. 1 is a block diagram of a hybrid quantum-classical computing environment, illustrating the integration of classical computing resources, quantum processing units, client devices, and orchestration servers.

FIG. 1 is a block diagram illustrating an example hybrid quantum-classical computing environment 100 suitable for implementing the systems and methods described herein, including the machine-learning-based electron repulsion integral (ERI) compression, quantum-enhanced entanglement prediction with adaptive fragmentation, and reinforcement-learning-driven hybrid solver orchestration. In the illustrated embodiment, the environment 100 includes a classical computing system 110, a quantum computing system 120, one or more client devices 130, a network 140, and an analytics server 150. Although one instance of each system element is depicted for purposes of clarity, multiple instances may be deployed, and their components may be physically or logically distributed.

The classical computing system 110 comprises a database 112 and a set of classical computing resources 114. The database 112 may store molecular structure data, basis set descriptors, precomputed reference results, training datasets, and intermediate outputs generated during fragment embedding, entanglement prediction, and compression processes. The classical computing resources 114 may include high-performance CPUs, GPUs, or other accelerators configured to execute correlated electronic structure solvers (e.g., coupled-cluster, density matrix renormalization group), machine-learning surrogate models, and portions of the orbital encoding and fragmentation algorithms. The classical computing system 110 may also host scheduling, orchestration, and post-processing modules for coordinating hybrid computations.

The quantum computing system 120 includes quantum hardware 122 and a classical-quantum interface 124. The quantum hardware 122 may be any suitable quantum processor based on superconducting qubits, trapped ions, photonics, or other architectures, and is configured to execute quantum algorithms such as variational quantum eigensolver (VQE) or quantum phase estimation (QPE) on fragment embedding Hamiltonians selected for quantum execution. The classical-quantum interface 124 may manage compilation, calibration, and execution of quantum circuits, provide hardware telemetry including qubit availability, circuit depth limits, and error rates, and facilitate bidirectional data exchange with the analytics server 150 and classical computing system 110.

The client device 130 may be a workstation, laptop, tablet, or other computing device used by an operator, researcher, or automated control system to submit simulation jobs, configure parameters for ERI compression and entanglement prediction, view hardware status, and retrieve computed results. The client device 130 communicates with other environment components via the network 140.

The network 140 may be any combination of local area networks (LANs), wide area networks (WANs), and public or private data links capable of securely transmitting data and control signals between the classical computing system 110, quantum computing system 120, client device 130, and analytics server 150. The network 140 may support standard protocols (e.g., TCP/IP, HTTP, gRPC) and may employ encryption or authentication mechanisms to protect sensitive scientific and resource-usage data.

The analytics server 150 hosts and executes an AI model 152 that, in various embodiments, implements multiple machine-learning components discussed herein. The AI model 152 may include: (i) a shared orbital encoder for generating atomic-orbital and molecular-orbital embeddings; (ii) a neural compression head for predicting ERI compression parameters; (iii) an entanglement prediction head for estimating orbital correlation measures and driving adaptive fragmentation; and (iv) a reinforcement-learning-based orchestration agent for assigning fragment workloads to QPUs, classical solvers, or surrogate models. The analytics server 150 may further implement multi-timescale training routines to update each model component based on feedback from quantum computation results, classical solver outputs, surrogate predictions, and reference datasets.

In operation, the environment 100 supports a complete hybrid quantum-classical simulation system. The client device 130 may initiate a simulation run by transmitting molecular geometry data and basis set descriptors to the classical computing system 110 and analytics server 150. The AI model 152 processes the input to generate orbital embeddings, predict entanglement measures, compress ERIs, and partition the molecular system into fragments. The reinforcement-learning orchestration logic within the AI model 152 selects execution paths for each fragment based on fragment features and real-time hardware state data from the classical computing system 110 and quantum computing system 120. Selected fragments are transmitted via the network 140 to the appropriate solver resource, either the classical computing resources 114, the quantum hardware 122 via the classical-quantum interface 124, or a surrogate model running locally or remotely. Execution results are returned through the network 140, stored in the database 112, and fed back into the AI model 152 to update model parameters for future runs. This architecture enables efficient, adaptive allocation of heterogeneous compute resources to accelerate and improve the accuracy of correlated electronic structure simulations.

In one illustrative embodiment, the system architecture shown in FIG. 1 is used to carry out fast, memory-efficient computation of ERIs during the electronic structure simulation of a large pharmaceutical drug molecule. The goal of this simulation is to evaluate excited-state properties of a macrocyclic ligand system bound to a transition metal, as part of a drug discovery sequence. A researcher initiates the simulation from a client device 130 by submitting the drug molecule's atomic coordinates and basis set descriptors over the network 140 to the analytics server 150 and the classical computing system 110. The analytics server 150 executes an AI model 152 that includes the shared orbital encoder and ERI compression head described in relation to FIGS. 3-5. The shared orbital encoder processes the input molecular geometry and basis metadata to generate both AO and molecular-orbital (MO) embeddings. Because the orbital encoder is part of a shared backbone, its learned embeddings are compatible with multiple heads, including the ERI compression head.

The ERI compression head takes the AO/MO embeddings as input and predicts low-rank factorization parameters for the molecule's two-electron integrals, selecting appropriate backend formats such as tensor hypercontraction (THC) or Cholesky decomposition based on molecule size, basis set type, and desired accuracy. These predicted compression parameters allow the ERIs to be represented in a compact form that reduces the $O(N^4)$ scaling of naïve storage to near $O(N^2R)$, where R is the decomposition rank.

Once compression parameters are predicted, the analytics server 150 uses the network 140 to forward them, along with the associated fragment embedding Hamiltonians, to the classical computing resources 114 within the classical computing system 110. The classical computing resources apply the chosen decomposition algorithm to the incoming ERI tensors and store the resulting compressed representation in the database 112 for downstream solver use. If certain fragments of the drug molecule are earmarked for execution on the quantum hardware 122, the compressed ERIs and one-electron integrals for those fragments are routed through the classical-quantum interface 124 in the quantum computing system 120, enabling the QPU to operate without having to generate or store the full ERI tensor.

Because the ERI compression head is trained end-to-end with the shared orbital encoder, improvements in embedding quality benefit compression accuracy for a wide variety of molecular structures (including heteroatom-rich macrocycles like those in this example). Using the architecture in FIG. 1, the pharmaceutical simulation completes ERI computation and preparation for all fragments in a fraction of the time and memory footprint required by conventional methods, while meeting the accuracy requirements necessary for reliable excited-state energy predictions.

In another illustrative embodiment, the system architecture shown in FIG. 1 is utilized to perform quantum-enhanced entanglement prediction and adaptive orbital fragmentation for the electronic structure simulation of a large biochemical enzyme. The enzyme's active site contains a multi-metal cluster surrounded by a dense network of polar amino acid residues, making accurate identification of the most strongly correlated orbitals essential to achieving tractable simulations. The user initiates the simulation from a client device 130, submitting three-dimensional atomic coordinates for the enzyme's active site and the chosen basis set descriptors via the network 140 to both the analytics server 150 and the classical computing system 110. The analytics server 150 executes an AI model 152 that incorporates the shared orbital encoder and an entanglement prediction head, as described in relation to FIGS. 6A-B. The shared orbital encoder transforms the raw molecular geometry and basis set metadata into AO and MO embeddings. These embeddings are unified learned representations which preserve spatial, energetic, and basis-specific features for downstream prediction tasks.

The entanglement prediction head processes the AO/MO embeddings to predict orbital-level correlation measures for the multi-metal cluster and surrounding amino acids. Predictions include single-orbital entropy values, which indicate the degree of mixedness in an orbital's reduced density matrix, and pairwise mutual information values between orbitals, which highlight strong electron correlation across orbital pairs. The initial prediction results are stored in the database 112 within the classical computing system 110 for later refinement.

To enhance accuracy, the analytics server 150 selects a subset of orbitals with high predicted correlation for direct quantum-hardware measurement. These orbitals are transmitted across the network 140 to the quantum computing system 120 through the classical-quantum interface 124. On the quantum hardware 122, correlation-measurement circuits, such as swap-test routines or reduced-density-matrix extraction algorithms, are executed. The quantum-derived entanglement metrics are returned through the network 140 to the analytics server 150, where they are incorporated into model training updates for the entanglement prediction head. This quantum-enhanced feedback aligns the learned correlation predictions with the real-world noise characteristics and topology constraints of the quantum device.

With the refined entanglement data, the analytics server 150 constructs an orbital entanglement graph, with nodes representing individual orbitals and edge weights corresponding to their predicted mutual information scores. Learned fragmentation thresholds are applied to partition the orbital set into three groups: an active set for high-accuracy correlated electronic structure calculations; a bath set for orbitals that strongly interact with the active space but can be treated at a moderate level of theory; and an environment set for orbitals weakly correlated with the active space that can be treated with approximate or mean-field methods.

Because the entanglement prediction head operates within the shared-backbone AI model 152 on the analytics server 150, improvements in embedding quality and correlation prediction benefit fragmentation accuracy for a wide range of molecular systems. In this biochemical enzyme example, the adaptive fragmentation process reduces the number of orbitals assigned to high-accuracy correlated calculation by more than half, while sustaining the precision required to capture subtle electronic effects at the multi-metal active site. This reduction in active-space size significantly decreases computational resource usage and simulation time in the hybrid quantum-classical computing environment shown in FIG. 1.

In yes another illustrative embodiment, the system architecture depicted in FIG. 1 is used to dynamically orchestrate fragment execution for the electronic structure simulation of a high-performance aerospace composite material. The composite consists of a complex polymeric matrix reinforced with carbon-nanotube bundles, making it necessary to distribute computational workloads strategically between quantum processors, classical correlated solvers, and surrogate models to achieve both accuracy and efficiency.

An engineer initiates the simulation from a client device 130 by uploading the composite system's molecular geometry and basis set descriptors via the network 140 to the analytics server 150 and classical computing system 110. Prior to orchestration, upstream modules in the AI model 152, including the shared orbital encoder, entanglement prediction head, and ERI compression head described herein (process the raw data to produce fragment embedding Hamiltonians along with fragment features). Fragment features include predicted orbital correlation measures, bath size, uncertainty estimates, and hardware-aware computational cost metrics.

The analytics server 150 hosts a reinforcement-learning (RL)-based orchestration agent within the AI model 152. This agent ingests the fragment features along with real-time hardware state data retrieved from the classical computing system 110 and quantum computing system 120. Hardware state data includes QPU availability, current qubit budget, maximum circuit depth permitted for stable execution, QPU queue time, device-specific error rates, and the current load and memory capacity of the classical computing resources 114. The resource telemetry is passed over the network 140 to the analytics server 150, where it is combined with fragment features to form the input state vector for the RL agent.

The RL orchestration agent evaluates this state vector and outputs a solver assignment decision for each fragment. Decisions allocate computational operations either to high-accuracy quantum processing on the quantum hardware 122 through the classical-quantum interface 124, to execution on classical correlated solvers within the classical computing resources 114, or to prediction by machine-learning surrogate models running on the analytics server 150 or on separate compute nodes.

For example, small fragments containing tightly correlated orbitals within carbon-nanotube junction sites are assigned to quantum execution to capture subtle entanglement effects. Fragments of moderate size with medium correlation, such as polymer chain segments interacting with the nanotubes, are routed to classical correlated solvers utilizing coupled-cluster or density-matrix-renormalization-group algorithms. Large fragments from the bulk polymer matrix with low orbital correlation are directed to surrogate models that predict their contribution to bulk electronic properties via fast regression over compressed ERI features.

Once execution is complete, results from the QPU, classical solvers, and surrogate models are returned over the network 140 to the analytics server 150. Returned outputs include correlated energies, reduced density matrices, entanglement spectra, error bars, and model-estimated uncertainty values. These execution results are aggregated into a performance feedback dataset within the analytics server 150.

The RL orchestration agent uses this performance feedback to compute a multi-objective reward for each solver assignment. In this example, the reward function balances three criteria: minimizing energy error relative to high-fidelity reference calculations, reducing the cost of QPU usage measured in hardware occupation time, and minimizing total latency, which includes both queue delays and solver runtime. The reward signal is used to update the RL agent's routing policy, with faster update cycles applied to surrogate path decisions, medium-rate updates applied to classical solver assignments, and slower updates applied to QPU resource allocations (aligning update timescales with the cost and reliability of each solver path).

Over multiple orchestration cycles, the RL agent learns to route expensive quantum resources toward fragments where they deliver the largest accuracy gains, schedule classical solvers on workloads that maximize throughput without exceeding latency constraints, and assign low-impact workloads to surrogates without violating pre-defined error tolerances. In the aerospace composite material example, this adaptation reduces QPU runtime by approximately one-third and overall simulation wall-clock time by more than 20% compared to a static allocation strategy, while maintaining the accuracy needed to reliably predict the composite's electronic conductivity and thermal stability.

Figure 2:
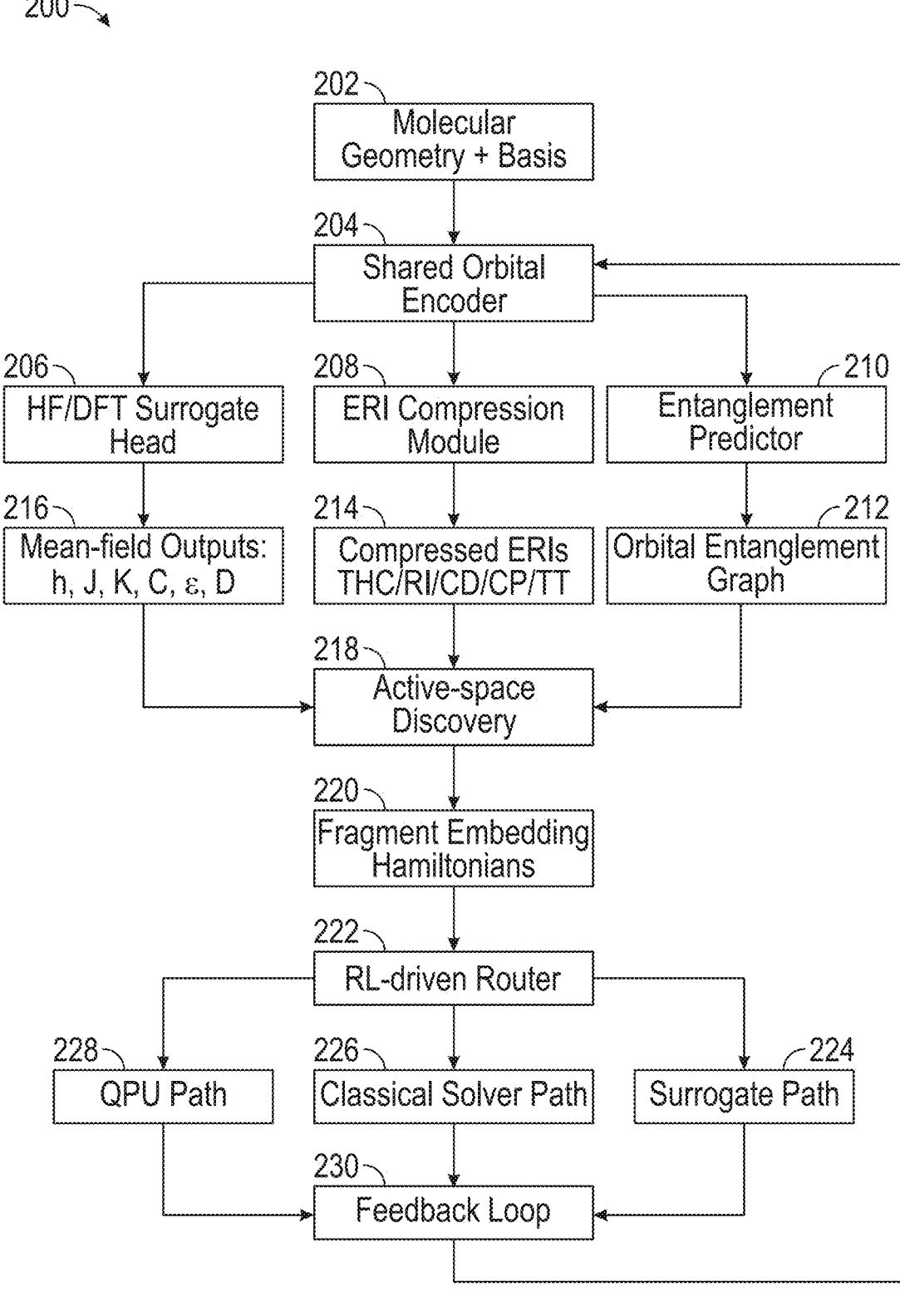
FIG. 2 is a sequence diagram showing the process of generating orbital embeddings, compressing Hamiltonians, predicting entanglement, fragmenting molecules, and routing fragments to appropriate solvers.

FIG. 2 is a block diagram illustrating an example hybrid quantum-classical sequence 200 for performing electronic structure simulations using machine-learning-driven compression, entanglement prediction, and adaptive fragment routing. In the illustrated embodiment, the sequence integrates multiple computational modules that operate within a shared-backbone neural architecture. In some embodiments, this architecture receives molecular input data, generates orbital feature encodings, predicts and applies compression parameters for electron repulsion integrals, determines orbital entanglement structure, assembles fragment-embedding Hamiltonians, and orchestrates execution paths across heterogeneous compute resources, including QPUs, classical correlated solvers, and machine-learning surrogate models.

At block 202, the system obtains molecular geometry data and basis set descriptors for a target molecular system. The molecular geometry data can include atomic positions, atomic numbers, and connectivity information. The basis set descriptors can specify the basis set type, contraction pattern, exponents, and angular momentum components that define the orbital representation. The data can be received from a client device, a local storage location, or a remote repository via an application programming interface (API).

At block 204, the received molecular geometry data and basis set descriptors are processed by a shared orbital encoder. In some embodiments, the shared orbital encoder comprises a graph neural network (GNN) configured to operate on atom-level features, bond-level features, and basis set metadata to produce high-dimensional embeddings representing each AO and MO in the system. In some embodiments, these embeddings form a unified learned feature space that can be consumed by multiple downstream task-specific heads.

One downstream path, shown at block 206, corresponds to a HF/DFT surrogate head that is configured to produce mean-field electronic structure outputs. This head can predict, directly from the AO and MO embeddings, values such as one-electron integrals h, Coulomb matrices J, exchange matrices K, Fock matrix coefficients C, orbital energies &, and density matrices D. These mean-field outputs are indicated at block 216 and can be used to initialize or warm-start other simulation stages. They can also reduce computational overhead by avoiding separate self-consistent field (SCF) calculations.

Another downstream path (to the block 204), shown at block 208, corresponds to an ERI compression module. This module receives the AO and MO embeddings from the shared orbital encoder and predicts compression parameters for two-electron integrals using a neural compression head. The predicted compression parameters are compatible with multiple low-rank factorization back-ends, including tensor hypercontraction (THC), resolution-of-identity (RI), Cholesky decomposition (CD), canonical polyadic (CP) decomposition, and tensor train (TT) representations. At block 214, the system applies the predicted parameters to the original two-electron integrals to produce compressed ERIs. This reduces the size of the integrals while retaining the accuracy required for correlated calculations.

A third downstream path, shown at block 210, corresponds to an entanglement predictor. This module uses the AO and MO embeddings to estimate orbital entropies and pairwise mutual information values that capture the degree of quantum correlation between orbitals. At block 212, the output is an orbital entanglement graph in which nodes represent orbitals and weighted edges represent predicted entanglement strengths.

At block 218, the sequence performs active-space discovery. In this step, the system may integrate the compressed ERIs from block 214 and the system may determine which orbitals should be classified as active, bath, or environment for the simulation. In some embodiments, thresholds for active-space selection can be learned and dynamically adapted based on molecule size, basis set, and correlation metrics.

At block 220, the sequence constructs fragment embedding Hamiltonians for each fragment. These embedding Hamiltonians incorporate intra-fragment terms from the compressed ERIs, mean-field terms, and effective potentials representing the coupling to bath and environment orbitals. They are dimensioned and mapped according to constraints of the intended execution hardware, including qubit count limits, circuit depth budgets, and connectivity graphs.

At block 222, a reinforcement-learning-driven router determines the execution path for each fragment embedding Hamiltonian. The router evaluates fragment complexity, correlation strength, and hardware resource status to assign execution to one of three branches. The first branch, shown at block 228, is a QPU path in which the fragment is mapped to a quantum processing unit for execution using quantum chemistry algorithms such as Variational Quantum Eigensolver (VQE) or Quantum Phase Estimation (QPE). The second branch, shown at block 226, is a classical solver path in which the fragment is processed by classical correlated methods such as Coupled Cluster or Density Matrix Renormalization Group. The third branch, shown at block 224, is a surrogate path in which fragment properties are estimated using trained machine-learning surrogate models for low-priority fragments.

At block 230, the outputs from each path are collected into a feedback loop. In some embodiments, the feedback loop updates the shared orbital encoder, ERI compression head, entanglement predictor, and RL router based on multi-timescale supervisory signals derived from QPU results such as reduced density matrices and entanglement spectra, classical solver outputs such as correlated energies and RDMs, and surrogate predictions. This continuous improvement process enhances prediction accuracy, compression efficiency, and routing decisions over time, adapting to new molecular systems and evolving hardware capabilities.

The sequence 200 of FIG. 2 integrates molecular feature extraction, learned compression, entanglement-based fragmentation, and adaptive routing to enable practical and scalable hybrid quantum-classical simulation of large, complex molecular systems.

FIG. 3 illustrates an operational block diagram of an example method 300 for performing learned multi-electron integral compression within a shared-backbone orbital encoding architecture in a hybrid quantum-classical computing system, in accordance with an illustrative embodiment of the methods and systems discussed herein. In the illustrated embodiment, the method 300 includes steps 302 through 312; however, in other embodiments, additional or alternative steps may be performed, and one or more steps may be omitted without departing from the scope of the methods and systems discussed herein. The method 300 is described as being executed by at least one processors (e.g., one or more processors of a classical computing system), such as a server in a hybrid quantum-classical environment, but any suitable computing device or distributed set of computing devices with access to the required molecular input data and factorization models may perform one or more of the operations discussed with respect to FIG. 3.

At step 302, at least one processor of the classical computing system receives molecular geometry data and basis set descriptors for a target molecular system. In some embodiments, the molecular geometry data include atomic positions in Cartesian or fractional coordinates, atomic numbers specifying the element type of each atom, and connectivity information specifying covalent or non-covalent bonding. The basis set descriptors define the mathematical functions used to represent the atomic orbitals, and may specify a basis set name or identifier (e.g., STO-3G, 6-31G*, cc-pVDZ), contraction coefficients, exponents, angular momentum components, and any polarization or diffuse functions to be included. In some embodiments, this step provides the chemical and mathematical definitions necessary for downstream orbital encoding and compression parameter prediction.

At step 304, the at least one processor executes an orbital encoder to transform the molecular geometry data and basis set descriptors into AO and MO embeddings. In some embodiments, the orbital encoder comprises a GNN or similar architecture configured to process atom-level features, bond connectivity, and basis function metadata to produce high-dimensional numerical feature vectors for each AO and MO. The AO embeddings may capture localized orbital properties (e.g., spatial centers, angular momentum, overlap patterns), while the MO embeddings represent delocalized orbitals formed as linear combinations of AOs, optionally including coefficients and energies estimated from mean-field models. The generation of consistent AO and MO embeddings provides a unified learned representation that feeds multiple downstream task-specific heads within a shared-backbone architecture.

At step 306, the at least one processor provides the AO and MO embeddings to a neural compression head downstream from the orbital encoder. In some embodiments, the neural compression head is configured to transform these embeddings into a parameter representation suitable for predicting low-rank factorizations of two-electron integrals. In some embodiments, the compression head includes fully connected layers, attention mechanisms, or other neural modules trained to align the learned orbital features with back-end-specific compression requirements. By operating within the shared-backbone framework, the compression head benefits from orbital representations that are already enriched with spatial, energetic, and basis-specific context.

At step 308, the neural compression head predicts compression parameters for two-electron integrals associated with the molecular Hamiltonian. The predicted parameters are compatible with multiple low-rank factorization back-ends, including tensor hypercontraction (THC), resolution-of-identity (RI), Cholesky decomposition (CD), canonical polyadic (CP) decomposition, and tensor train (TT) decomposition. The parameters may include factor matrices, decomposition ranks, transformation matrices, or index mappings that enable approximation of the four-index integral tensor in a reduced-dimensional form. In some embodiments, the prediction is performed in a molecule-specific, learned manner rather than by applying static heuristics, allowing improved efficiency and accuracy across diverse chemical systems.

At step 310, the processor applies the predicted compression parameters to the two-electron integrals using a compression module executed on the classical computing system. The compression module implements the selected low-rank factorization algorithm and produces a compressed representation of the molecular Hamiltonian that retains the fidelity necessary for correlated electronic structure calculations while reducing storage size and computational cost. In some embodiments, the compression process may exploit integral symmetry or sparsity and may be parallelized or hardware-accelerated for throughput.

At step 312, the processor transmits the compressed Hamiltonian representation to a QPU for execution of correlated electronic structure calculations. This may include translating fermionic operators into qubit operators via Jordan-Wigner, Bravyi-Kitaev, or other mappings, and formatting the data for a QPU-native interface such as OpenQASM or Quil. Metadata describing the compression back-end, factorization parameters, and orbital indexing may be transmitted alongside to enable correct reconstruction on-device. By sending a compact, computation-ready Hamiltonian to the QPU, the method enables resource-efficient quantum execution as part of a hybrid quantum-classical sequence.

Figure 4:
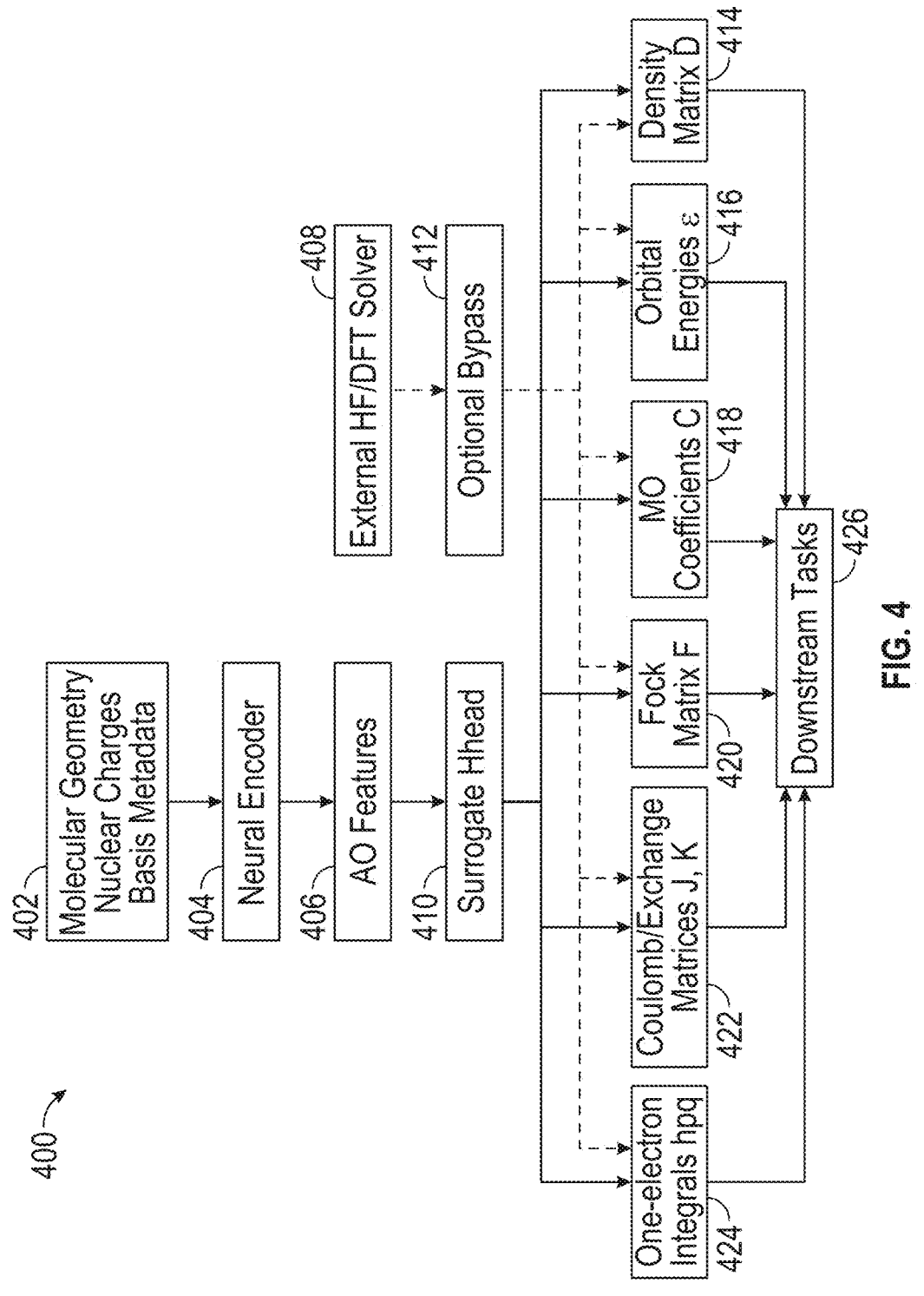
FIG. 4 is a diagram illustrating the generation of mean-field electronic structure quantities using a shared orbital encoder and neural surrogate head, with optional external solver integration.

FIG. 4 is a block diagram illustrating an example sequence 400 for generating mean-field electronic structure quantities from molecular input data, in accordance with at least some embodiments of the methods and systems discussed herein. In the illustrated embodiment, the sequence 400 may obtain molecular geometry, nuclear charge, and basis set metadata (block 402), process this data through a shared orbital encoder (block 404) to produce learned AO features (block 406), and then generate mean-field outputs using either a neural surrogate head (block 410) or results from an external Hartree-Fock/Density Functional Theory (HF/DFT) solver (block 408). An optional bypass stage (block 412) allows external solver results to selectively replace surrogate predictions for one or more quantities. The resulting mean-field outputs (blocks 414-424) are then made available to downstream tasks (block 426) such as electron-repulsion integral computation, Hamiltonian compression, entanglement prediction, and fragment embedding.

At block 402, at least one processor obtains molecular input including: (i) geometry data specifying atomic positions in Cartesian or fractional coordinates, atomic indices, and bonding topology; (ii) nuclear charges derived from atomic numbers or explicitly defined for charged or ionized systems; and (iii) basis set metadata describing the mathematical functions used to represent atomic orbitals. The basis metadata may comprise a basis set identifier (e.g., STO-3G, 6-31G*, cc-pVDZ), angular momentum components, contraction coefficients, primitive exponents, and optional polarization or diffuse functions. The input may be received via a local file, application programming interface (API), or other data source.

At block 404, the at least one processor executes a shared-backbone orbital encoder configured to transform the molecular input into a high-dimensional learned representation. In some embodiments, the encoder is implemented as a graph neural network (GNN) or related architecture operating on atom-level features, bond-level features, and basis set descriptors. The encoder produces embeddings capturing spatial, energetic, and basis-function attributes necessary for downstream mean-field prediction.

At block 406, the processor generates AO features from the encoder output. These AO features may be represented as vectors, matrices, or tensors containing localized orbital properties such as basis function parameters, center coordinates, and overlap characteristics. In some embodiments, the encoder may also produce molecular orbital (MO) embeddings for use by other downstream heads in the shared backbone.

At block 410, the AO features are provided as input to a surrogate HF/DFT head. The surrogate head comprises one or more neural layers (e.g., fully connected, convolutional, attention-based) trained to map the AO features to a plurality of target mean-field quantities, including: one-electron integrals $h_{pq}$ (block 424), Coulomb matrices J and exchange matrices K (block 422), Fock matrix F (block 420), molecular orbital coefficients C (block 418), orbital energies ε (block 416), and the density matrix D (block 414). The surrogate head is trained using supervised learning on reference HF/DFT datasets spanning many molecules and basis sets.

At block 408, the processor may alternatively invoke an external HF/DFT solver (such as Gaussian, NWChem, or Psi4) to compute the same mean-field quantities using a self-consistent field procedure. This path provides reference-quality results at higher computational cost.

At block 412, an optional bypass mechanism may be applied. In some embodiments, the processor selectively replaces one or more surrogate-predicted quantities with corresponding values computed by the external HF/DFT solver. This can be configured per-quantity, per-molecule, or based on accuracy requirements, enabling mixed-source mean-field data.

Blocks 414 through 424 illustrate specific mean-field outputs. At block 414, the density matrix D is generated. At block 416, orbital energies ε are output. At block 418, molecular orbital coefficients C are provided. At block 420, the Fock matrix F is produced. At block 422, Coulomb matrices J and exchange matrices K are generated. At block 424, one-electron integrals $h_{pq}$ are output. These data are made available in memory, persisted to storage, or transmitted to subsequent processing stages.

At block 426, the outputs are supplied to downstream hybrid quantum-classical simulation tasks. Examples include generation and compression of two-electron (or other numbers) integrals (as in FIG. 3), entanglement prediction and active-space discovery (as in FIG. 2), fragment embedding Hamiltonian assembly, and execution routing to quantum processors, classical solvers, or surrogate models. The ability to flexibly choose between surrogate and external HF/DFT sources for mean-field data allows the sequence 400 to balance computational cost against accuracy, improving throughput without sacrificing compatibility with established computational chemistry methods.

Figure 5:
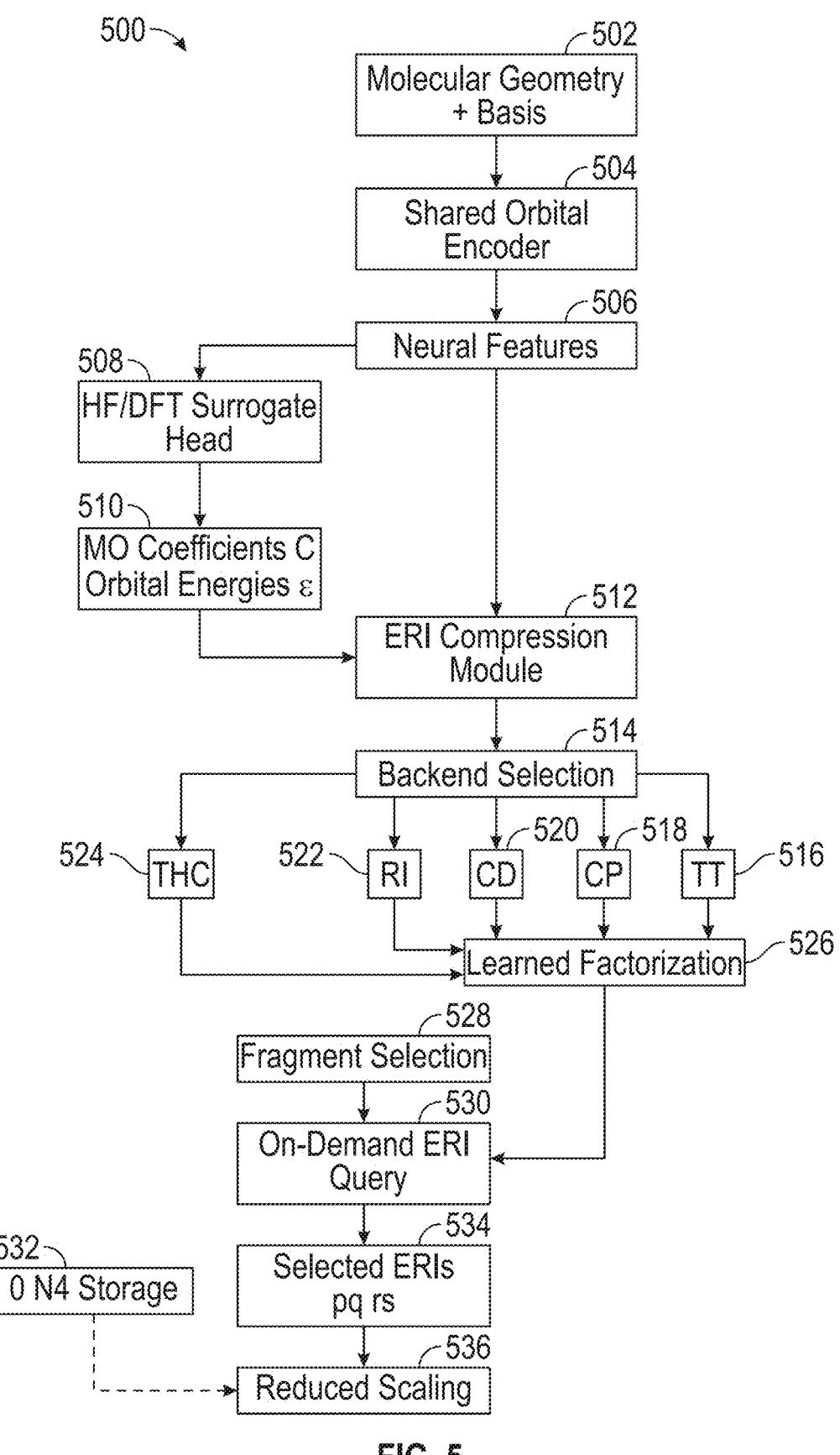
FIG. 5 is a sequence for learned electron repulsion integral (ERI) compression, including backend selection, fragment targeting, and on-demand ERI queries for reduced computational scaling.

FIG. 5 is a block diagram illustrating an example sequence 500 for performing learned electron-repulsion-integral (ERI) compression within a hybrid quantum-classical simulation system, in accordance with at least some embodiments of the methods and systems discussed herein. In the illustrated embodiment, the sequence 500 includes steps 502 through 536; however, additional or alternative steps may be performed in other embodiments, and one or more steps may be omitted without departing from the scope of the methods and systems discussed herein. The sequence begins by receiving molecular and basis set inputs, extracting shared neural orbital features, optionally incorporating mean-field outputs from a Hartree-Fock/Density Functional Theory (HF/DFT) surrogate head, predicting compression parameters through an ERI compression module, selecting an appropriate low-rank factorization backend, targeting fragments for compression, and executing on-demand ERI queries to produce reduced-scaling outputs for downstream correlated electronic structure calculations.

At block 502, at least one processor obtains molecular geometry data and basis set descriptors for a target system. The molecular geometry may include element types, atomic numbers, positions in Cartesian or fractional coordinates, and connectivity relationships. The basis set descriptors may define identifiers (e.g., STO-3G, cc-pVDZ), contraction schemes, angular momentum quantum numbers, primitive exponents, and optional polarization or diffuse functions. This information may be retrieved from local or remote storage, an API, or a client application.

At block 504, the processor executes a shared-backbone orbital encoder to transform the geometry and basis information into a learned molecular representation. In some embodiments, the orbital encoder comprises a graph neural network (GNN) or other deep neural architecture configured to process atom-level and basis-level features in the context of molecular connectivity.

At block 506, the shared orbital encoder outputs neural feature embeddings describing the AO and MO spaces. These features incorporate spatial, energetic, and basis-specific context needed for downstream ERI compression.

At block 508, the processor may execute an HF/DFT surrogate head to predict selected mean-field outputs (e.g., molecular orbital coefficients C and orbital energies ε) directly from the neural features. The outputs of block 508 are shown at block 510 and can be used as auxiliary inputs to guide compression by representing the occupied-virtual structure of the system without running a full HF/DFT procedure.

At block 512, the ERI compression module receives the encoder features (and optionally the surrogate mean-field outputs at block 510) and applies a neural compression head trained to predict molecule-specific parameters for low-rank factorization of the four-index electron-repulsion integral tensor. The predicted parameters are compatible with multiple supported backends.

At block 514, the processor performs an adaptive backend selection step. In some embodiments, available factorizations include canonical polyadic (CP) decomposition (block 516), Cholesky decomposition (CD) (block 520), resolution-of-identity (RI) (block 522), tensor hypercontraction (THC) (block 524), and tensor-train (TT) decomposition (block 518). The choice may depend on molecular size, basis set type, desired accuracy, downstream solver requirements, or hardware capability.

At block 528, the processor executes a fragment selection stage that identifies particular fragments or orbital subsets relevant to the correlated calculation. Selecting only the necessary sub-blocks of the ERI tensor reduces computational and storage burden.

At block 526, the processor applies the learned factorization corresponding to the chosen backend method from block 514, using the predicted compression parameters to perform the actual low-rank decomposition of the selected fragment's integrals.

At block 530, the system supports on-demand ERI queries, reconstructing or evaluating only those integrals required at a given solver call rather than precomputing and storing the entire $O(N^4)$ integral tensor.

At block 532, the method eliminates full $O(N^4)$ storage of ERIs by keeping only the compressed factorization output (e.g., factor matrices, transformation tensors, and decomposition ranks). In some embodiments, this compact representation reduces memory footprint and improves I/O performance.

At block 534, the processor provides the selected ERIs (either in compressed form or reconstructed for specific indices (pq||rs)) to downstream correlated electronic structure modules such as fragment-embedding Hamiltonian construction, quantum algorithm execution on QPUs, or classical coupled-cluster and DMRG solvers.

At block 536, the ERI compression pipeline yields reduced scaling in both computation and storage, enabling the hybrid quantum-classical system to process significantly larger, more complex molecular systems than would be feasible using conventional ERI computation and storage techniques. In some embodiments, by combining shared-backbone neural orbital encoding, learned compression parameter prediction, adaptive backend selection, fragment targeting, and on-demand reconstruction, the sequence 500 achieves high-accuracy ERI compression with substantial reductions in resource usage, without sacrificing the fidelity required for chemically accurate correlated simulations.

Non-Limiting Example

In one non-limiting embodiment, the methods and systems discussed herein are applied to prepare a compressed electronic Hamiltonian for a medium-sized organic molecule. The example molecule is a 20-atom conjugated structure represented in a 6-31G* basis set with diffuse functions on heteroatoms, resulting in 180 atomic orbitals. The goal of the sequence is to generate backend-ready compressed two-electron integrals for use in a hybrid quantum-classical correlated simulation.

First, at the receiving stage, a client workstation submits a simulation request to the hybrid simulation server using a programmatic API. The request contains the complete molecular geometry, which is specified as atomic positions in Cartesian coordinates along with atomic numbers and connectivity information. The request also includes a basis set descriptor specifying the 6-31G* basis with designated diffuse functions. The server validates the input to ensure the geometry is chemically plausible and confirms that the basis set parameters are available for all element types present in the system.

Next, the server invokes the shared-backbone orbital encoder to process the molecular geometry and basis set descriptors. The encoder is implemented as a graph neural network with attention mechanisms and is configured to produce high-dimensional AO and MO embeddings. These embeddings encode spatial features, angular momentum characteristics, basis function exponents, overlap patterns, and approximate energetic ordering of the orbitals. Because the encoder is part of a shared backbone, these learned representations are compatible with multiple downstream prediction heads within the system.

The AO and MO embeddings are then optionally provided to a surrogate Hartree-Fock/Density Functional Theory (HF/DFT) head. This surrogate head predicts mean-field quantities, including molecular orbital coefficients and orbital energies, directly from the learned orbital embeddings. For this example, the surrogate HF/DFT head produces these quantities within milliseconds, eliminating the need to perform a separate Hartree-Fock self-consistent field calculation that would otherwise take several seconds. The surrogate outputs are then stored and made available as optional context for the compression process.

The AO/MO embeddings, along with the surrogate outputs, are then provided as input to the ERI compression module. This module contains a neural compression head that has been trained on large datasets of precomputed integrals from chemically diverse molecules. The head outputs molecule-specific compression parameters, including factor matrices, decomposition ranks, basis transformation matrices, and index mappings, in a form that is independent of the choice of backend factorization algorithm.

The system then performs a backend selection operation to choose the most suitable low-rank factorization method for the current molecule and accuracy target. For this particular example, the algorithm selects tensor hypercontraction (THC) because it provides the desired correlation-energy accuracy while minimizing memory requirements for the given system size and basis set. Backend selection can also account for available memory, hardware architecture, and solver compatibility.

After backend selection, the compression sequence performs fragment targeting. Because the molecule will be split into embedded fragments for correlated calculations, only the orbitals relevant to the active and bath spaces of each fragment are targeted for ERI computation. This reduces the scope of the compression process to three fragments, each containing fewer than 40 orbitals, which eliminates the need to calculate or store the remaining integrals. For each targeted fragment, the learned factorization associated with the chosen backend is applied. Using the predicted THC compression parameters, the system performs a low-rank decomposition of the relevant sub-blocks of the ERI tensor. This produces a compact factorized representation that scales with the square of the number of orbitals, multiplied by the decomposition rank, instead of scaling with the fourth power of the number of orbitals.

The compressed ERI representation is stored in memory. When a downstream solver requests a specific set of integrals, the on-demand ERI query mechanism reconstructs only those integrals from the compressed form rather than expanding the entire tensor. This avoids the overhead of precomputing all integrals and storing them in full form. In some embodiments, once the neural compression head has generated compression parameters for a given molecular geometry and basis set, the system stores these parameters in association with a unique molecular identifier in a database or memory. When a subsequent simulation request is received for a molecule with the same or a similar geometry and basis set, the system can retrieve the previously stored compression parameters and apply them directly, bypassing the need to recompute the low-rank factorization. This reuse of compression parameters not only accelerates repeated simulations of chemically similar systems but also ensures consistency in the compression approach across related computational tasks. Furthermore, the system may adapt stored parameters for molecules with minor variations, further reducing computational overhead. As a result, the ability to store and reuse compression parameters enables efficient scaling to large datasets and supports high-throughput quantum chemistry sequences.

Finally, the compressed one- and two-electron terms are assembled into fragment embedding Hamiltonians and transmitted to downstream solvers. In this example, highly correlated small fragments are sent to a quantum processing unit for execution with a quantum chemistry algorithm, while larger or less-correlated fragments are sent to a classical coupled-cluster solver. By eliminating the need to calculate, store, and manipulate a full $O(N^4)$ ERI tensor, the system reduces memory usage and reduces ERI computation time.

This non-limiting example demonstrates how the shared-backbone orbital encoder, in combination with the HF/DFT surrogate head and the ERI compression head, produces compact and accurate ERI representations in a molecule-specific and backend-agnostic fashion. By integrating adaptive backend selection, fragment targeting, and on-demand querying, the system enables accurate correlated electronic structure simulations for molecular systems that would be computationally intractable using conventional ERI generation and storage methods.

FIGS. 6A-B illustrate operational block diagrams of an example method 600 for predicting orbital entanglement and performing adaptive fragmentation within a shared-backbone orbital encoding architecture in a hybrid quantum-classical computing system, in accordance with an illustrative embodiment of the methods and systems discussed herein. In the illustrated embodiment, the method 600 includes steps 602 through 620; however, in other embodiments, additional or alternative steps may be performed, and one or more steps may be omitted without departing from the scope of the methods and systems discussed herein. The method 600 is described as being executed by at least one processor (e.g., one or more processors of a classical computing system), such as a server operating in a hybrid quantum-classical environment, but any suitable computing device or distributed set of computing devices with access to the required molecular input data, quantum-correlation metrics, and fragmentation models may perform one or more of the operations discussed with respect to FIGS. 6A-B.

At step 602, at least one processor of a classical computing system may receive molecular geometry data and basis set descriptors. In some implementations, at least one processor of a classical computing system may receive molecular geometry data and basis set descriptors for a target molecular system. The molecular geometry data can include, but is not limited to, the three-dimensional coordinates of each atom in Cartesian or fractional form, atomic numbers or nuclear charges denoting elemental identity, and optional connectivity information indicating covalent, ionic, or non-covalent bonding between atoms. The basis set descriptors can define the mathematical functions used to represent atomic and molecular orbitals, and may include the basis set name or identifier (for example, STO-3G, 6-31G*, cc-pVDZ), contraction coefficients, exponents, angular momentum components, and any applied polarization or diffuse functions.

The at least one processor may receive the molecular geometry data and basis set descriptors in a structured file format such as JavaScript Object Notation (JSON), extensible markup language (XML), HDF5, or a domain-specific quantum chemistry format (for example, Gaussian input files, NWChem formats). In some embodiments, the at least one processor may obtain the data from local storage, a remote database, a network-accessible data repository, a simulation management system, or directly from a client device submitting a simulation request through an application programming interface (API) or graphical user interface (GUI). Upon receipt, the processor may validate the molecular geometry for physical plausibility (for example, reasonable interatomic distances) and confirm that the basis set descriptors correspond to supported or available parameter libraries. The received molecular geometry data and basis set descriptors provide the fundamental chemical and mathematical definitions required for the subsequent orbital encoding, entanglement prediction, and adaptive fragmentation operations.

At step 604, at least one processor may generate, executing an orbital encoder, AO and MO embeddings from the molecular geometry data and basis set descriptors. In some implementations, at least one processor of the classical computing system may generate, by executing an orbital encoder, AO and MO embeddings from the molecular geometry data and basis set descriptors. The orbital encoder may comprise a machine-learning model, such as a GNN, transformer-based architecture, or another deep-learning network, configured to process chemical structure and basis function information. The model may treat atoms, orbitals, and their connectivity as nodes and edges in a graph, allowing the encoder to capture both local atomic-level features and extended molecular context.

Execution of the orbital encoder by the processor may include mapping raw inputs (e.g., atomic positions, nuclear charges, basis function exponents, contraction coefficients, angular momentum components, and polarization or diffuse functions) into a high-dimensional latent feature space. The AO embeddings may represent localized orbital characteristics, including spatial orientation, localization center, and overlap trends with neighboring orbitals. The MO embeddings may represent delocalized molecular orbitals obtained through a learned transformation or projection of the AO space, capturing features such as linear-combination coefficients, estimated orbital energies, and electron density distributions.

In some embodiments, the orbital encoder may be pre-trained on a large corpus of molecules with known electronic structure properties and subsequently fine-tuned using task-specific labels, such as entanglement metrics or integral decompositions. The generated AO and MO embeddings may be unified in dimensionality and format to allow their use as input to multiple downstream functional heads, including the entanglement prediction head used in adaptive fragmentation, the Hamiltonian compression head, or other correlated property predictors. By encoding the raw molecular geometry and basis information into chemically meaningful but compact numerical representations, the orbital encoder enables subsequent processing stages to operate efficiently while retaining the fidelity of the physical and chemical description of the system.

At step 606, at least one processor may provide the AO and MO embeddings to an entanglement prediction head downstream from the orbital encoder. In some implementations, at least one processor of the classical computing system may provide the AO and MO embeddings generated by the orbital encoder to an entanglement prediction head downstream from the orbital encoder. The act of providing may include passing the AO and MO embeddings directly through an internal data interface or memory buffer within a shared-backbone neural architecture, thereby preserving the numerical precision and structural relationships captured by the encoder. In some embodiments, the AO and MO embeddings may be concatenated, pooled, normalized, or otherwise transformed by the processor into a format optimized for the input specifications of the entanglement prediction head.

The entanglement prediction head may comprise one or more neural network layers, such as fully-connected layers, attention mechanisms, or specialized architectures for pairwise feature interaction, which are configured to interpret the provided embeddings in the context of predicting orbital-level quantum correlation metrics. By receiving embeddings that encode both localized AO and delocalized MO orbital features, the entanglement prediction head can simultaneously leverage local chemical environment information and global orbital interaction patterns in estimating entanglement.

In certain implementations, the provision of AO and MO embeddings to the entanglement prediction head may occur as part of a multi-head learning framework, where the embeddings are supplied concurrently to other task-specific heads that operate in parallel, such as a Hamiltonian compression head. The downstream entanglement prediction head may thus utilize a consistent, shared representation of the molecular orbital space, enabling direct comparability of results and more efficient co-training. This provision step preserves the learned chemical context generated by the orbital encoder and makes it available for the specialized task of entanglement estimation and adaptive fragmentation.

At step 608, at least one processor may predict, using the entanglement prediction head executed, orbital entanglement measures including at least one of single-orbital entropy values, or pairwise mutual information values between orbitals. In some implementations, at least one processor of the classical computing system may predict, using the entanglement prediction head executed by the processor, orbital entanglement measures including at least one of single-orbital entropy values or pairwise mutual information values between orbitals. The entanglement prediction head may operate on the AO and MO embeddings provided by the orbital encoder and compute numerical estimates that quantify the degree of quantum correlation between orbitals in the molecular system.

In certain embodiments, the single-orbital entropy value for a given orbital may represent an information-theoretic measure of the mixedness of that orbital's reduced density matrix, which can be used to identify orbitals that participate significantly in static correlation effects. The pairwise mutual information value between a pair of orbitals may represent the reduction in uncertainty about the state of one orbital that can be gained from knowing the state of the other orbital, and serves as an indicator of orbital-to-orbital entanglement or correlation strength.

In some embodiments, the entanglement prediction head may comprise layers or modules configured to capture both direct and higher-order relationships between orbitals, such as bilinear interaction layers, attention mechanisms, graph convolutions over an orbital connectivity graph, or other neural network operations tailored for relational feature extraction. Model parameters of the prediction head may be trained on datasets containing reference entanglement values derived from correlated electronic structure calculations or experimental measurements, enabling the prediction head to infer accurate estimates from AO and MO embeddings even without performing the full high-level quantum computation.

By executing the entanglement prediction head to produce these entanglement measures, the processor enables downstream steps (e.g., constructing an orbital entanglement graph, selecting active-space orbitals, and determining adaptive fragmentation thresholds) to be informed by a quantitative, learned model of orbital correlation, thereby improving the efficiency and accuracy of correlated electronic structure simulations in the hybrid classical-quantum computing system.

At step 610, at least one processor may receive QPU-derived entanglement metrics for a subset of orbitals in the molecular system. In some implementations, at least one processor of the classical computing system may receive QPU-derived entanglement metrics for a subset of orbitals in the molecular system. The entanglement metrics may be generated by executing, on the QPU, one or more quantum circuits configured to measure correlation properties between selected orbitals using quantum algorithms or measurement protocols. Examples of such protocols may include, but are not limited to, procedures for estimating elements of the reduced density matrix, computing single-orbital entropy, computing mutual information between orbital pairs, and extracting entanglement spectra from measured quantum states.

The subset of orbitals selected for QPU measurement may be determined based on computational budget, qubit count availability, prior simulation data, or predictions from the entanglement prediction head. In some embodiments, the at least one processor may transmit quantum instructions to the QPU to configure the orbital mapping, fermion-to-qubit encoding, and circuit parameters needed to execute the entanglement measurement process. The QPU may then return raw measurement results, such as bitstring distributions or expectation values of Pauli operators, which are processed either on-hardware or by the classical computing system to yield the QPU-derived entanglement metrics.

By receiving QPU-derived entanglement metrics for a representative or critical subset of orbitals, the classical computing system can access high-fidelity, hardware-specific quantum correlation data without incurring the cost of full-system correlated classical simulation. These received metrics may serve as ground-truth or calibration values for refining the machine-learning-based entanglement predictions, thereby aligning the predictive model more closely with the behavior and constraints of actual quantum devices. The hybrid utilization of predicted and QPU-measured entanglement information allows the system to maintain efficiency while systematically improving accuracy through selective quantum hardware sampling.

At step 612, at least one processor may update the entanglement prediction head based on the QPU-derived entanglement metrics to refine prediction accuracy. In some implementations, at least one processor of the classical computing system may update the entanglement prediction head based on the QPU-derived entanglement metrics to refine prediction accuracy. The update process may be performed as part of a supervised learning or fine-tuning procedure, wherein the QPU-derived entanglement metrics serve as high-fidelity training targets for the parameters of the entanglement prediction head. In certain embodiments, the processor may compute a loss function that measures the deviation between the predicted entanglement measures output by the entanglement prediction head and the corresponding QPU-derived entanglement metrics, and may backpropagate this loss through the model to adjust weights and biases within one or more layers of the head.

The update may be applied in an online or incremental learning manner, allowing the entanglement prediction head to adapt continuously to new metrics as they are obtained from QPU executions. The refinement process can occur at multiple timescales, with quick, frequent updates performed using relatively inexpensive QPU measurements, and slower, more comprehensive retraining sessions incorporating a larger set of metrics collected over extended runs. In some embodiments, the update may selectively adjust only portions of the prediction head, such as final regression layers or specific feature-interaction layers, to maintain stability in the learned embeddings from the shared orbital encoder while incorporating new quantum-hardware-specific correlation patterns.

By updating the entanglement prediction head with QPU-derived entanglement metrics, the classical computing system can align the learned entanglement model more closely with the characteristics, noise profiles, and physical constraints of the actual quantum hardware. This feedback mechanism improves the robustness and predictive reliability of the model, enabling more accurate orbital correlation assessments and, in turn, more optimal active-space and fragmentation decisions in the hybrid classical-quantum computing sequence.

At step 614, at least one processor may construct an orbital entanglement graph representing correlated relationships between orbitals based on the predicted entanglement measures. In some implementations, at least one processor of the classical computing system may construct an orbital entanglement graph representing correlated relationships between orbitals based on the predicted entanglement measures. The orbital entanglement graph may be a data structure in which vertices correspond to individual orbitals, which may include both AOs and MOs, and edges represent correlation strengths between orbital pairs. Each edge may be assigned a weight corresponding to a predicted entanglement metric, such as pairwise mutual information, received from the entanglement prediction head.

The construction process may include generating an adjacency matrix or similar representation in which each matrix element encodes the predicted degree of correlation between two orbitals. The processor may apply normalization or thresholding to the predicted entanglement measures to enhance interpretability and reduce noise. In some embodiments, the graph may be constructed as a weighted, undirected graph to reflect symmetric correlation measures, while in other embodiments, directed relationships or more complex graph topologies may be used to capture asymmetric dependencies.

The processor may also annotate nodes and edges in the graph with additional orbital attributes, such as orbital index, type (core, valence, virtual), basis set label, or predicted single-orbital entropy value, enabling richer downstream analysis. Once constructed, the orbital entanglement graph serves as a compact, structured representation of the intrinsic correlation topology of the molecular system. This representation can be used as input to graph clustering or partitioning algorithms to identify tightly correlated orbital communities, which form the basis for active, bath, and environment subset selection during adaptive fragmentation.

By constructing and maintaining the orbital entanglement graph based on predicted entanglement measures (optionally refined via QPU-derived metrics) the system enables efficient and accurate extraction of correlation patterns that inform fragmentation decisions, optimize active-space definitions, and ultimately improve the performance of correlated electronic structure simulations in the hybrid classical-quantum computing environment.

At step 616, at least one processor may partition the set of orbitals into active, bath, and environment subsets according to learned fragmentation thresholds and the orbital entanglement graph. In some embodiments, the orbital entanglement graph is generated from predicted orbital correlation metrics, such as single-orbital entropy and pairwise mutual information values, optionally refined using quantum-processing-unit-derived entanglement measurements. In some embodiments, the at least one processor applies one or more learned fragmentation thresholds to the weighted edges or associated node attributes within the graph to determine boundaries between highly correlated orbitals and those with weaker correlation.

In some embodiments, the active subset may comprise orbitals exhibiting the highest entanglement with respect to one another or with a target region of interest, and is designated for explicit inclusion in the high-accuracy correlated electronic structure calculation. The bath subset may include orbitals that are not part of the active set but have significant correlation or coupling to active orbitals, serving as an immediate quantum-mechanical environment to preserve correlation effects at the fragment boundary. The environment subset may include the remaining orbitals with low correlation to the active set, which can be treated at a reduced level of theory, approximated via effective potentials, or integrated out of the fragment Hamiltonian.

In certain embodiments, the learned fragmentation thresholds are produced by training a machine-learning model, reinforcement-learning policy, or other algorithm on reference data from correlated solver outputs, optimizing to minimize total fragment simulation error subject to available computational resources. Thresholds may be dynamically adapted based on simulation feedback, changes in hardware resource availability, or variations in the entanglement graph structure across different geometries or electronic states. By partitioning the orbitals based on both learned thresholds and the entanglement graph's correlation topology, the processor creates fragment definitions that are chemically meaningful, computationally efficient, and optimized for execution within a hybrid quantum-classical sequence.

At step 618, at least one processor may produce fragmentation output data comprising identifiers for active, bath, and environment orbitals for use in correlated electronic structure calculations. In some implementations, at least one processor of the classical computing system may produce fragmentation output data comprising identifiers for active, bath, and environment orbitals for use in correlated electronic structure calculations. The fragmentation output data may be generated following the adaptive fragmentation process in which the orbital set is partitioned based on the orbital entanglement graph and learned fragmentation thresholds.

The processor may encode the fragmentation output data in a structured format, such as a table, list, or serialized data object, where each orbital entry includes an identifier (e.g., an orbital index within the molecular system, a basis function label, or a unique hash linking to AO/MO metadata). Each identifier may be associated with a label designating the orbital's assigned role: active (orbitals explicitly included in the high-accuracy correlated treatment), bath (orbitals that interact with the active set and represent its immediate environment), or environment (orbitals with low correlation to the active set, treated at a reduced level of theory or via effective potentials).

In some embodiments, the fragmentation output data may also include supplementary information for each orbital, such as its predicted single-orbital entropy, its maximum pairwise mutual information score, its basis set parameters, and its contribution to specific electronic bands or molecular substructures. The processor may further associate fragment grouping metadata, allowing downstream modules to understand orbital clustering relationships and their mapping to specific Hamiltonian fragments.

This fragmentation output data can be stored locally, transmitted to other classical subsystems, or formatted for consumption by a QPU or a classical correlated solver. By producing precise and traceable identifiers for active, bath, and environment orbitals, the classical computing system ensures that subsequent correlated electronic structure calculations (whether on quantum or classical hardware) operate on an optimized representation of the molecular system, preserving accuracy where it matters most while reducing computational cost.

At step 620, at least one processor may transmit at least a portion of the fragmentation output data to a quantum processing unit for execution of correlated electronic structure calculations on one or more active-space fragments. In some implementations, at least one processor of the classical computing system may transmit at least a portion of the fragmentation output data to a QPU for execution of correlated electronic structure calculations on one or more active-space fragments. The fragmentation output data transmitted may include identifiers of orbitals assigned to the active set, as well as any associated metadata required for quantum execution, such as basis transformation coefficients, orbital ordering, mapping indices, and fermion-to-qubit encoding specifications.

The at least one processor may serialize or package the orbital identifiers and metadata into a format compatible with the QPU control system or quantum programming environment, such as OpenQASM, Quil, QIR, or another quantum intermediate representation. The processor may also perform preprocessing to map the active-space fragment's fermionic Hamiltonian into a qubit-operator form using a selected transformation method, such as Jordan-Wigner, Bravyi-Kitaev, or qubit-tapering techniques. This mapping may account for the topology and qubit connectivity of the target QPU hardware to reduce circuit depth and improve execution fidelity.

In certain embodiments, the transmitted data may further include execution parameters and constraints, such as target precision thresholds, the number of measurement shots, circuit optimization levels, or schedules for iterative quantum-classical algorithms (e.g., for a variational quantum eigensolver). Upon receipt of the fragmentation output data, the QPU may construct and execute quantum circuits for the specified active-space fragment, returning computed results, such as energy values, reduced density matrices, and other correlated observables, to the classical computing system.

By transmitting this targeted, pre-processed subset of the fragmentation output data to a QPU, the system ensures that the quantum computation is focused solely on the computationally significant subspaces of the molecular system. This selective hand-off enables efficient utilization of limited quantum resources, improves solution accuracy for strongly correlated orbitals, and integrates seamlessly into the hybrid quantum-classical sequence for correlated electronic structure simulations.

In one illustrative embodiment, the disclosed methods and systems are employed to prepare a highly correlated active-space fragment for hybrid quantum-classical simulation of a metal-organic catalyst used for carbon dioxide reduction. The full catalyst model contains a cobalt porphyrin core with appended ligand groups, solvated in an explicit water shell, described by over one thousand atomic orbitals in a polarized triple-zeta basis. This size far exceeds the available resources of current QPUs, requiring intelligent reduction of the orbital space.

A molecular geometry file and corresponding basis set definitions for all atoms are first obtained from a computational chemistry database and loaded into the hybrid simulation platform. A shared-backbone orbital encoder processes the molecular structure and basis metadata to generate high-dimensional atomic orbital and molecular orbital embeddings. These learned representations encode detailed chemical information, including spatial localization, basis function character, and energetic relationships between orbitals, while remaining compact enough for downstream machine-learning-based processing.

The orbital embeddings are passed into a specialized entanglement prediction model trained to estimate quantitative correlation measures between orbitals. For each orbital, the model predicts its single-orbital entropy, indicating the extent to which that orbital's state is mixed due to electron correlation, and for each orbital pair, the model estimates pairwise mutual information, indicating how strongly knowledge of one orbital's state informs the other. The prediction results identify a subset of cobalt d-orbitals and ligand $\pi$-orbitals as highly entangled, suggesting they should be included together in any active-space definition.

To improve fidelity, the platform selects a subset of these orbitals for direct hardware measurement. The relevant fractional-occupation molecular orbital coefficients are mapped onto qubits using a Bravyi-Kitaev encoding, and parameterized quantum circuits are executed on a trapped-ion QPU to sample reduced density matrix elements. These quantum-measured metrics are returned to the classical system and used as high-value training labels to refine the entanglement prediction model. This feedback corrects small but important discrepancies, for example, revealing that certain water lone-pair orbitals show stronger-than-predicted coupling to the cobalt center under the simulated solvation conditions.

The improved entanglement predictions are used to construct an orbital entanglement graph in which each node represents an orbital and edges are weighted by predicted correlation strength. Graph-clustering algorithms identify tightly connected communities of orbitals, and learned fragmentation thresholds are applied to assign each orbital to one of three categories:

an active set, containing the key cobalt d-orbitals, ligand π-orbitals, and any water orbitals strongly coupled to them, a bath set, containing nearby orbitals with moderate correlation needed to faithfully represent the active space's environment, and an environment set, containing weakly correlated orbitals treated at a lower level of theory.

The active/bath/environment definitions, along with orbital indices, basis descriptors, and maximal correlation scores, are packaged into a structured data object. For the active set, a fragment Hamiltonian is assembled and transformed into a qubit-operator representation with qubit tapering to fit the 80 logical qubits available on the target QPU. The prepared fragment is then submitted to a variational quantum eigensolver (VQE) routine on the QPU, while bath and environment orbitals are processed on a coupled-cluster classical solver. The fragment results are reintegrated into the overall simulation, yielding a chemically accurate, resource-efficient correlated electronic structure for the cobalt porphyrin catalyst.

Through this sequence, the system leverages predictive entanglement modeling, selective quantum measurement, adaptive graph-based fragmentation, and targeted quantum execution to focus expensive quantum resources on the most correlation-critical parts of the system. This enables the accurate treatment of molecular subsystems that would otherwise be computationally intractable on current-generation hybrid quantum-classical hardware.

Figure 7:
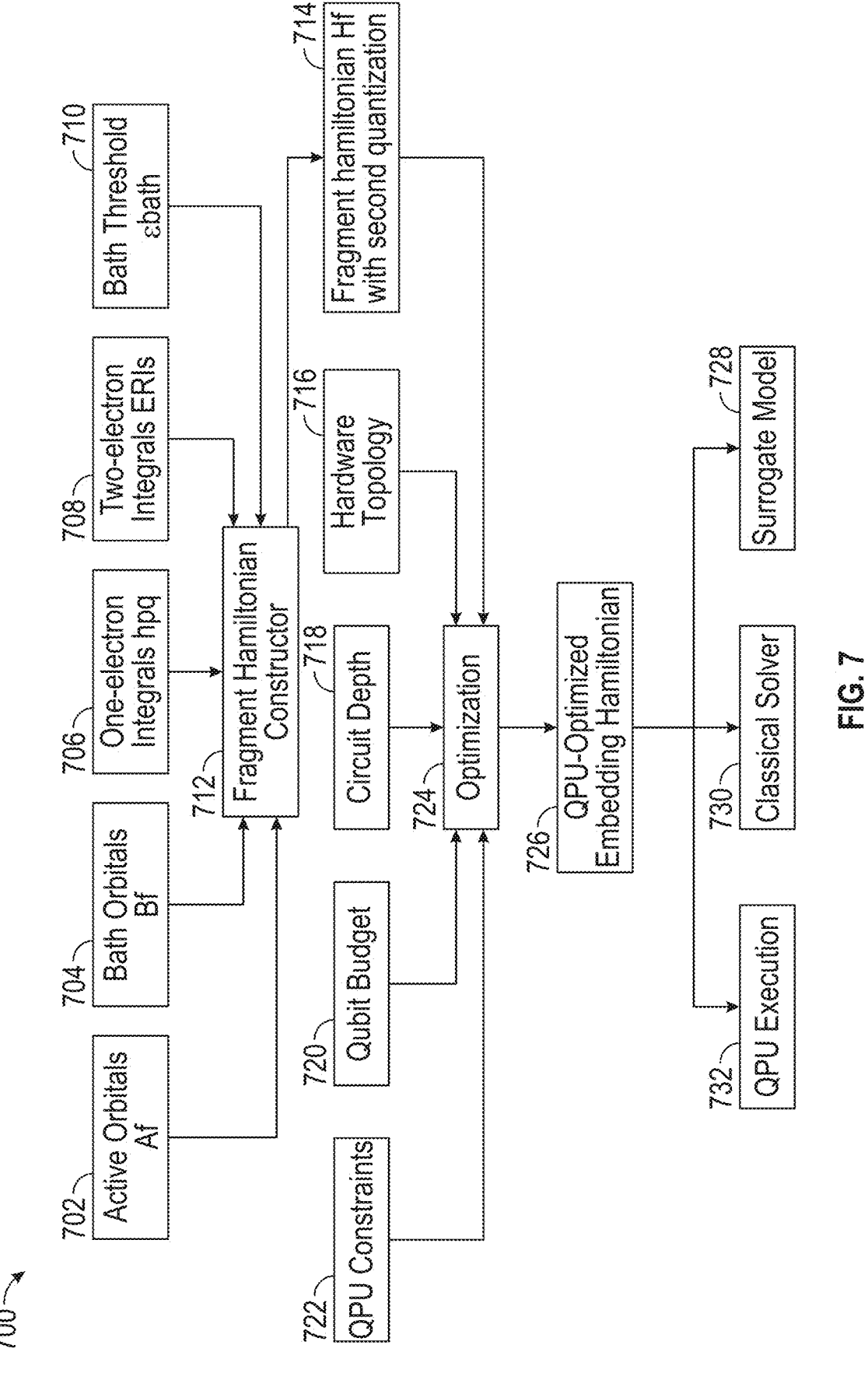
FIG. 7 is a block diagram of fragment embedding Hamiltonian construction, optimization for hardware constraints, and routing to quantum or classical solvers.

FIG. 7 is a block diagram illustrating an example sequence 700 for constructing, optimizing, and routing a fragment embedding Hamiltonian in a hybrid quantum-classical electronic structure simulation system. In the illustrated embodiment, at least one processor of a classical computing system performs actions to receive orbital subset and integral data required for fragment Hamiltonian generation, execute second-quantized Hamiltonian assembly, apply optimization based on QPU and hardware constraints, and produce a QPU-optimized embedding Hamiltonian for execution on quantum or classical computational resources.

At block 702, at least one processor receives identifiers for active orbitals (Af). These active orbitals are selected during an earlier adaptive fragmentation process and correspond to the set of orbitals to be explicitly included in high-accuracy correlated calculations. At block 704, at least one processor receives identifiers for bath orbitals (Bf). The bath orbitals represent orbitals outside the active set but which maintain significant correlation or coupling to the active set and must therefore be included in the embedding Hamiltonian.

At block 706, at least one processor receives one-electron integrals (hpq) associated with the fragment. These integrals represent the kinetic energy of electrons and their attraction to nuclei, expressed in the chosen basis set. At block 708, at least one processor receives two-electron integrals (ERIs), representing electron-electron Coulomb and exchange interactions for the fragment orbitals. These one- and two-electron integrals may be obtained by the processor in compressed or decompressed form depending on prior Hamiltonian compression stages. At block 710, at least one processor receives a numerical bath threshold (εbath), which may have been learned or specified. This threshold defines the selection criteria for including orbitals in the bath set and therefore directly impacts the size and scope of the fragment Hamiltonian.

At block 712, at least one processor executes a fragment Hamiltonian constructor to assemble the one-electron and two-electron terms associated with the active and bath orbitals, together with the bath threshold criteria, into a fragment embedding Hamiltonian. At block 714, at least one processor expresses the fragment Hamiltonian in second-quantized form, using creation and annihilation operators over the active and bath orbital spaces. This representation is compatible with fermion-to-qubit transformations required for quantum execution as well as with classical correlated solver formats.

The fragment Hamiltonian is then passed by at least one processor to an optimization stage that accounts for hardware-specific constraints. At block 716, at least one processor obtains or retrieves hardware topology information for the target execution environment, describing the qubit connectivity map or classical compute graph structure. At block 718, at least one processor obtains a maximum allowable circuit depth, which may be dictated by coherence times, error rates, or runtime requirements. At block 720, at least one processor obtains a qubit budget, indicating the total number of qubits that can be assigned to the fragment. At block 722, at least one processor obtains QPU constraints, which may include calibration data, gate fidelity requirements, error mitigation capabilities, and instruction set availability for the hardware.

At block 724, at least one processor performs optimization of the fragment Hamiltonian for the target execution resource by taking into account the hardware topology, circuit depth, qubit budget, and QPU constraints. This optimization may include orbital re-ordering, qubit tapering, basis transformations, mapping selection (e.g., Jordan-Wigner or Bravyi-Kitaev), and circuit synthesis improvements to reduce gate count and make best use of available quantum or classical hardware.

At block 726, at least one processor produces a QPU-optimized embedding Hamiltonian. This optimized representation is tailored to the constraints and capabilities of the intended execution backend. From here, at least one processor selects an appropriate execution path for the QPU-optimized embedding Hamiltonian. At block 728, at least one processor may route the Hamiltonian to a surrogate model for evaluation if the fragment's correlation level or priority indicates that a low-cost approximation is sufficient. At block 730, at least one processor may select a high-accuracy classical correlated solver if the fragment size and structure make classical computation feasible. At block 732, at least one processor may transmit the Hamiltonian to a QPU for execution using one or more quantum algorithms, such as variational quantum eigensolver (VQE) or quantum phase estimation (QPE), to compute fragment energies, reduced density matrices, or other correlated properties.

The sequence shown in FIG. 7 enables at least one processor of a classical computing system to construct fragment-specific embedding Hamiltonians from orbital partitioning results, adapt them to target hardware constraints through optimization, and route them to the most appropriate solver resource. This capability allows the system to maximize computational efficiency and accuracy by matching fragment complexity to the optimal computational backend in the hybrid quantum-classical environment.

FIGS. 8A-B illustrate operational block diagrams of an example method 800 for orchestrating execution of computational operations in a hybrid classical and quantum computing system, in accordance with an illustrative embodiment of the methods and systems discussed herein. In the illustrated embodiment, the method 800 includes steps 802 through 814; however, in other embodiments, additional or alternative steps may be performed, and one or more steps may be omitted without departing from the scope of the methods and systems discussed herein. The method 800 is described as being executed by at least one processor (e.g., one or more processors of a classical computing system), such as a server operating in a hybrid quantum-classical environment, but any suitable computing device or distributed set of computing devices with access to fragment embedding Hamiltonians, associated fragment features, hardware state data, and orchestration models may perform one or more of the operations discussed with respect to FIGS. 8A-B.

At step 802, at least one processor may receive a plurality of fragment embedding Hamiltonians, each corresponding to a respective fragment of a molecular system and associated with one or more fragment features including at least predicted orbital correlation measures, estimated solver accuracy requirements, and estimated computational cost metrics. In some implementations, at least one processor of a classical computing system may receive a plurality of fragment embedding Hamiltonians, each fragment embedding Hamiltonian corresponding to a respective fragment of a molecular system generated by an upstream fragmentation process. The fragmentation process may partition the molecular system into smaller computational units, or fragments, including an active orbital set and optionally associated bath and environment orbitals, based at least in part on predicted orbital correlation patterns determined by an entanglement prediction module.

In some embodiments, each fragment embedding Hamiltonian may be constructed to capture the intra-fragment electron correlation effects and relevant couplings to bath orbitals, and may be expressed in second-quantized form suitable for execution on quantum or classical solvers. The at least one processor may receive the fragment embedding Hamiltonians from a module such as the fragment Hamiltonian constructor (as shown, for example, in the sequences corresponding to FIGS. 2-7), which assembles them using one-electron and two-electron integrals, bath thresholds, and other orbital partitioning parameters.

Along with each fragment embedding Hamiltonian, the at least one processor may also receive one or more fragment features that characterize the computational properties and priority of the fragment. Such fragment features can include at least:

Predicted orbital correlation measures: for example, numerical estimates of single-orbital entropy, pairwise mutual information, or other entanglement-based metrics indicating the strength of electron correlation within the fragment;

Estimated solver accuracy requirements: for example, precision targets or acceptable error bounds for energy calculations, density matrices, or other computed observables for the fragment; and Estimated computational cost metrics: for example, predicted execution time, memory footprint, qubit resource requirements, or expected queue wait time for available solvers.

In some embodiments, the fragment features may be generated using a shared-backbone neural architecture, where the orbital encoder outputs embeddings for use by multiple heads including the entanglement predictor and compression modules, and may be augmented by hardware-aware cost models. These feature values allow the downstream orchestration system (including a reinforcement learning-based router) to evaluate trade-offs between accuracy, cost, and latency when assigning each fragment, or portions of its computations, to a QPU, a classical correlated solver, or a surrogate model.

In some embodiments, by receiving a set of fragment embedding Hamiltonians together with detailed fragment features capturing correlation strength, solver accuracy needs, and computational cost predictions, the at least one processor enables efficient, data-driven orchestration of solver assignment within the hybrid quantum-classical simulation environment, optimizing the use of heterogeneous computing resources while maintaining desired accuracy for correlated electronic structure calculations.

At step 804, at least one processor may receive hardware state data for a plurality of available computational resources, the plurality of available computational resources comprising at least one QPU and at least one classical computing system, the hardware state data including one or more of: current availability, qubit budget, circuit depth limit, memory capacity, queue time, and resource-specific error rates.

In some implementations, at least one processor of a classical computing system may receive hardware state data for a plurality of available computational resources in the hybrid computing environment. The plurality of available computational resources can include at least one QPU and at least one classical computing system, and in some embodiments may include additional solver platforms such as specialized high-performance computing clusters, GPU-accelerated nodes, or dedicated surrogate model servers.

In some embodiments, the hardware state data received by the at least one processor can describe the capabilities, current operating conditions, and performance metrics of each computational resource in real time or near real time. Such hardware state data may include one or more of:

Current availability: an indicator of whether a given QPU or classical solver is online and able to accept new workloads, including current utilization or idle status;

Qubit budget: the number of logical or physical qubits currently available for allocation to a fragment execution on the QPU, accounting for hardware calibration, error mitigation schemes, or multi-tenant sharing policies;

Circuit depth limit: a constraint on the maximum allowable quantum circuit depth for QPU execution, which may be derived from coherence time limitations, error accumulation thresholds, or user-defined performance profiles;

Memory capacity: the available memory or storage resources for a classical solver, useful for determining whether a fragment's Hamiltonian matrix size or intermediate data can be accommodated;

Queue time: the estimated time before a submitted job would begin execution on a shared resource, based on current job scheduling and system load;

Resource-specific error rates: performance indicators such as single-qubit gate error rate, two-qubit gate error rate, readout error probability for a QPU, or floating-point operation error margins for a classical solver due to hardware constraints or environmental conditions.

In some embodiments, the at least one processor may obtain the hardware state data through one or more interfaces, such as querying a QPU control API, polling a resource management service, receiving telemetry feeds from system dashboards, or subscribing to an event-driven update channel from each computational resource. In some embodiments, the hardware state data may be normalized or reformatted by the processor into a standardized representation suitable for ingestion by a reinforcement learning-driven orchestration engine.

In some embodiments, by receiving and maintaining an up-to-date view of hardware state data for both quantum and classical resources, the at least one processor enables the orchestration system to make informed, dynamic solver assignment decisions. This allows resource scheduling to optimize not only for theoretical performance but also for real-world operational factors, ensuring that fragment embedding Hamiltonians are routed to solvers under conditions that satisfy accuracy requirements while minimizing cost and execution time in the hybrid quantum-classical computing environment.

At step 806, at least one processor may execute an RL-based orchestration agent configured to determine, for each fragment embedding Hamiltonian, (i) which portion of computational operations associated with the fragment is to be executed on the at least one classical computing system, and (ii) which portion of the computational operations is to be executed on the at least one QPU. In some implementations, at least one processor of a classical computing system may execute an RL-based orchestration agent that is configured to make execution allocation decisions for fragment embedding Hamiltonians in a hybrid quantum-classical computing environment. The RL-based orchestration agent may operate as a machine learning policy model that ingests both fragment-specific data and real-time hardware state data and outputs an execution plan specifying the division of computational workload between classical and quantum resources.

In some embodiments, for each received fragment embedding Hamiltonian, the RL-based orchestration agent executed by the at least one processor may determine:

(i) which portion of the computational operations associated with that fragment, such as evaluation of specific Hamiltonian terms, diagonalization of sub-blocks, preparation of trial wavefunctions, or portions of a variational optimization loop, is to be performed using at least one classical computing system; and (ii) which portion of the computational operations is to be performed using at least one QPU.

The determination of which portions are assigned to classical versus quantum execution can be based on a variety of fragment-specific features and operational constraints, including, but not limited to: predicted orbital correlation measures, fragment size, qubit budget availability, expected circuit depth, estimated solver accuracy requirements, estimated computational cost metrics, queue times, and current error rates of the QPU.

The RL-based orchestration agent may be trained, in some embodiments, using a multi-objective reward function that balances multiple competing criteria such as energy accuracy, resource usage cost, and total expected execution latency. The learned policy may be continuously improved through feedback obtained from previous solver assignments and execution results, allowing the orchestration agent to adapt in real time to changing workload conditions, hardware performance characteristics, and problem instance variability.

Execution of the RL-based orchestration agent by the at least one processor ensures that for each fragment embedding Hamiltonian, the most computationally efficient and accuracy-preserving division of labor between classical and quantum resources is selected. This enables optimal use of heterogeneous computing capabilities in the hybrid quantum-classical system by directing compute-intensive but classically tractable portions of a fragment's workload to classical solvers while assigning quantum-advantageous portions to the QPU under conditions that maximize the likelihood of achieving the target computational accuracy.

At step 808, at least one processor may select, using the RL-based orchestration agent executed, for each determined portion of computational operations, a solver type from among a plurality of solver types including at least a classical correlated solver, a quantum solver executable on the at least one QPU, and a machine learning surrogate model, wherein the selection is based on a learned routing policy trained to optimize a multi-objective reward function comprising at least accuracy of computed energies, computational resource usage cost, and execution time.

In some implementations, at least one processor of a classical computing system may select, using the RL-based orchestration agent executed by the processor, for each determined portion of computational operations associated with a fragment embedding Hamiltonian, a solver type from among a plurality of solver types. The plurality of solver types may include at least:

A classical correlated solver: such as Coupled Cluster methods, Density Matrix Renormalization Group (DMRG), or Full Configuration Interaction (FCI) algorithms executed on one or more classical computing systems for computationally tractable workloads;

A quantum solver executable on the at least one QPU: such as a variational quantum eigensolver (VQE) or quantum phase estimation (QPE) routine, adapted to the fragment's Hamiltonian and mapped to available qubits, for workloads expected to benefit from quantum execution; and A machine learning surrogate model: trained to approximate fragment energy or property calculations at low computational cost, suitable for workloads with weak correlation or low priority where approximate results within acceptable tolerances are sufficient.

The RL-based orchestration agent, executing on the at least one processor, may make this solver selection for each portion of computational operations according to a learned routing policy. The learned routing policy may be trained using a multi-objective reward function that incorporates at least the following objectives:

Accuracy of computed energies: quantified as the deviation between solver output and reference or target values, with the goal of minimizing this error;

Computational resource usage cost: capturing hardware occupation time, QPU shot counts, or classical CPU/GPU utilization, with the goal of conserving valuable computational resources;

Execution time: encompassing both job queue delay and actual solver runtime, with the goal of minimizing total wall-clock time to solution.

In some embodiments, the multi-objective reward function may be expressed as a weighted sum of these objectives or may be implemented using a Pareto-optimality framework. The routing policy may be learned and periodically updated through training episodes in which the RL agent interacts with the hybrid computational environment, observes execution outcomes, and adjusts action selection probabilities to improve expected reward.

By selecting, for each portion of computational operations, the most appropriate solver type from a diverse set of solver options and doing so according to a routing policy optimized for both accuracy and efficiency, the at least one processor ensures that each fragment workload is executed on the computational resource most suited to its characteristics. This adaptive solver assignment maximizes hybrid system throughput, minimizes cost, and preserves the accuracy targets required for correlated electronic structure calculations.

At step 810, at least one processor may route each portion of computational operations to its respective selected solver type for execution on the designated classical computing system or QPU. In some implementations, at least one processor of a classical computing system may route each portion of computational operations, as determined and solver-assigned by the RL-based orchestration agent, to its respective selected solver type for execution on the designated computational resource. The routing may be performed in accordance with the execution plan generated by the RL agent, which specifies for each portion of a fragment embedding Hamiltonian's computational workload the appropriate solver type previously selected from among a classical correlated solver, a quantum solver executable on at least one QPU, or a machine learning surrogate model.

In some embodiments, for portions designated for execution on a classical correlated solver, the at least one processor may serialize and format the fragment's Hamiltonian and any associated execution parameters into an input format compatible with the target classical solver, such as a matrix representation, tensor network specification, or integral list, and transmit the input to the designated classical computing node or high-performance computing system.

In some embodiments, for portions designated for execution on a QPU, the at least one processor may prepare the portion's fragment Hamiltonian for quantum execution by applying any required fermion-to-qubit transformations, basis rotations, or circuit optimizations, producing a QPU-ready job specification. The job may then be transmitted over an appropriate hardware interface or network connection to the designated QPU system. The processor may also provide execution metadata such as the number of shots, optimization level for circuit compilation, qubit allocation mapping, and error mitigation parameters. Optimizing the mapping may further comprise adapting qubit allocation and logical-to-physical qubit mapping to match the current topology, connectivity, and calibration profile of the target QPU hardware.

In some embodiments, for portions designated for execution on a machine learning surrogate model, the at least one processor may invoke the surrogate model either locally or as a remote service, passing in an encoded representation of the fragment features and Hamiltonian descriptors so that the model can predict the desired observables or energy values for that portion.

The routing performed by the at least one processor may be implemented as direct API calls, message queue submissions, job scheduling commands, or secure remote procedure calls, depending on the operational environment and the integration interfaces provided by the solver endpoints. In some embodiments, the processor may concurrently route multiple portions to different solvers, enabling parallel execution across heterogeneous compute resources.

In some embodiments, by routing each portion of computational operations to the designated solver type and corresponding execution platform, the at least one processor ensures that workloads are executed on the most suitable computational resources as determined by the RL-based orchestration agent. This targeted allocation of workloads maximizes throughput and efficiency in the hybrid quantum-classical computing environment while meeting the accuracy and performance goals set for the molecular simulation.

At step 812, at least one processor may receive execution results from the solvers including at least one of: correlated energies, reduced density matrices, entanglement spectra, or error estimates. In some implementations, at least one processor of a classical computing system may receive execution results from one or more solvers following completion of computational operations that were routed to those solvers for execution. The solvers may include, but are not limited to, at least one classical correlated solver, at least one quantum solver executable on a QPU, and at least one machine learning surrogate model, as assigned by the RL-based orchestration agent.

The execution results received by the at least one processor may comprise one or more of the following:

Correlated energies: numerical values representing the total or fragment-specific correlated electronic energy as computed by the solver according to the selected level of theory (e.g., CCSD (T), DMRG, VQE). The at least one processor may store, compare, or aggregate these correlated energy values for assembly into the total molecular energy or for assessing solver accuracy against predicted or benchmark results.

Reduced density matrices (RDMs): matrix representations capturing reduced-order particle correlations (for example, one-RDM and two-RDM), which may be used for property calculations, orbital optimization, or further entanglement analysis. These RDMs may be provided in raw or post-processed form depending on the solver.

Entanglement spectra: spectral decompositions or distributions that characterize quantum entanglement within the active-space fragment or between the fragment and its bath/environment orbitals, which can be used to refine subsequent fragmentation thresholds or update orbital correlation estimates.

Error estimates: quantitative measures of computational uncertainty or hardware-introduced error, which may include statistical confidence intervals, estimates of truncation error, QPU noise-induced fidelity loss, or surrogate model prediction variance.

In some embodiments, the at least one processor may parse the execution results received from different solvers into a standardized internal representation to facilitate downstream processing. The processor may also time-stamp and index these execution results by fragment and solver type to enable longitudinal tracking of solver performance and correlation with routing decisions made by the RL-based orchestration agent.

In some embodiments, receiving these execution results enables the at least one processor to not only capture the computed outputs necessary for assembling the overall simulation result, but also to gather real-world performance and accuracy feedback from each solver. Such feedback can be used to update the learned routing policy of the RL-based orchestration agent, adjust solver selection criteria, and improve the allocation of computational portions between classical and quantum resources in future iterations of the hybrid quantum-classical sequence.

At step 814, at least one processor may update the learned routing policy of the RL-based orchestration agent based on the execution results to refine future determinations of which portions of computational operations are performed by the classical computing system and which portions are performed by the QPU. In some implementations, at least one processor of a classical computing system may update the learned routing policy of a RL-based orchestration agent based on execution results received from one or more solver types. The execution results may include correlated energies, reduced density matrices, entanglement spectra, error estimates, or other performance and accuracy metrics produced by classical correlated solvers, quantum solvers executable on at least one QPU, and machine learning surrogate models.

In some embodiments, the updating process, performed by the at least one processor, may involve computing one or more reward values for solver decisions previously made by the RL-based orchestration agent. In some embodiments, the reward value may be determined according to a multi-objective reward function that balances criteria such as (i) accuracy of computed energies, (ii) computational resource usage cost, and (iii) execution time, optionally weighted according to user preferences or system-defined priorities. The processor may compare the predicted or expected outcome for a given solver assignment decision against the actual execution result to quantify the effectiveness of that decision. In some embodiments, using these computed rewards and performance metrics, the at least one processor may adjust the parameters of the routing policy within the RL-based orchestration agent. This adjustment may be performed through reinforcement learning techniques such as policy gradient updates, Q-learning updates to an action-value function, or proximal policy optimization, depending on the implementation. In some embodiments, the policy update process may be incremental and online, allowing the routing policy to adapt continuously as new execution results are obtained, while in other embodiments, updates may be performed in periodic training batches.

In some embodiments, by updating the learned routing policy based on actual solver outcomes, the at least one processor enables the RL-based orchestration agent to refine its ability to determine, for future workloads, (i) which portions of computational operations are to be executed on the classical computing system, and (ii) which portions are to be executed on the QPU. Over time, this feedback-driven refinement improves overall scheduling efficiency, increases accuracy for quantum-advantage-appropriate workloads, reduces unnecessary quantum resource usage, and optimizes the total cost-performance trade-off in the hybrid quantum-classical computing environment. Updating the routing policy parameters may be performed using reinforcement learning algorithms such as policy-gradient methods, actor-critic architectures, Q-learning, or proximal policy optimization. In some embodiments, policy updates may occur on multiple timescales, with fast updates driven by surrogate model error signals, medium-frequency updates informed by classical correlated solver outputs, and slower, high-value updates based on quantum processing unit execution results. This enables the routing policy to adapt responsively while integrating high-fidelity feedback when available.

Figure 9:
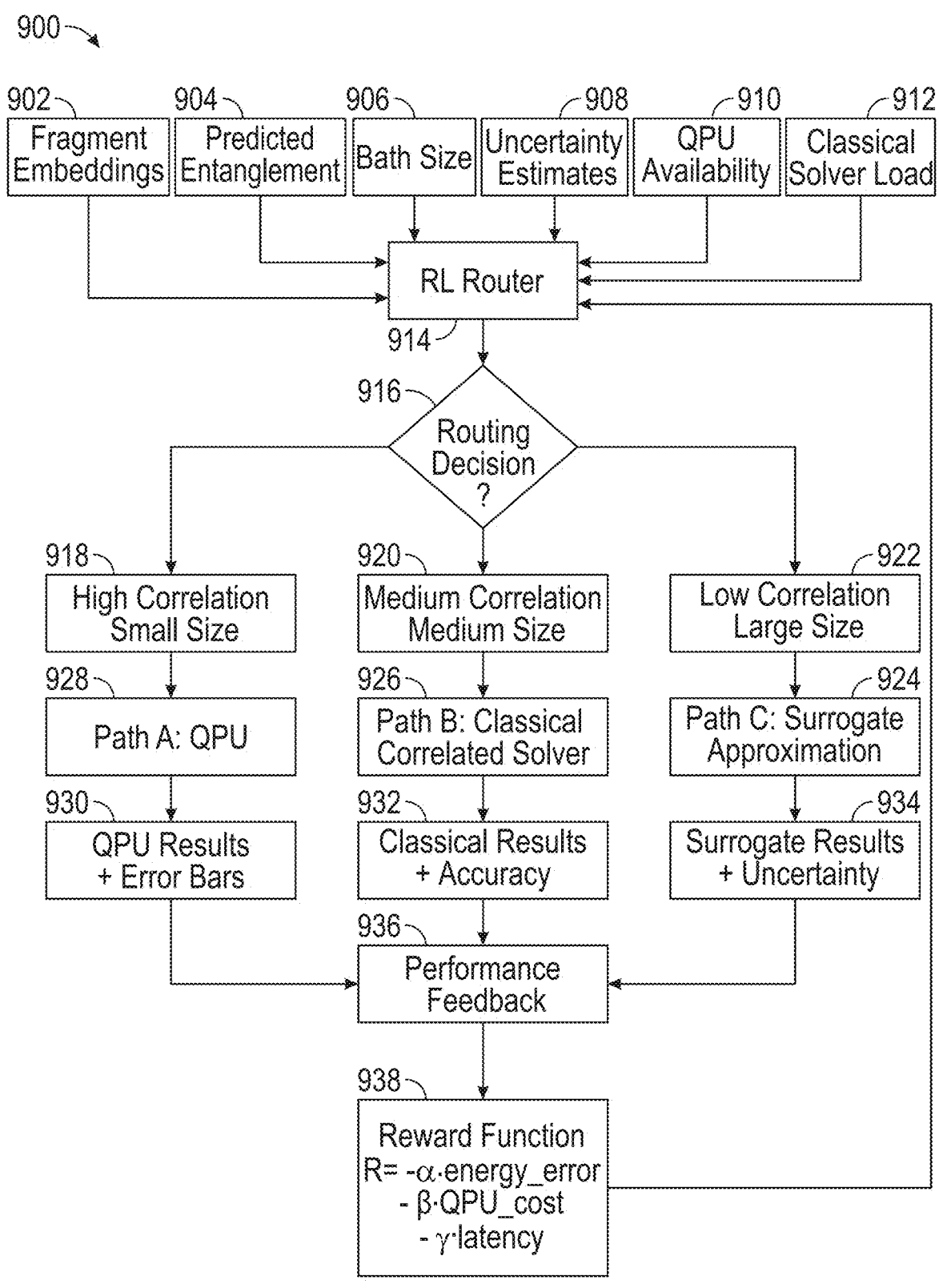
FIG. 9 is data flow diagram for RL-based routing decisions, solver execution paths (QPU, classical, surrogate), and multi-objective performance feedback.

FIG. 9 is a block diagram illustrating an example sequence 900 for RL-driven orchestration of fragment execution in a hybrid quantum-classical computing system. In the illustrated embodiment, at least one processor of a classical computing system executes an RL-based router to assign computational workloads for fragment embedding Hamiltonians to solver resources including at least one QPU, at least one classical correlated solver, and at least one machine learning surrogate model. FIG. 9 depicts the data flow from fragment and hardware inputs, through the RL-based decision process, to solver execution, and back via a performance feedback loop that updates the routing policy using a multi-objective reward function.

At block 902, at least one processor receives fragment embeddings. These fragment embeddings are feature vectors describing the properties of each fragment embedding Hamiltonian generated from earlier stages in the sequence, such as orbital encoding, entanglement prediction, and fragment Hamiltonian construction. At block 904, the at least one processor also receives predicted entanglement values for each fragment. The predicted entanglement values may include single-orbital entropy, pairwise mutual information, or other correlation measures generated by an entanglement prediction head, which are indicative of the degree of electron correlation within and between orbitals in the fragment.

At block 906, the at least one processor obtains the bath size for each fragment. The bath size represents the number of bath orbitals coupled to the active space of the fragment and may be used as an indicator of fragment complexity and computational load. At block 908, the at least one processor receives uncertainty estimates associated with each fragment. These uncertainty estimates may be generated from prior computational predictions, surrogate model variance outputs, or correlation predictor confidence scores, and can be used to inform solver selection by identifying cases that require higher-fidelity computation.

At block 910, the at least one processor receives QPU availability data, which may include the number of available qubits, circuit depth limits, current queue times, error rates, or calibration state of the at least one QPU. At block 912, the at least one processor receives data representing the current load on the classical correlated solver resources, such as CPU/GPU utilization, memory availability, expected job start times, or other scheduler metrics.

At block 914, the at least one processor executes the RL-based router using the received fragment features and hardware state metrics as inputs. The RL-based router comprises a learned policy module trained to output solver assignment decisions for fragment workloads. At block 916, the RL-based router produces a routing decision for each fragment, selecting one of several possible solver execution paths based on the learned routing policy.

In the illustrated example, the routing decision module can select among three primary solver paths. At block 918, fragments characterized by high correlation and small size are assigned to Path A (for example, the learned policy may route): QPU, where quantum execution is expected to provide accuracy benefits. At block 920, fragments characterized by medium correlation and medium size are assigned to Path B: Classical Correlated Solver, where high-accuracy classical algorithms can efficiently compute the results. At block 922, fragments characterized by low correlation and large size are assigned to Path C: Surrogate Approximation, where a pre-trained machine learning surrogate model computes approximate results at much lower computational cost.

In some embodiments, the RL-learned routing policy may, for example, assign fragments characterized by high correlation and small size to Path A: QPU . . . fragments with medium correlation and medium size to Path B: Classical Correlated Solver . . . and fragments with low correlation and large size to Path C: Surrogate Approximation. These example allocations are representative of outcomes the policy may learn over time; actual routing decisions are made dynamically based on the learned policy's evaluation of current fragment features and hardware state.

From the routing decision at block 916, the at least one processor routes each fragment to its designated path. At block 928, for Path A, the at least one processor transmits the fragment Hamiltonian to the QPU for execution using a quantum algorithm such as a variational quantum eigen-solver (VQE) or quantum phase estimation (QPE). Upon completion, at block 930, QPU results are received, including correlated energy values and associated error bars or uncertainty metrics.

At block 926, for Path B, the fragment is routed to the classical correlated solver for execution of algorithms such as coupled cluster or density matrix renormalization group (DMRG). At block 932, classical results are received, including correlated energies and computed accuracy values relative to target tolerances or benchmarks. At block 924, for Path C, the fragment is processed by a surrogate model, either running locally or on a remote server. At block 934, surrogate results are received, including predicted energies and surrogate-estimated uncertainty values.

At block 936, the at least one processor aggregates the execution outputs from all solver types into a performance feedback dataset. This dataset is used, at block 938, to compute a reward value for the RL policy according to a multi-objective reward function. In one example, the reward function may be expressed as:

$$R = -\alpha \cdot \text{energy\_error} - \beta \cdot \text{QPU\_cost} - \gamma \cdot \text{latency}$$

where $\alpha$, $\beta$, and $\gamma$ are weight coefficients that balance the relative importance of accuracy, computational cost, and run-time latency. The reward value is used to update the learned routing policy within the RL-based router, improving its future selection accuracy and optimizing the distribution of workloads between quantum and classical resources in subsequent iterations of the hybrid quantum-classical simulation.

The process depicted in FIG. 9 enables the at least one processor to dynamically assign fragment workloads to the most suitable computational resource based on real-time fragment features and hardware conditions, execute the workloads efficiently, collect results across heterogeneous solvers, and refine its decision-making policy through continuous feedback and reinforcement learning. This integrated process ensures that hybrid quantum-classical computing environments deliver maximum accuracy and performance for correlated electronic structure simulations while optimizing the use of available hardware resources.

Figure 10:
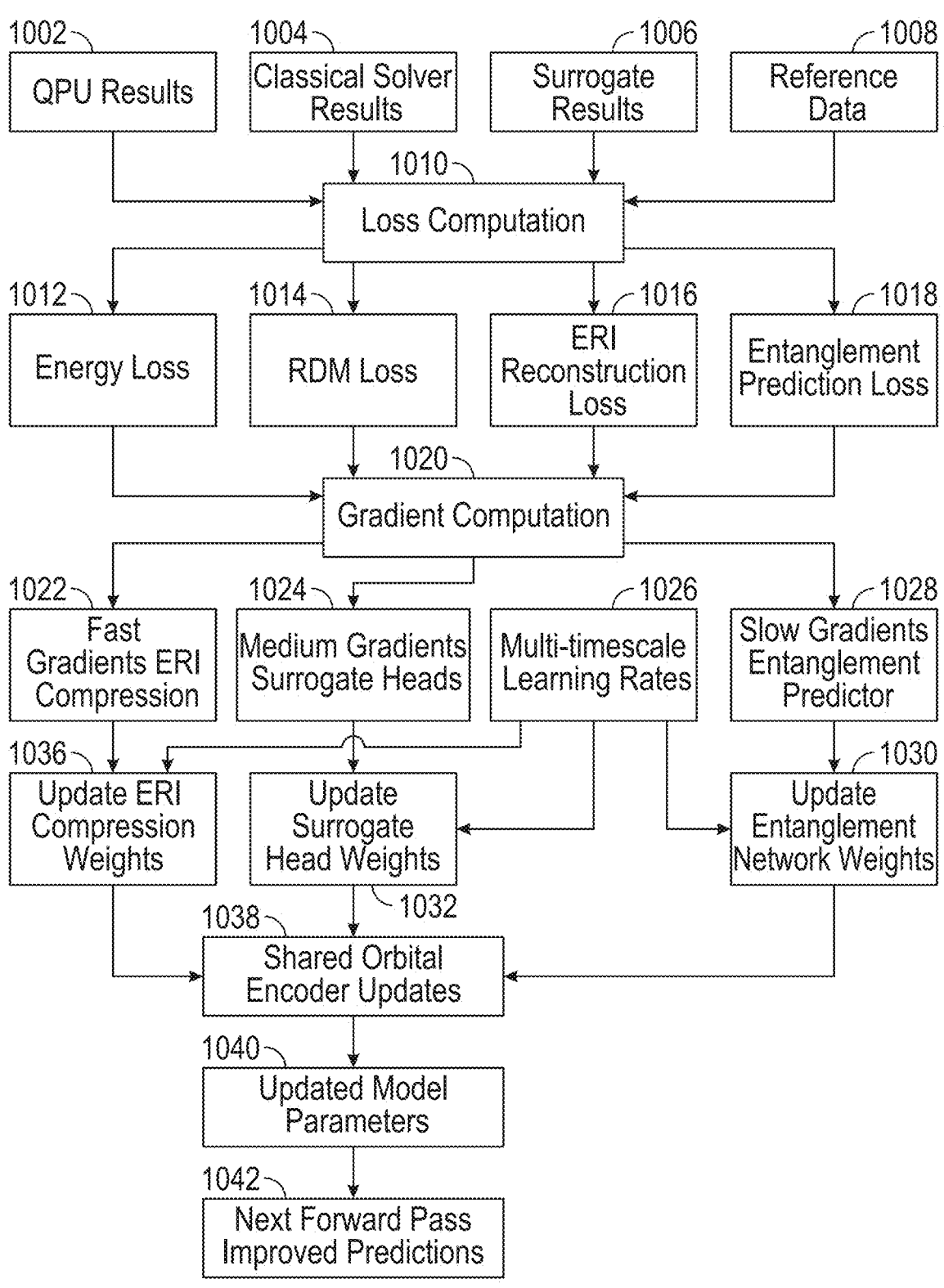
FIG. 10 is a diagram of multi-timescale feedback learning, illustrating solver output aggregation, loss computation, gradient updates, and coordinated model improvement.

FIG. 10 is a block diagram illustrating an example process 1000 for multi-timescale feedback learning and parameter updating in a hybrid quantum-classical simulation system. In the illustrated embodiment, at least one processor of a classical computing system processes solver outputs from multiple heterogeneous compute resources, computes losses relative to reference data, applies gradient computation on different feedback timescales, and updates the weights of multiple neural network model components to improve predictions in subsequent inference passes.

At block 1002, at least one processor receives QPU results obtained from executing one or more fragment embedding Hamiltonians on at least one quantum processing unit. The QPU results may include correlated energies, reduced density matrices (RDMs), entanglement spectra, or other quantum-derived observables. At block 1004, the processor receives classical solver results generated by a high-accuracy classical correlated solver executing on one or more classical computing systems. At block 1006, the processor receives surrogate results produced by machine-learning surrogate heads, which are trained to efficiently approximate fragment energies, RDMs, or other properties, typically for fragments of lower priority or correlation significance. For these surrogate models, additional performance feedback signals may also originate from the reinforcement-learning orchestration process illustrated in FIG. 9, including reward values reflecting the accuracy, cost, and latency of prior routing decisions. At block 1008, the processor also receives reference data, which may be obtained from benchmark electronic structure calculations, trusted experimental measurements, or curated datasets previously validated for accuracy. This combination of solver outputs, surrogate predictions, orchestration performance feedback, and reference data provides the basis for subsequent loss computation and gradient-based updates.

At block 1010, the at least one processor performs a loss computation between the solver results (1002, 1004, 1006) and the reference data (1008). This computation may include multiple distinct loss components reflecting different predictive targets. At block 1012, the processor computes an energy loss representing the deviation between predicted and reference correlated energies. At block 1014, the processor computes an RDM loss representing the difference between predicted and reference reduced density matrices. At block 1016, the processor computes an ERI reconstruction loss representing the accuracy of predicted electron repulsion integrals (ERIs) relative to reconstructed or reference values. At block 1018, the processor computes an entanglement prediction loss indicating the accuracy of predicted entanglement measures compared to those obtained from high-accuracy reference calculations or QPU measurements.

At block 1020, the at least one processor aggregates these individual loss values and performs a gradient computation to determine the parameter update directions and magnitudes needed to reduce loss in future predictions. The system applies a multi-timescale learning approach to balance update frequency and stability across different model components.

At block 1020, the at least one processor aggregates the individual loss values and performs gradient computation to determine the parameter update directions and magnitudes needed to reduce loss in future predictions. As shown at block 1026, the system applies a multi-timescale learning strategy that manages distinct learning rates and update frequencies for different model components. This coordinated approach balances responsiveness and stability across tasks by updating fast-changing prediction heads more frequently and slower-changing, structure-sensitive heads less often.

At block 1022, fast-rate gradients are computed and applied to model components responsible for ERI compression, enabling high-frequency updates that quickly improve ERI reconstruction accuracy. At block 1024, medium-rate gradients are applied to the surrogate heads that produce the surrogate results described at block 1006. These medium-rate updates allow the surrogate models to improve energy and RDM predictions incrementally while maintaining stability in their learned approximations. At block 1028, slow-rate gradients are computed for the entanglement prediction network, which benefits from less frequent updates to preserve robust long-term representations of orbital correlation structure.

The outputs of the fast-, medium-, and slow-rate gradient computations are used to update the weights of their respective heads, at block 1036 for ERI compression, at block 1032 for the surrogate heads, and at block 1030 for the entanglement prediction network. These updates are propagated back into the shared orbital encoder at block 1038 through back-propagation, integrating learning signals from all heads. This shared-backbone update ensures that improvements in task-specific feature use for one head benefit the representation quality available to the others, supporting consistent and coordinated performance gains across the hybrid quantum-classical simulation pipeline.

At block 1038, the shared orbital encoder component, which provides feature embeddings for multiple downstream heads including ERI compression, surrogate models, and entanglement prediction, is updated to integrate the learning signals from all heads. This ensures that improvements in one model component's feature usage propagate to the others.

At block 1040, the updated weights for all components are stored as the updated model parameters. At block 1042, the system uses the updated model parameters in the next forward pass during inference, resulting in improved predictions of ERIs, energies, RDMs, and entanglement measures.

The process depicted in FIG. 10 enables the at least one processor to integrate solver outputs from quantum and classical computations with reference data, compute multiple domain-specific loss terms, and perform coordinated gradient-based updates at different temporal resolutions. By applying multi-timescale learning rates to different model components, the system achieves stable yet responsive improvements across all predictive heads within the hybrid quantum-classical simulation architecture, thereby enhancing the accuracy, efficiency, and adaptability of future fragment routing and solver execution decisions.

Non-Limiting Example

In one illustrative embodiment, the described reinforcement-learning-driven hybrid orchestration method is applied to a large-scale quantum chemistry simulation of a transition-metal catalyst used for ammonia synthesis. The molecular system is processed by upstream modules in the hybrid pipeline to produce fragment embedding Hamiltonians. Each fragment embedding Hamiltonian describes a correlated subsystem of the catalyst's active site and surrounding ligand shell. Each fragment is also accompanied by fragment features that include predicted orbital entanglement values, bath size, correlation strength, estimated solver accuracy requirements, and predicted computational cost metrics generated from model cost estimators.

At the start of the orchestration cycle, the system queries hardware state data from the heterogeneous computational resources available in the environment. In this example, the hardware includes two cloud-hosted superconducting-qubit QPUs and a pool of high-performance classical correlated solvers. The hardware state data includes current QPU availability, logical qubit capacity, calibrated circuit depth limits, queue times for each device, recent device-specific error rates, and current CPU or GPU utilization on the classical solvers. This hardware telemetry is normalized into a resource state vector that can be ingested alongside the fragment features.

The fragment features and hardware state data are used as input to a reinforcement learning orchestration agent that has been pre-trained on similar catalyst systems and hardware profiles. For each fragment, the reinforcement learning policy evaluates the combined feature and state vector and outputs a routing decision specifying which portion of the fragment's computational workload should be assigned to a classical correlated solver, a QPU, or a surrogate solver. The policy also specifies relevant solver configuration parameters such as convergence tolerance, the number of measurement shots in a variational quantum eigensolver (VQE) run, or the confidence threshold required for surrogate model predictions.

In this example, the reinforcement learning agent routes small fragments with high correlation in the metal d-orbitals and manageable bath size to QPU execution. These are assigned to the least-loaded quantum processor that has enough calibrated qubits to run a VQE instance within the coherence limits of the hardware. Fragments of moderate size with medium correlation are directed to high-accuracy classical solvers, such as coupled-cluster with singles, doubles, and perturbative triples [CCSD (T)], executed on GPU-accelerated nodes to reduce wall-clock runtime. Large fragments composed mainly of weakly correlated ligand orbitals are sent to machine learning surrogate models that predict fragment energies within an acceptable error tolerance at significantly lower computational cost.

Once routing decisions are made, each solver executes its assigned workloads and returns results to the orchestration server. The QPU runs return correlated energies and device-reported error bars. The classical solvers return correlated energies and reduced density matrices. The surrogate models return their predicted energies together with a model-estimated uncertainty.

The orchestration layer then aggregates the outputs from all solver types and compares them against available reference data or high-confidence results. For the surrogate and routing-policy components, reward values are computed using a multi-objective function that considers the deviation between computed and reference energies, the cost associated with QPU usage, and the total execution latency. QPU cost is based on the amount of hardware occupation time, and latency includes both queue delay and actual runtime for each fragment.

The reinforcement learning agent updates its routing policy using online learning. Surrogate-path decisions receive more frequent, smaller updates based on recently observed performance. Classical solver paths are updated at a medium frequency once validated energy values are obtained. QPU paths are updated less frequently to incorporate higher-fidelity quantum results as they become available. Over repeated simulation cycles, the agent learns to route expensive quantum resources to fragments where they provide the largest accuracy benefit, to assign medium-correlation workloads to the most cost-effective classical resources, and to allocate low-impact fragments to surrogates without exceeding allowable error thresholds.

Through the use of this process, the hybrid simulation achieves a reduction in QPU usage time and an improvement in total job turnaround time compared to a static resource allocation policy, while maintaining the predefined accuracy target for total reaction energy predictions. This example demonstrates how the methods and systems discussed herein enable dynamic, feedback-driven orchestration across a heterogeneous pool of solvers, balancing accuracy, cost, and latency in real time for complex correlated electronic structure simulations.

Figure 11:
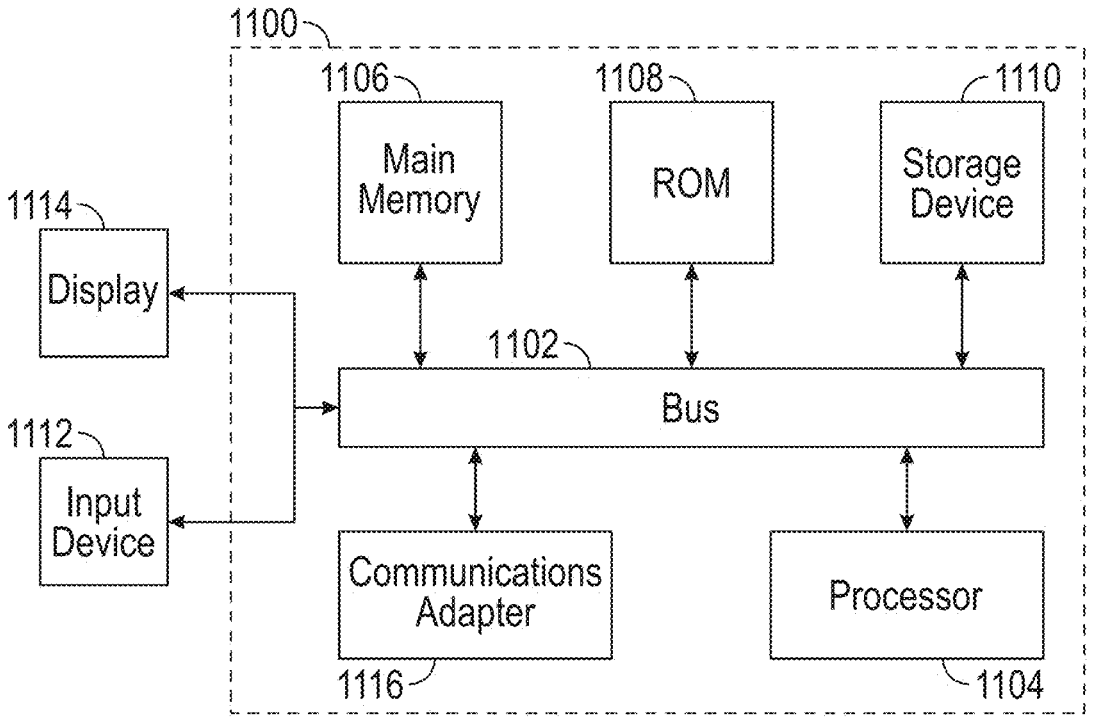
FIG. 11 is a component diagram of a classical computing system, showing processor, memory, storage, input/output devices, and communication interfaces.

FIG. 11 is a component diagram of an example computing system suitable for use in the various implementations described herein, according to an example implementation. For example, the computing system 1100 may correspond to the classical systems 110, the classical computing system 1228, or various other example systems and devices described in the present disclosure.

The computing system 1100 includes a bus 1102 or other communication component for communicating information and a processor 1104 coupled to the bus 1102 for processing information. The computing system 1100 also includes main memory 1106, such as a RAM or other dynamic storage device, coupled to the bus 1102 for storing information, and instructions to be executed by the processor 1104. Main memory 1106 can also be used for storing position information, temporary variables, or other intermediate information during execution of instructions by the processor 1104. The computing system 1100 may further include a ROM 1108 or other static storage device coupled to the bus 1102 for storing static information and instructions for the processor 1104. A storage device 1110, such as a solid-state device, magnetic disk, or optical disk, is coupled to the bus 1102 for persistently storing information and instructions.

The computing system 1100 may be coupled via the bus 1102 to a display 1114, such as a liquid crystal display, or active-matrix display, for displaying information to a user. An input device 1112, such as a keyboard including alphanumeric and other keys, may be coupled to the bus 1102 for communicating information, and command selections to the processor 1104. In another implementation, the input device 1112 has a touch screen display. The input device 1112 can include any type of biometric sensor, or a cursor control, such as a mouse, a trackball, or cursor direction keys, for communicating direction information and command selections to the processor 1104 and for controlling cursor movement on the display 1114.

In some implementations, the computing system 1100 may include a communications adapter 1116, such as a networking adapter. Communications adapter 1116 may be coupled to bus 1102 and may be configured to enable communications with a computing or communications network or other computing systems. In various illustrative implementations, any type of networking configuration may be achieved using communications adapter 1116, such as wired (e.g., via Ethernet), wireless (e.g., via Wi-Fi, Bluetooth), satellite (e.g., via GPS) pre-configured, ad-hoc, LAN, WAN, and the like.

According to various implementations, the processes of the illustrative implementations that are described herein can be achieved by the computing system 1100 in response to the processor 1104 executing an implementation of instructions contained in main memory 1106. Such instructions can be read into main memory 1106 from another computer-readable medium, such as the storage device 1110. Execution of the implementation of instructions contained in main memory 1106 causes the computing system 1100 to perform the illustrative processes described herein. One or more processors in a multi-processing implementation may also be employed to execute the instructions contained in main memory 1106. In alternative implementations, hard-wired circuitry may be used in place of or in combination with software instructions to implement illustrative implementations. Thus, implementations are not limited to any specific combination of hardware circuitry and software.

Figure 12:
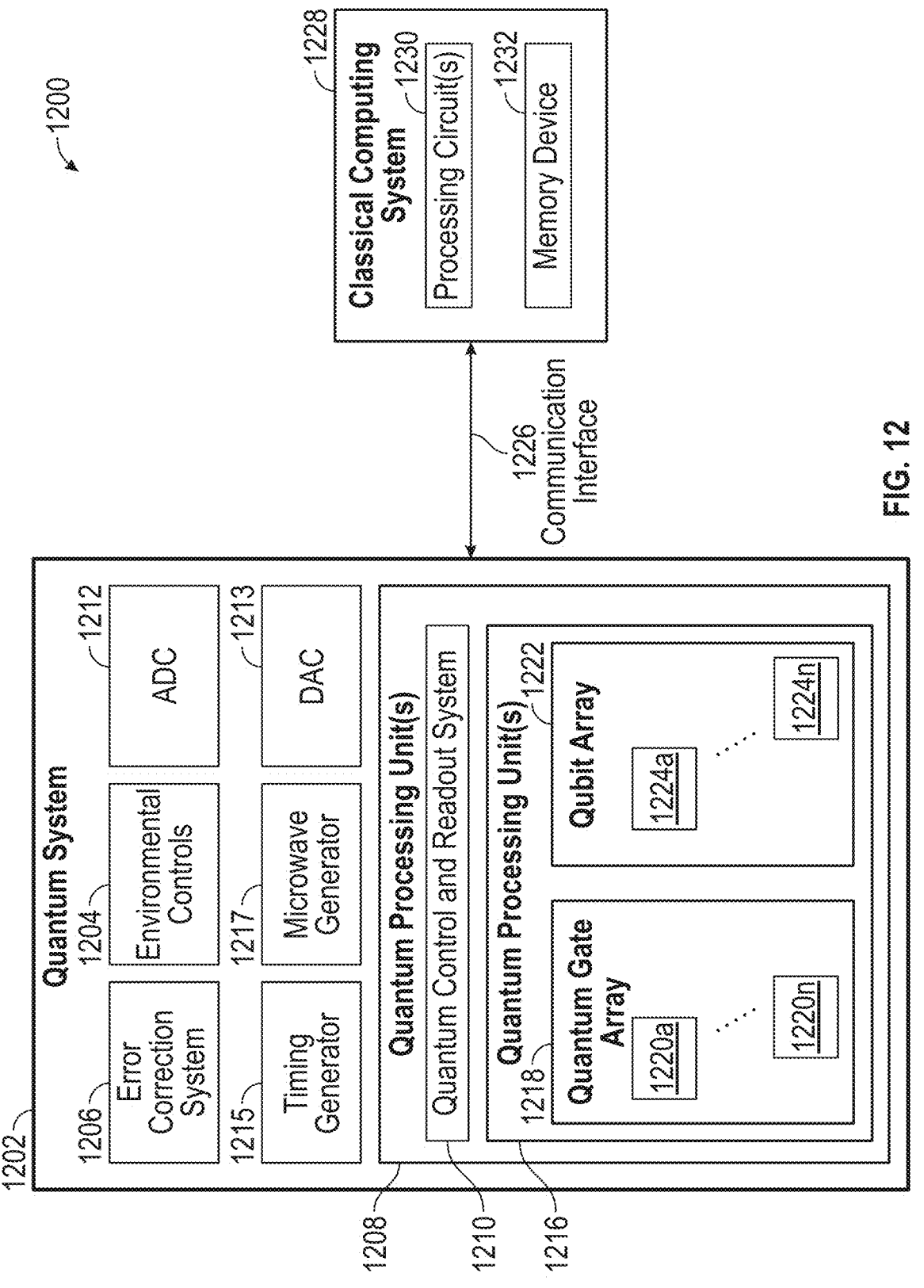
FIG. 12 is a block diagram of a quantum system integrated with classical computing, detailing quantum control, error correction, qubit arrays, and communication channels.

Referring now to FIG. 12, illustrated is a block diagram of an example quantum system 1100 including a quantum system 1202 integrated with a classical computing system 1228, in accordance with one or more implementations. The quantum system 1202 can include environmental controls 1204, a quantum error correction system 1206, at least one analog-to-digital converter 1212, at least one digital-to-analog converter 1213, a timing generator 1215, a microwave generator 1217, and at least one quantum device 1208, at least one quantum control and readout system 1210, at least one quantum processing unit 1216, at least one quantum gate array 1218, one or more quantum gate elements 1220A-1220N, at least one qubit array 1222, and one or more qubits 1224A-1224N. The system 1200 can further include at least one communication interface 1226. The system 1200 can include a computing system 1228, which can include one or more processing circuits 1230 and one or more memory devices 1232.

The system 1200 or portions thereof may be provided in a controlled environment. For example, the ambient environment can correspond to a controlled environment having an ambient temperature near room temperature (e.g., 60 degrees Fahrenheit (° F.) to 80° F., etc.). The ambient environment is not limited to the range of room temperatures. For example, the ambient environment of the qubit array 1222 can correspond to an environment having a temperature within the range of 0 Kelvin (K) to 110 K, corresponding to a superconducting temperature ambient environment.

The classical computing system 1228 can include at least one processor and a memory (e.g., a processing circuit). The classical computing system 1228 may be used to implement one or more of the classical systems 110 of FIG. 1. The memory can store processor-executable instructions that, when executed by processor(s), cause the processor(s) to perform one or more of the operations described herein. The processing circuit(s) 1230 may include a general-purpose processor (e.g., a CPU, etc.), an ASIC, a GPU, a TPU, an FPGA, the like, or combinations thereof. The memory may include, but is not limited to, electronic, optical, magnetic, or any other storage or transmission device capable of providing the processor with program instructions. The memory devices 1232 may further include a high-speed memory devices (e.g., high-bandwidth memory devices, high-bandwidth RAM/VRAM, etc.), memory chips, ASIC, FPGA, ROM, RAM, EEPROM, EPROM, flash memory, optical media, and/or any other suitable memory from which the processor(s) can read instructions and/or data. The instructions may include code from any suitable computer programming language. The classical computing system 1228 can include one or more computing devices or servers that can perform various functions as described herein. The classical computing system 1228 can include any or all of the components and perform any or all of the functions of any computing system described herein.

The quantum computing system 1200 can include at least one communication interface 1226. The communication interface 1226 can be used to exchange information between components of the quantum system 1202 and the classical computing system 1228. The communication interface 1226 can facilitate the transmission of instructions, signals, status information, conditions, states, and any other information necessary for coordinating tasks and operations across the quantum and classical subsystems. This interface can include one or more digital, analog, or similar communication channels. The communication interface 1226 can include all connections, protocols, and supporting hardware or software to implement communication between the classical and quantum parts of the system, allowing for hybrid computational processes.

The quantum computing system 1200 can include the quantum system 1202. The quantum system 1202 may be used to implement any of the quantum system(s) 120 of FIG. 1. The quantum system 1202 can be configured to provide the physical infrastructure necessary for quantum information processing and execution of quantum algorithms. The quantum system 1202 can include components and subsystems required to support quantum operations and establish the proper physical environment for the operation of quantum processing elements. In some implementations, the quantum system 1202 can be coupled to the environmental controls 1204 and the quantum error correction system 1206 to maintain appropriate operational conditions and support reliable quantum circuit execution. The quantum system 1202 can interoperate with the quantum control and readout system 1210 and can be interfaced, via the communication interface 1226, with the classical computing system 1228. The quantum system 1202 can include one or more environmental controls 1204.

The quantum system 1202 can include one or more environmental controls 1204. The environmental controls 1204 can be configured to maintain precise physical conditions necessary for stable and reliable quantum operations. The environmental controls 1204 can comprise a range of subsystems designed to regulate factors such as temperature, pressure, humidity, magnetic fields, electromagnetic interference, and radiation, all of which can affect the performance and coherence time of quantum devices. For example, in superconducting quantum processors, environmental controls 1204 can include cryogenic refrigeration units or dilution refrigerators that cool the quantum hardware to millikelvin temperatures to enable superconductivity and minimize thermal noise. In trapped ion or neutral atom systems, environmental controls 1204 can encompass vacuum chambers to minimize atomic collisions and laser stabilization systems to control various optical devices.

In some implementations, in addition to temperature and pressure regulation, the environmental controls 1204 can incorporate active magnetic shielding to prevent external fields from disturbing qubit operations, as well as vibration isolation platforms to reduce mechanical noise. These control systems may be controlled by controllers or integrated electronics. The integration of environmental controls 1204 within the quantum system 1202 can support achieving low error rates and consistent quantum circuit execution in the quantum computing system 1200.

The quantum system 1202 can include a quantum error correction system 1206. The quantum error correction system 1206 can be a system configured to detect and correct errors arising during quantum computation or storage. The quantum error correction system 1206 can consist of dedicated circuits, hardware modules, or physical subsystems, as well as supporting software, that are designed to implement error correction protocols, such as surface codes, concatenated codes, or other stabilizer codes, in order to preserve the fidelity of quantum states and protect against decoherence, gate errors, or environmental noise. Hardware suitable for quantum error correction can encompass ancillary qubits, syndrome measurement circuits, control electronics, and real-time feedback systems, while error correction software can execute operations for syndrome extraction, error diagnosis, and corrective feedback. In some implementations, the quantum error correction system 1206 can include cryogenic controllers, programmable logic devices, and/or firmware to facilitate the detection and correction of quantum errors.

The analog-to-digital converter 1212 can receive analog measurement signals generated by the quantum control and readout system 1210 and can convert the received analog signals into corresponding digital data. The analog-to-digital converter 1212 can sample the analog input at a predetermined rate and can generate digital output values that represent the amplitude or phase of the measurement signal at each sample point. In some implementations, the analog-to-digital converter 1212 can store the generated digital data in memory devices 1232 or can transmit the digital data to the classical computing system 1228 for subsequent processing, storage, or calibration analysis.

The digital-to-analog converter 1213 can receive digital control data from the classical computing system 1228 or the quantum control and readout system 1210 and can convert the received digital data into corresponding analog control signals. The digital-to-analog converter 1213 can generate analog voltage or current signals that are applied to the quantum processing unit 1216 to implement control operations such as qubit drive, flux bias, or readout pulse generation. In some implementations, the digital-to-analog converter 1213 can adjust the amplitude, frequency, or phase of the analog output according to the digital input values of the control and readout system 1210.

The timing generator 1215 can generate timing reference signals that coordinate the operation of the quantum processing unit 1216, the quantum control and readout system 1210, and the classical computing system 1228. The timing generator 1215 can produce clock signals, trigger pulses, or synchronization markers that define the timing of control pulses, measurement windows, or calibration experiments. In some implementations, the timing generator 1215 can store timing configuration data in memory devices 1232 or can receive timing instructions to align calibration operations with processor activity.

The microwave generator 1217 can generate microwave signals used to implement control pulses for qubit operations in the quantum processing unit 1216. The microwave generator 1217 can produce signals at specified frequencies, amplitudes, and phases according to control instructions received from the classical computing system 1228 or the calibration controller. In some implementations, the microwave generator 1217 can modulate the generated signals to produce shaped pulses for gate operations, readout, or calibration experiments, and can transmit the microwave signals to the quantum processing unit 1116 via a drive line controller or other signal routing hardware.

The quantum system 1202 can include at least one quantum device 1208. The quantum device 1208 can be configured to perform quantum computations by executing quantum circuits and manipulating quantum information. The quantum device 1208 can serve as the primary computational element within the quantum system 1202, orchestrating the application of quantum gates, qubit operations, and measurement processes required by quantum algorithms. The quantum device 1208 can be composed of specialized physical subsystems, such as superconducting resonators, trapped-ion arrays, photonic circuits, semiconductor quantum dots, neutral atom arrays, topological qubits, or other device architectures capable of realizing and controlling qubit states. In some implementations, the quantum device 1208 can interact with quantum control and readout system 1210 to receive gate instructions, perform operations at the hardware level, and provide measurement results to the classical computing system 1228. The quantum device 1208 can also be integrated with the quantum error correction system 1206, the quantum memory 1214, and the quantum gate array 1218 within the quantum system 1202 to enable reliable, high-fidelity execution of quantum algorithms in the quantum computing system 1200.

The quantum device 1208 can include a quantum control and readout system 1210. The quantum control and readout system 1210 can manipulate and measure quantum states within the quantum system 1202. The quantum control and readout system 1210 can generate and deliver control signals, such as microwave pulses, laser fields, or voltage pulses, by receiving timing references from the timing generator 1215, analog signals from the digital-to-analog converter 1213, and microwave signals from the microwave generator 1217. The quantum control and readout system 1210 can facilitate the implementation of quantum gates, entanglement protocols, and qubit initialization necessary for quantum algorithm execution by coordinating the sequencing and timing of control pulses with the timing generator 1215. The quantum control and readout system 1210 can coordinate the timing and sequencing of these operations with high precision via the other components of the quantum system 1202. In some implementations, the quantum control and readout system 1210 can receive digital control data from the classical computing system 1228, convert the data to analog signals using the digital-to-analog converter 1213, and deliver the resulting pulses to the quantum device 1208. In addition, the quantum control and readout system 1210 may facilitate qubit initialization to specified states (e.g., |0>, |+>), as well as the measurement of specific qubits or quantum registers, such as the most significant qubits or all relevant outputs, measuring expectation values, bitstring outcomes, or the full quantum register state.

In addition to control, the quantum control and readout system 1210 can perform high-fidelity measurement and readout of qubit states, converting quantum information into classical data that can be further processed by the classical computing system 1228. The measurement systems can vary by technology, including, but not limited to, microwave resonators, lasers, photonic, or single-photon detectors. The quantum control and readout system 1210 can receive analog measurement signals from the quantum device 1208, amplify and filter the signals, and digitize the measurement data using the analog-to-digital converter 1212 to obtain accurate and reliable state information following quantum operations or quantum circuit execution. The quantum control and readout system 1210 can interface with the classical control electronics 1232 to facilitate the transfer of measurement results and control data between quantum and classical subsystems.

The quantum device 1208 can include at least one quantum processing unit 1216. The quantum processing unit 1216 can include a logical or physical arrangement of quantum gates and qubits designed to execute specific quantum algorithms or operations. The quantum processing unit 1216 can define the sequence and connectivity of quantum gate elements, such as single-qubit operations or multi-qubit entangling operations, which act on the qubit array 1222 to manipulate quantum states according to a task. The configuration and parameters of the quantum processing unit 1216 can include operational parameters or specific gate configurations.

The quantum processing unit 1216 can include one or more qubits 1224A-1224N. The qubits 1224 can function as the fundamental units of quantum information, each capable of being realized using various quantum technologies. The qubits 1224 can be implemented using superconducting circuits, trapped ions, photonic platforms, semiconductor quantum dots, neutral atom arrays, or other physical systems. The qubits 1224 can be initialized to a specific state, such as |0> or |1>, a point on a Bloch sphere, or to other suitable state such as |+> or |−>. The qubits 1224 can also be prepared in a superposition of these states, such as $|\psi>=\alpha|0>+\beta|1>$, where $\alpha$ and $\beta$ represent amplitudes. The qubits 1224 can exist in standalone states or in entangled states with other qubits. Other characteristics of the qubits, such as coherence time, control fidelity, and error rates, can influence the execution of quantum operations and the design of error correction protocols.

The qubit 1224 can store information in various forms, such as a state vector, density matrix, or probability distribution. The qubit 1224 can support representation in multiple bases including, but not limited to, Z or computational, X or Hadamard, or Pauli-Y bases. A system of qubits can collectively represent the state of the quantum circuit, including configurations for advanced algorithms. In some implementations, during quantum processing, qubits in superposed and entangled states can exist and be manipulated via quantum gates. In some implementations, measurement of one or more qubits (e.g., qubits in a superposition state) by the measurement system will collapse the qubit into a defined state following the principles of quantum mechanics including wave function collapse and the observer effect. The measurement and sometimes collapse of a qubit state can result in a quantum state that is available for classical or further quantum processing.

The quantum processing unit 1216 can include at least one qubit array 1222 composed of one or more qubits 1224A-1224N. The qubit array 1222 can be organized into one or more quantum registers. Each quantum register can serve as a collection of qubits for computation, storage, or manipulation within the quantum processing unit 1216. Quantum registers and/or qubits in the qubit array 1222 can be actively addressed and controlled by the quantum gate array 1218 and associated gate elements 1220A-1220N during the execution of quantum algorithms, facilitating various computational tasks. In some implementations, the quantum memory 1214 may be used in conjunction with the qubit array 1222 to store the state of quantum registers at various points, such as when not actively in use.

In some implementations, the qubit array 1222 can store a quantum state and can be prepared in various basis states or superpositions in accordance with principles of quantum mechanics. Each qubit in the array can support initialization to specific states and may be configured to store any representation of a quantum state, such as a probability distribution, vector, or density matrix.

The quantum processing unit 1216 can include one or more quantum gate elements 1220A-1220N in at least one quantum gate array 1218. The quantum gate elements 1220 can implement various quantum operations. For example, the quantum gate elements 1220 can include single-input quantum gates, such as Pauli-X (X), Pauli-Y (Y), Pauli-Z (Z), Hadamard (H), T, or RY/RZ rotation gate, as well as multiple-input gates like the controlled-NOT (CNOT) gates. Each quantum gate element can correspond to any quantum operator required by the circuit and may function in accordance with stored or received instructions. The gate elements 1220 can act on entangled or non-entangled qubits, support the formation of quantum registers, and be dynamically grouped as required by the algorithm.

The quantum gates elements 1220 can be physically realized through precise manipulations of qubits tailored to the specific hardware platform. For example, in superconducting qubit systems, gates can be implemented using microwave pulses to drive transitions between qubit states. Other possible physical realizations of gates, not limited to these, include the use of laser pulses in trapped-ion systems, beam splitters for photonic qubits, and the control of magnetic or electric fields in spin or semiconductor qubit systems. Beyond their direct function in quantum state manipulation, the quantum gate elements 1220A-1220N may also structurally include or be associated with additional logic circuits, electronic devices, and memory and may be composed in alignment with the specific connectivity and architecture of the quantum hardware in use. Any supporting devices such as interface electronics, memory, and control circuitry can be included within the quantum gate elements or the broader quantum gate array 1218 to support quantum gate operations.

The quantum gate array 1218 can include a set of one or more quantum gate elements 1220A-1220N. The quantum gate array 1218 can be configured to perform a variety of quantum operations as required by algorithms executed within the quantum processing unit 1216. The quantum gate array 1218 can be designed to match and connect with the underlying connectivity of the QPU, such that physical and logical gate operations are compatible with available qubit arrangements and connectivity. The quantum gate array 1218 can provide a mechanism for applying specified transformations to qubit states according to the quantum algorithm being executed, such as for encoding, data classification, or other computational tasks. The configuration and operation of the quantum gate array 1218 can be controlled by various components described herein, such as the quantum control and readout system 1210.

Figure 13:
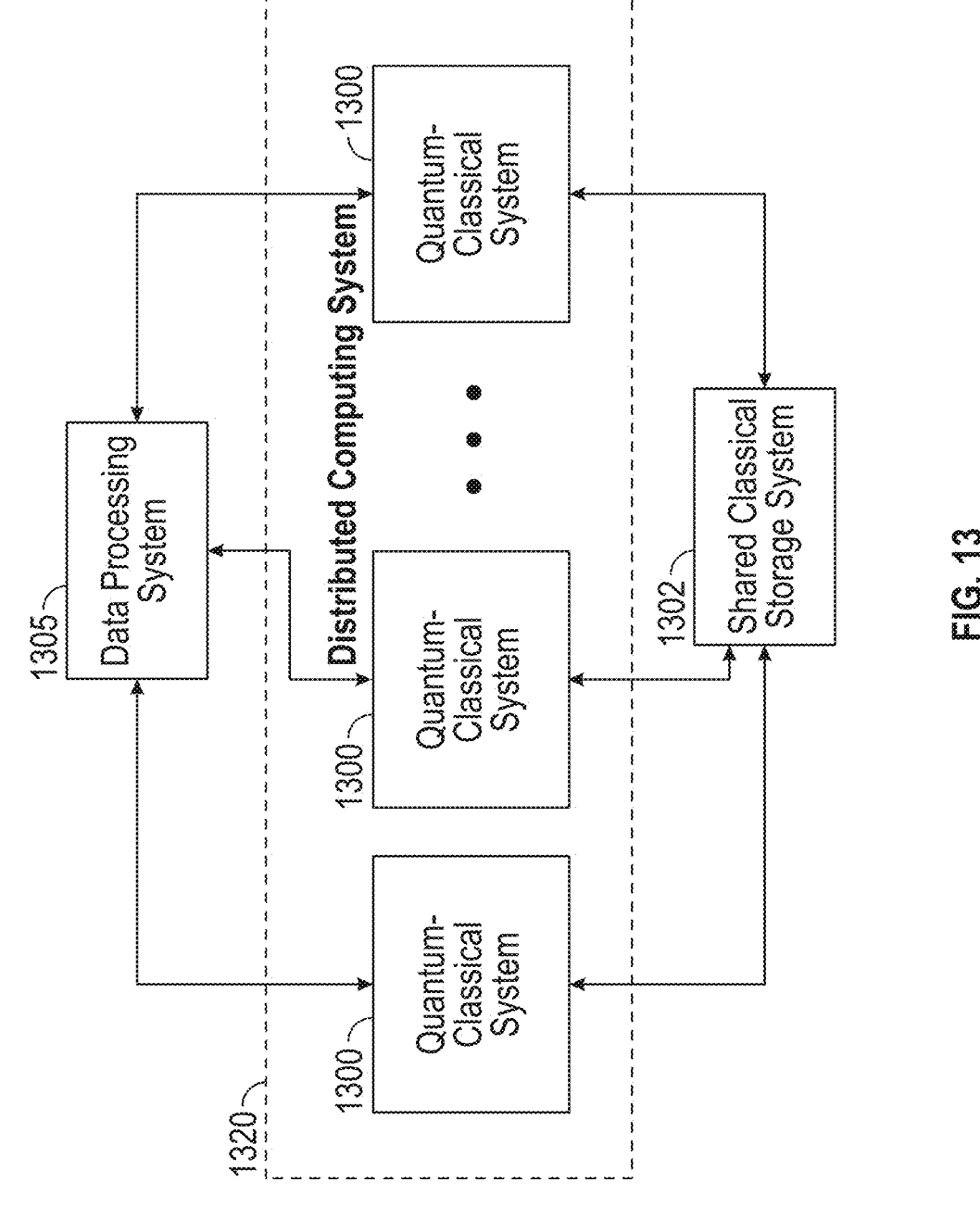
FIG. 13 is a distributed computing environment diagram, illustrating multiple hybrid quantum-classical systems, shared classical storage, and data processing system interconnections.

Referring now to FIG. 13, illustrated is a block diagram 1300 of a distributed hybrid quantum-classical computing environment, in accordance with one or more implementations.

The diagram 1300 shows the data processing system 1305 in communication with the distributed computing environment 1320. In this example implementation, the distributed computing environment 1320 can include one or more hybrid quantum-classical computing systems 1100, which are each described in further detail in connection with FIG. 11. The data processing system 1305 can communicate with the distributed computing environment 1320 (and/or the quantum-classical computing systems 1200 thereof) using one or more network interfaces or other suitable communication interfaces.

Each hybrid quantum-classical computing system 1200 can include a quantum system and a classical computing node coupled by a local, low-latency communication interface, as described in connection with FIG. 12. For example, the local, low-latency communication interface can include a high-speed data bus, a direct memory access link, or any other hardware interconnect that enables transmission of quantum measurement results, control signals, and/or intermediate computation data between the quantum and classical subsystems with minimal delay.

Each hybrid quantum-classical computing system 1200 can be in communication with one or more shared classical storage systems 1302, for example, by one or more communication interfaces that connect the classical computing node of the system 1200 to the storage system 1302. The shared classical storage system 1302 can store data that is to be accessed by multiple hybrid quantum-classical computing systems 1200, such as input datasets, quantum circuit definitions, intermediate results, and/or output data. In some implementations, the shared classical storage system 1302 can store calibration data, error models, and/or scheduling metadata that is generated by or accessed for the execution of processing jobs via the distributed computing environment 1320.

In one example, the shared classical storage system 1302 can maintain a repository of quantum measurement results produced by one hybrid quantum-classical computing system 1200 for use by another quantum-classical computing system 1200 in a subsequent computation stage. In another example, the shared classical storage system 1302 can store job specifications and partitioned task definitions to be retrieved by the data processing system 1305 according to the techniques described herein. The shared classical storage system 1302 can be implemented as a network-based storage system, such as a distributed file system, a network-attached storage device, or a cloud-based object storage system. In some implementations, the shared classical storage system 1302 can be accessed by the data processing system 1305 and/or by one or more classical computing nodes of a hybrid quantum-classical computing system 1300 using any suitable network protocols (e.g., TCP/IP, InfiniBand, Remote Direct Memory Access (RDMA), etc.), to facilitate data exchange.

At least one aspect relates to a system. The system can obtain a processing job for a distributed computing system comprising a plurality of classical computing systems and a plurality of quantum computing systems. The system can determine, for the processing job, a set of classical computing operations to be executed by one or more of the plurality of classical computing systems and a set of quantum computing operations to be executed by one or more of the plurality of quantum computing systems. The system can generate a hierarchical data structure for the processing job based on the set of classical computing operations and the set of quantum computing operations. The system can execute the processing job according to the hierarchical data structure via a subset of the plurality of classical computing systems and a subset of the plurality of quantum computing systems.

In some implementations, the system can generate the hierarchical data structure to include a directed graph data structure to represent a processing schedule for the set of classical computing operations and the set of quantum computing operations. In some implementations, each node in the directed graph data structure represents at least one of the set of classical computing operations or at least one of the set of quantum computing operations. In some implementations, the system can generate the processing schedule via time-slicing of the subset of the plurality of classical computing systems and the subset of the plurality of quantum computing systems. In some implementations, the system can generate the hierarchical data structure based on an availability of the plurality of classical computing systems and the plurality of quantum computing systems. In some implementations, the hierarchical data structure comprises a directed graph data structure.

In some implementations, the system can allocate the set of classical computing operations to the subset of the plurality of classical computing systems and the set of quantum computing operations to the subset of the plurality of classical computing systems according to a gang scheduler function. In some implementations, the plurality of classical computing systems comprise at least one of a central processing unit (CPU), a graphics processing unit (GPU), a field-programmable gate array (FPGA), or an application-specific integrated circuit (ASIC). In some implementations, the system can generate the hierarchical data structure for the processing job based on a set of priority scores generated for the set of classical computing operations and the set of quantum computing operations.

In some implementations, the system can monitor execution of the processing job via the distributed computing system. In some implementations, the system can update the hierarchical data structure according to the monitoring. In some implementations, the system can dynamically reallocate, based on the updated hierarchical data structure, at least one of the set of classical computing operations to a second subset of the plurality of classical computing systems. In some implementations, the system can dynamically re-allocate, based on the updated hierarchical data structure, at least one of the set of quantum computing operations to a second subset of the plurality of quantum computing systems.

At least one other aspect relates to a method. The method can be performed, for example, by one or more processors coupled to non-transitory memory. The method can include obtaining a processing job for a distributed computing system comprising a plurality of classical computing systems and a plurality of quantum computing systems. The method can include determining, for the processing job, a set of classical computing operations to be executed by one or more of the plurality of classical computing systems and a set of quantum computing operations to be executed by one or more of the plurality of quantum computing systems. The method can include generating a hierarchical data structure for the processing job based on the set of classical computing operations and the set of quantum computing operations. The method can include executing the processing job according to the hierarchical data structure via a subset of the plurality of classical computing systems and a subset of the plurality of quantum computing systems.

In some implementations, the method can include generating the hierarchical data structure to include a directed graph data structure to represent a processing schedule for the set of classical computing operations and the set of quantum computing operations. In some implementations, each node in the directed graph data structure represents at least one of the set of classical computing operations or at least one of the set of quantum computing operations. In some implementations, the method can include generating the processing schedule via time-slicing of the subset of the plurality of classical computing systems and the subset of the plurality of quantum computing systems. In some implementations, the method can include generating the hierarchical data structure based on an availability of the plurality of classical computing systems and the plurality of quantum computing systems. In some implementations, the hierarchical data structure is a directed graph data structure.

In some implementations, the method can include allocating the set of classical computing operations to the subset of the plurality of classical computing systems and the set of quantum computing operations to the subset of the plurality of classical computing systems according to a gang scheduler function. In some implementations, the method can include generating the hierarchical data structure for the processing job based on a set of priority scores generated for the set of classical computing operations and the set of quantum computing operations. In some implementations, the method can include monitoring execution of the processing job via the distributed computing system. In some implementations, the method can include updating the hierarchical data structure according to the monitoring.

At least one other aspect relates to a non-transitory computer-readable medium. The non-transitory computer-readable medium can store instructions that, when executed by one or more processors, cause the one or more processors to perform operations comprising obtaining a processing job for a distributed computing system comprising a plurality of classical computing systems and a plurality of quantum computing systems. The operations can include determining, for the processing job, a set of classical computing operations to be executed by one or more of the plurality of classical computing systems and a set of quantum computing operations to be executed by one or more of the plurality of quantum computing systems. The operations can include generating a hierarchical data structure for the processing job based on a set of priority scores generated for the set of classical computing operations and the set of quantum computing operations. The operations can include executing the processing job according to the hierarchical data structure via a subset of the plurality of classical computing systems and a subset of the plurality of quantum computing systems.

At least one aspect relates to a system. The system can include one or more processors coupled to non-transitory memory. The system can obtain, from a distributing computing platform comprising a quantum computing system, telemetry data corresponding to a processing job. The system can determine, based on the telemetry data indicating that an error rate of the quantum system satisfies a threshold corresponding to a quantum portion of the processing job, that an error resolution technique is to be applied to the quantum portion of the processing job. The system can select, for the quantum portion of the processing job, the error resolution technique from a plurality of error correction techniques and a plurality of error mitigation techniques. The system can update a hierarchical data structure representing the processing job as at least a set of node. The hierarchical data structure can be updated to include the error resolution technique in association with a respective node of the hierarchical data structure representing the quantum portion of the processing job.

In some implementations, the telemetry data comprises at least one of a noise metric, a qubit fidelity value, a two-qubit gate fidelity value, a measurement fidelity value, and a coherence time value. In some implementations, the system can update the hierarchical data structure to include at least one additional classical computing task to be assigned to at least one classical computing system of the distributed computing platform to implement the error resolution technique for the quantum portion of the processing job. In some implementations, the system can generate, for each error correction technique of the plurality of error correction techniques and for each error mitigation technique of the plurality of error mitigation techniques, a respective score that represents a likelihood of expected fidelity upon applying the error correction technique or the error mitigation technique. In some implementations, the system can select the error resolution technique according to the respective score of each of the plurality of error correction techniques and each of the plurality of error mitigation techniques.

In some implementations, the hierarchical data structure is a directed graph data structure. In some implementations, the system can update the directed graph data structure to include at least one node corresponding to the error resolution technique. In some implementations, the system can select the error resolution technique further based on a gate depth of a quantum circuit that is to execute the quantum portion of the processing job. In some implementations, the system can select the error resolution technique further based on an error budget for the quantum portion of the processing job. In some implementations, the system can determine a requested coherence time for the quantum portion based at least in part on the gate depth. In some implementations, the system can determine a measured coherence time for the quantum computing system based on a set of historical measurements of the quantum computing system that is to execute the quantum portion. In some implementations, the system can select the error resolution technique based on the requested coherence time and the measured coherence time.

In some implementations, the system can determine that the requested coherence time exceeds the measured coherence time. In some implementations, the system can select the error resolution technique from the plurality of error correction techniques responsive to determining that the requested coherence time exceeds the measured coherence time. In some implementations, the system can determine that the measured coherence time satisfies the requested coherence time. In some implementations, the system can select the error resolution technique from the plurality of error mitigation techniques responsive to determining that the measured coherence time satisfies the measured coherence time.

At least one aspect relates to a non-transitory computer-readable medium. The non-transitory computer-readable medium can store instructions that, when executed by one or more processors, cause the one or more processors to perform operations comprising obtaining, from a distributed computing platform comprising a classical computing system and a quantum computing system, telemetry data corresponding to a processing job. The operations can include determining, based on the telemetry data, that an error resolution technique is to be applied to a quantum portion of the processing job. The operations can include selecting, for the quantum portion of the processing job, the error resolution technique from a plurality of error correction techniques and a plurality of error mitigation techniques. The operations can include updating a hierarchical data structure representing the processing job to include at least one additional classical computing task to implement the error resolution technique for the quantum portion of the processing job.

The implementations described herein have been described with reference to drawings. The drawings illustrate certain details of specific implementations that implement the systems, methods, and programs described herein. However, describing the implementations with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some implementations, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some implementations, a circuit may take the form of one or more analog circuits, electronic circuits (e.g., integrated circuits (IC), discrete circuits, system on a chip (SOC) circuits), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR), resistors, multiplexers, registers, capacitors, inductors, diodes, wiring, and so on.

The "circuit" may also include one or more processors communicatively coupled to one or more memory or memory devices. In this regard, the one or more processors may execute instructions stored in the memory or may execute instructions otherwise accessible to the one or more processors. In some implementations, the one or more processors may be embodied in various ways. The one or more processors may be constructed in a manner sufficient to perform at least the operations described herein. In some implementations, the one or more processors may be shared by multiple circuits (e.g., circuit A and circuit B may comprise or otherwise share the same processor, which, in some example implementations, may execute instructions stored, or otherwise accessed, via different areas of memory). Alternatively or additionally, the one or more processors may be structured to perform or otherwise execute certain operations independent of one or more co-processors.

In other example implementations, two or more processors may be coupled via a bus to enable independent, parallel, pipelined, or multi-threaded instruction execution. Each processor may be implemented as one or more general-purpose processors, ASICs, FPGAs, GPUs, TPUs, digital signal processors (DSPs), or other suitable electronic data processing components structured to execute instructions provided by memory. The one or more processors may take the form of a single core processor, multi-core processor (e.g., a dual core processor, triple core processor, or quad core processor), microprocessor, etc. In some implementations, the one or more processors may be external to the apparatus, for example, the one or more processors may be a remote processor (e.g., a cloud-based processor). Alternatively or additionally, the one or more processors may be internal or local to the apparatus. In this regard, a given circuit or components thereof may be disposed locally (e.g., as part of a local server, a local computing system) or remotely (e.g., as part of a remote server such as a cloud based server). To that end, a "circuit" as described herein may include components that are distributed across one or more locations.

An exemplary system for implementing the overall system or portions of the implementations might include a general purpose computing devices in the form of computers, including a processing unit, a system memory, and a system bus that couples various system components including the system memory to the processing unit. Each memory device may include non-transient volatile storage media, non-volatile storage media, non-transitory storage media (e.g., one or more volatile or non-volatile memories), etc. In some implementations, the non-volatile media may take the form of ROM, flash memory (e.g., flash memory such as NAND, 3D NAND, NOR, 3D NOR), EEPROM, MRAM, magnetic storage, hard discs, optical discs, etc. In other implementations, the volatile storage media may take the form of RAM, TRAM, ZRAM, etc. Combinations of the above are also included within the scope of machine-readable media. In this regard, machine-executable instructions comprise, for example, instructions and data, which cause a general-purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components), in accordance with the example implementations described herein.

It should also be noted that the term "input devices," as described herein, may include any type of input device including, but not limited to, a keyboard, a keypad, a mouse, joystick, or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative implementations. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule-based logic and other logic to accomplish the various database searching steps, correlation steps, comparison steps, and decision steps.

While this specification contains many specific implementation details, these should not be construed as limitations on the scope of any inventions or of what may be claimed, but rather as descriptions of features specific to particular implementations of the systems and methods described herein. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Having now described some illustrative implementations and implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed only in connection with one implementation are not intended to be excluded from a similar role in other implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act, or element may include implementations where the act or element is based at least in part on any information, act, or element.

Any implementation disclosed herein may be combined with any other implementation, and references to "an implementation," "some implementations," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included for the sole purpose of increasing the intelligibility of the drawings, detailed description, and claims. Accordingly, neither the reference signs nor their absence have any limiting effect on the scope of any claim elements.

The foregoing description of implementations has been presented for purposes of illustration and description. It is not intended to be exhaustive or to limit the disclosure to the precise form disclosed, and modifications and variations are possible in light of the above teachings or may be acquired from this disclosure. The implementations were chosen and described in order to explain the principals of the disclosure and its practical application to enable one skilled in the art to utilize the various implementations and with various modifications as are suited to the particular use contemplated. Other substitutions, modifications, changes, and omissions may be made in the design, operating conditions and implementation of the implementations without departing from the scope of the present disclosure as expressed in the appended claims.

What we claim is:

1. A computer implemented method for predicting orbital entanglement and performing adaptive fragmentation in a hybrid classical and quantum computing system, the method comprising:

receiving, by at least one processor of a classical computing system, molecular geometry data and basis set descriptors associated with a molecular system;

generating, by the at least one processor executing an orbital encoder, atomic orbital (AO) and molecular orbital (MO) embeddings from the molecular geometry data and basis set descriptors;

providing, by the at least one processor, the AO and MO embeddings to an entanglement prediction head downstream from the orbital encoder;

predicting, by the entanglement prediction head executed by the at least one processor, orbital entanglement measures including at least one of single orbital entropy values, or pairwise mutual information values between orbitals;

receiving, by the at least one processor, quantum processing unit (QPU) derived entanglement metrics for a subset of orbitals in the molecular system;

updating, by the at least one processor, the entanglement prediction head based on the QPU derived entanglement metrics to refine prediction accuracy;

constructing, by the at least one processor, an orbital entanglement graph representing correlated relationships between orbitals based on the predicted orbital entanglement measures;

partitioning, by the at least one processor, the subset of orbitals in the molecular system into active, bath, and environment subsets according to learned fragmentation thresholds and the orbital entanglement graph;

producing, by the at least one processor, fragmentation output data comprising identifiers for active, bath, and environment orbitals for use in correlated electronic structure calculations; and transmitting, by the at least one processor, at least a portion of the fragmentation output data to a quantum processing unit for execution of correlated electronic structure calculations on one or more active space fragments.

2. The method of claim 1, wherein the orbital encoder comprises a graph neural network configured to process atomic connectivity, basis function metadata, or spatial coordinates to generate the AO and MO embeddings.

3. The method of claim 1, wherein predicting the orbital entanglement measures further comprises generating a weighted adjacency matrix in which weights correspond to the predicted pairwise mutual information values between orbitals.

4. The method of claim 1, wherein receiving the QPU derived entanglement metrics comprises executing, on the quantum processing unit, a measurement protocol that estimates reduced density matrices for the subset of orbitals and computes single orbital entropy values.

5. The method of claim 1, wherein updating the entanglement prediction head based on the QPU derived entanglement metrics comprises retraining at least one layer of the prediction head using the QPU-derived entanglement metrics as supervised learning targets.

6. The method of claim 1, wherein constructing the orbital entanglement graph comprises clustering the graph into communities of orbitals using a graph partitioning algorithm selected from at least one a spectral clustering, modularity maximization, or community detection by label propagation.

7. The method of claim 1, wherein partitioning the set of orbitals into active, bath, and environment subsets comprises adaptively determining fragmentation thresholds using reinforcement learning based on simulation accuracy feedback observed from the quantum processing unit.

8. The method of claim 1, wherein transmitting at least a portion of the fragmentation output data to the quantum processing unit further comprises encoding the active space orbital identifiers into a fermion to qubit mapping at least one of a Jordan-Wigner, Bravyi-Kitaev, and qubit tapering transformations.

9. A computer system for predicting orbital entanglement and performing adaptive fragmentation in a hybrid classical and quantum computing system, the computer system comprising a non transitory computer readable medium storing one or more instructions that, when executed, cause at least one processor of a classical computing system to:

receive molecular geometry data and basis set descriptors associated with a molecular system;

generate, by executing an orbital encoder, atomic orbital (AO) and molecular orbital (MO) embeddings from the molecular geometry data and basis set descriptors;

provide the AO and MO embeddings to an entanglement prediction head downstream from the orbital encoder;

predict, via the entanglement prediction head, orbital entanglement measures including at least one of single orbital entropy values or pairwise mutual information values between orbitals;

receive quantum processing unit (QPU)-derived entanglement metrics for a subset of orbitals in the molecular system;

update the entanglement prediction head based on the QPU derived entanglement metrics to refine prediction accuracy;

construct an orbital entanglement graph representing correlated relationships between orbitals based on the predicted orbital entanglement measures;

partition the subset of orbitals in the molecular system into active, bath, and environment subsets according to learned fragmentation thresholds and the orbital entanglement graph;

produce fragmentation output data comprising identifiers for active, bath, and environment orbitals for use in correlated electronic structure calculations; and transmit at least a portion of the fragmentation output data to a quantum processing unit for execution of correlated electronic structure calculations on one or more active space fragments.

10. The computer system of claim 9, wherein the orbital encoder comprises a graph neural network configured to process atomic connectivity, basis function metadata, or spatial coordinates to generate the AO and MO embeddings.

11. The computer system of claim 9, wherein predicting the orbital entanglement measures further comprises generating a weighted adjacency matrix in which weights correspond to the predicted pairwise mutual information values between orbitals.

12. The computer system of claim 9, wherein receiving the QPU derived entanglement metrics comprises executing, on the quantum processing unit, a measurement protocol that estimates reduced density matrices for the subset of orbitals and computes single orbital entropy values.

13. The computer system of claim 9, wherein updating the entanglement prediction head based on the QPU derived entanglement metrics comprises retraining at least one layer of the prediction head using the QPU derived entanglement metrics as supervised learning targets.

14. The computer system of claim 9, wherein constructing the orbital entanglement graph comprises clustering the graph into communities of orbitals using a graph partitioning algorithm selected from at least one of spectral clustering, modularity maximization, or community detection by label propagation.

15. The computer system of claim 9, wherein partitioning the set of orbitals into active, bath, and environment subsets comprises adaptively determining fragmentation thresholds using reinforcement learning based on simulation accuracy feedback observed from the quantum processing unit.

16. The computer system of claim 9, wherein transmitting at least a portion of the fragmentation output data to the quantum processing unit further comprises encoding the active space orbital identifiers into a fermion to qubit mapping selected from at least one of Jordan-Wigner, Bravyi-Kitaev, or qubit tapering transformations.

17. A computer system comprising a classical computing system and at least one quantum processing unit (QPU), wherein the classical computing system is configured to:

receive molecular geometry data and basis set descriptors associated with a molecular system;

generate, by executing an orbital encoder, atomic orbital (AO) and molecular orbital (MO) embeddings from the molecular geometry data and basis set descriptors;

provide the AO and MO embeddings to an entanglement prediction head downstream from the orbital encoder;

predict, via the entanglement prediction head, orbital entanglement measures including at least one of single orbital entropy values or pairwise mutual information values between orbitals;

receive QPU derived entanglement metrics for a subset of orbitals in the molecular system;

update the entanglement prediction head based on the QPU derived entanglement metrics to refine prediction accuracy;

construct an orbital entanglement graph representing correlated relationships between orbitals based on the predicted orbital entanglement measures;

partition the subset of orbitals in the molecular system into active, bath, and environment subsets according to learned fragmentation thresholds and the orbital entanglement graph;

produce fragmentation output data comprising identifiers for active, bath, and environment orbitals for use in correlated electronic structure calculations; and transmit at least a portion of the fragmentation output data to the QPU for execution of correlated electronic structure calculations on one or more active space fragments.

18. The computer system of claim 17, wherein the orbital encoder comprises a graph neural network configured to process atomic connectivity, basis function metadata, or spatial coordinates to generate the AO and MO embeddings.

19. The computer system of claim 17, wherein the classical computing system is further configured to generate a weighted adjacency matrix in which weights correspond to predicted pairwise mutual information values between orbitals.

20. The computer system of claim 17, wherein the QPU is configured to execute a measurement protocol that estimates reduced density matrices for the subset of orbitals and provides single orbital entropy values for use in updating the entanglement prediction head.

* * * * *